(12) United States Patent
Mitchell et al.

(10) Patent No.: US 11,869,088 B2
(45) Date of Patent: *Jan. 9, 2024

(54) SYSTEMS AND METHODS FOR CONVERTING LIVE WEATHER DATA TO WEATHER INDEX FOR OFFSETTING WEATHER RISK

(71) Applicant: Intercontinental Exchange Holdings, Inc., Atlanta, GA (US)

(72) Inventors: Stephen John Mitchell, Houston, TX (US); Charles Gabriel Harris, Cambridge, MA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,793

(22) Filed: Feb. 22, 2023

(65) Prior Publication Data

US 2023/0196468 A1    Jun. 22, 2023

Related U.S. Application Data

(63) Continuation of application No. 17/872,390, filed on Jul. 25, 2022, now Pat. No. 11,631,139, which is a
(Continued)

(51) Int. Cl.
*G06Q 40/06* (2012.01)
*G06Q 50/06* (2012.01)
(Continued)

(52) U.S. Cl.
CPC .............. *G06Q 40/06* (2013.01); *G01W 1/06* (2013.01); *G06F 16/29* (2019.01); *G06Q 50/06* (2013.01); *G01W 2203/00* (2013.01)

(58) Field of Classification Search
CPC ... G01W 1/06; G01W 1/10; G01W 2001/006; G01W 2203/00; G06F 16/24568;
(Continued)

(56) References Cited

U.S. PATENT DOCUMENTS

2011/0307109 A1    12/2011  Sri-Jayantha
2012/0065789 A1*   3/2012   Scelzi ................... G01K 13/00
                                                              702/136
(Continued)

OTHER PUBLICATIONS

Supplementary European Search Report dated Dec. 16, 2021 of counterpart European Application No. 21716255.1.
(Continued)

*Primary Examiner* — Yoshihisa Ishizuka
(74) *Attorney, Agent, or Firm* — DLA Piper LLP (US)

(57) ABSTRACT

Systems and methods for converting live weather data to a weather index for offsetting weather risk. Weather data source systems generate one or more weather data streams that include weather forecast model and observations data. A data distribution system receives a weather index request, identifies at least one instrument and at least one location associated with the request. Weather risk indication data is extracted among the weather data streams associated with the identified location based on predefined parameters associated with the identified instrument. The extracted data is converted into a set of weather index values corresponding to the location, based on a predetermined algorithm associated with the identified instrument. A weather index presentation package is generated that includes the set of weather index values for distribution to at least one user device. The weather index presentation package being distributed is updated concurrent with changes to weather risk indication data.

30 Claims, 40 Drawing Sheets

Related U.S. Application Data continuation of application No. 17/186,588, filed on Feb. 26, 2021, now Pat. No. 11,423,484.

(60) Provisional application No. 62/982,242, filed on Feb. 27, 2020.

(51) Int. Cl.
  *G01W 1/06* (2006.01)
  *G06F 16/29* (2019.01)

(58) Field of Classification Search
  CPC ....... G06F 16/29; G06F 16/909; G06Q 40/06; G06Q 50/06
  See application file for complete search history.

(56) References Cited

U.S. PATENT DOCUMENTS

| | | |
|---|---|---|
| 2012/0330549 A1 | 12/2012 | Dannevik et al. |
| 2013/0166266 A1* | 6/2013 | Herzig ................... G01W 1/10 703/6 |
| 2013/0325347 A1 | 12/2013 | Giorgetti et al. |
| 2016/0170627 A1 | 6/2016 | Watts et al. |
| 2016/0343093 A1 | 11/2016 | Riland et al. |
| 2017/0206615 A1 | 7/2017 | Sloop et al. |
| 2017/0213141 A1 | 7/2017 | Xu et al. |
| 2018/0005255 A1 | 1/2018 | Davey-Rogers |
| 2018/0322123 A1* | 11/2018 | Cousins ................ G06F 16/284 |
| 2020/0133254 A1 | 4/2020 | Cella et al. |

OTHER PUBLICATIONS

International Preliminary Report on Patentability and Written Opinion dated Sep. 9, 2022, of corresponding International Application No. PCT/US2021/020068.

Terciyanli, Erman, et al., Enhanced Nationwide Wind-Electric Power Monitoring and Forecast System, IEEE Transactions on Industrial Informatics, vol. 10, No. 2, May 2014, pp. 1171-1184.

Singapore Official Action dated Sep. 19, 2022, of counterpart Singapore Application No. 11202103577Q.

Canadian Official Action dated Sep. 22, 2022, of counterpart Canadian Application No. 3,114,445.

\* cited by examiner

| Model Name | select multiple | | | | | | | | | | | | | | | |
|---|---|---|---|---|---|---|---|---|---|---|---|---|---|---|---|---|
| Model Runs | select multiple | | | | | | | | | | | | | | | |
| FV Date/day | Calendar | | | | | | | | | | | | | | | |
| Fcst Variable | MaxT, MinT, Avg T, GWDD | | | | | | | | | | | | | | | |
| Study time | 14 days, 7 days, 5 days | | | | | | | | | | | | | | | |

| BIAS | 14 days | | | | | | | | | | | | | | | |
|---|---|---|---|---|---|---|---|---|---|---|---|---|---|---|---|---|
| Models | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

| RMSE | 14 days | | | | | | | | | | | | | | | |
|---|---|---|---|---|---|---|---|---|---|---|---|---|---|---|---|---|
| Models | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

| ERROR | 14 days | | | | | | | | | | | | | | | |
|---|---|---|---|---|---|---|---|---|---|---|---|---|---|---|---|---|
| Models | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

| STD OF ERROR | 14 days | | | | | | | | | | | | | | | |
|---|---|---|---|---|---|---|---|---|---|---|---|---|---|---|---|---|
| Models | Runs | 1 | 2 | 3 | 4 | 5 | 6 | 7 | 8 | 9 | 10 | 11 | 12 | 13 | 14 | 15 | 16 |
| GFS | 0Z | | | | | | | | | | | | | | | |
| GEFS | 0Z | | | | | | | | | | | | | | | |
| ECM | 0Z | | | | | | | | | | | | | | | |
| ECE | 0Z | | | | | | | | | | | | | | | |

FIG. 7A

| Date | FOD | 2/20/20 | 2/19/20 | 2/18/20 | 2/17/20 | 2/16/20 | 2/15/20 | 2/14/20 | 2/13/20 | 2/12/20 | 2/11/20 | 2/10/20 | 2/9/20 | 2/8/20 | 2/7/20 | 2/6/20 | 2/5/20 | 2/4/20 |
|---|---|---|---|---|---|---|---|---|---|---|---|---|---|---|---|---|---|---|
| GWESC-METR.GWDD | METAR | | | | | | | | | | | | | | | 25.4639 | 20.6791 | 10.3266 |
| GWESC.FCD1_12Z-GEFS.GWDD | 1 | | | | | | | | | | | | | | 26.2 | 34.485 | 25.768 | 12.411 |
| GWESC.FCD2_12Z-GEFS.GWDD | 2 | | | | | | | | | | | | | 21.374 | 27.615 | 32.101 | 23.061 | 12.22 |
| GWESC.FCD3_12Z-GEFS.GWDD | 3 | | | | | | | | | | | | 12.442 | 22.729 | 27.582 | 31.963 | 24.896 | 13.528 |
| GWESC.FCD4_12Z-GEFS.GWDD | 4 | | | | | | | | | | | 15.386 | 13.084 | 22.742 | 27.052 | 33.589 | 24.647 | 13.747 |
| GWESC.FCD5_12Z-GEFS.GWDD | 5 | | | | | | | | | | 21.943 | 17.286 | 14.756 | 24.163 | 26.378 | 32.353 | 26.37 | 12.369 |
| GWESC.FCD6_12Z-GEFS.GWDD | 6 | | | | | | | | | 24.254 | 21.893 | 15.856 | 18.506 | 24.807 | 29.189 | 34.845 | 21.146 | 15.091 |
| GWESC.FCD7_12Z-GEFS.GWDD | 7 | | | | | | | | 23.06 | 18.299 | 16.053 | 14.101 | 20.382 | 23.933 | 30.006 | 24.951 | 25.557 | 16.985 |
| GWESC.FCD8_12Z-GEFS.GWDD | 8 | | | | | | | 27.955 | 19.455 | 12.05 | 12.997 | 14.662 | 17.667 | 22.331 | 25.432 | 26.349 | 27.948 | 17.449 |
| GWESC.FCD9_12Z-GEFS.GWDD | 9 | | | | | | 26.168 | 29.386 | 12.041 | 16.348 | 13.833 | 14.516 | 18.08 | 21.994 | 26.572 | 27.565 | 26.71 | 21.061 |
| GWESC.FCD10_12Z-GEFS.GWDD | 10 | | | | | 19.373 | 32.39 | 15.352 | 21.411 | 13.655 | 16.63 | 14.146 | 18.221 | 23.304 | 24.01 | 26.828 | 28.591 | 23.003 |
| GWESC.FCD11_12Z-GEFS.GWDD | 11 | | | | 16.257 | 27.866 | 17.228 | 20.056 | 16.04 | 19.377 | 14.299 | 15.814 | 21.911 | 22.311 | 23.642 | 27.907 | 31.389 | 21.968 |
| GWESC.FCD12_12Z-GEFS.GWDD | 12 | | | 18.362 | 24.736 | 18.718 | 15.069 | 15.232 | 21.119 | 15.862 | 18.667 | 22.231 | 25.274 | 22.786 | 26.01 | 31.515 | 30.09 | 22.735 |
| GWESC.FCD13_12Z-GEFS.GWDD | 13 | | 21.483 | 23.276 | 19.803 | 15.395 | 14.592 | 18.986 | 15.212 | 22.414 | 24.099 | 29.52 | 23.54 | 24.084 | 27.411 | 30.884 | 30.73 | 24.514 |
| GWESC.FCD14_12Z-GEFS.GWDD | 14 | 23.068 | 25.71 | 19.322 | 17.766 | 13.71 | 18.616 | 19.457 | 25.004 | 28.853 | 31.959 | 21.931 | 23.073 | 24.318 | 26.761 | 29.739 | 27.931 | 21.088 |

| SYMBOL VALUE MARKER: | ARROW ▼ | MARKER LOCATION: | CHART EDGE ▼ |
| STUDY VALUE MARKER: | ARROW ▼ | MARKER LOCATION: | PRICE SCALE ▼ |

ADD CONDITION ALERTS ✕

EXPRESSION: [                    ]
COMMENT: [                    ]

[ OK ] [ CANCEL ]

FIG. 9F

| Model Hr | Model Day | GFS 12z % Comp | Average UTC Time | Local Time | 922 |
|---|---|---|---|---|---|
| 0 | 0 | | 15:23:41 | 9:23 AM | |
| 3 | 0 | | 15:26:31 | 6:02 AM | |
| 6 | 0 | | 15:28:47 | 6:05 AM | |
| 9 | 0 | 62.50% | 15:30:54 | 6:07 AM | |
| 12 | 0 | 75% | 15:33:12 | 6:09 AM | |
| 15 | 0 | 87.50% | 15:34:06 | 6:10 AM | |
| 18 | 0 | 100% | 15:35:06 | 6:11 AM | |
| 21 | 1 | | 15:35:55 | 6:12 AM | |
| 14 | 1 | | 15:36:55 | 6:13 AM | |
| 27 | 1 | | 15:37:47 | 6:14 AM | |
| 30 | 1 | 62.50% | 15:38:35 | 6:14 AM | |
| 33 | 1 | 75% | 15:39:36 | 6:15 AM | |
| 36 | 1 | 87.50% | 15:40:28 | 6:16 AM | |
| 39 | 1 | 100% | 15:41:19 | 6:17 AM | |
| 42 | 2 | | 15:42:13 | 6:18 AM | |
| 45 | 2 | | 15:43:09 | 6:19 AM | |
| 48 | 2 | | 15:44:02 | 6:20 AM | |
| 51 | 2 | | 15:44:58 | 6:21 AM | |
| 54 | 2 | 62.50% | 15:45:57 | 6:22 AM | |
| 57 | 2 | 75% | 15:46:51 | 6:23 AM | |
| 60 | 2 | 87.50% | 15:47:44 | 6:24 AM | |
| 63 | 2 | 100% | 15:48:40 | 6:24 AM | |
| 66 | 3 | | 15:49:33 | 6:25 AM | |
| 69 | 3 | | 15:50:29 | 6:26 AM | |
| 72 | 3 | | 15:51:26 | 6:27 AM | |
| 75 | 3 | | 15:52:20 | 6:28 AM | |
| 78 | 3 | 62.50% | 15:53:19 | 6:29 AM | |
| 81 | 3 | 75% | 15:54:14 | 6:30 AM | |
| 84 | 3 | 87.50% | 15:55:04 | 6:31 AM | |
| 87 | 3 | 100% | 15:56:00 | 6:32 AM | |
| 90 | 4 | | 15:56:47 | 6:33 AM | |
| 93 | 4 | | 15:57:47 | 6:34 AM | |
| 96 | 4 | | 15:58:41 | 6:35 AM | |
| 99 | 4 | | 15:59:42 | 6:36 AM | |
| 102 | 4 | 62.50% | 16:00:36 | 6:36 AM | |
| 105 | 4 | 75% | 16:01:26 | 6:37 AM | |
| 108 | 4 | 87.50% | 16:02:17 | 6:38 AM | |
| 111 | 4 | 100% | 16:03:16 | 6:39 AM | |
| 114 | 5 | | 16:04:21 | 6:40 AM | |
| 117 | 5 | | 16:05:11 | 6:41 AM | |
| 120 | 5 | | 16:06:05 | 6:42 AM | |
| 123 | 5 | | 16:07:10 | 6:43 AM | |
| 126 | 5 | 62.50% | 16:08:02 | 6:44 AM | |
| 129 | 5 | 75% | 16:08:53 | 6:45 AM | |
| 132 | 5 | 87.50% | 16:09:52 | 6:46 AM | |
| 135 | 5 | | 16:10:26 | 6:46 AM | |

FIG. 9H

| ⋮⋮ Weather Model Status | Real-time status ▼ | GFS 12Z | GFS Ens. 12Z | ECMWF 12Z | ECMWF Ens. 6Z | Time Step: 1 hr | 3 hr | 6 hr | Zulu Offset: 0 ▼ | ⟲ ≡ ✕ |
|---|---|---|---|---|---|---|---|---|---|---|
| Model Day | % Complete | Date | Day of Week | 3am | 6am | 9am | 12pm | 3pm | 6pm | 9pm | 12am |
| 1 | 100 | 11/27/20 | Fri | | | | 0 | 3 | 6 | 9 | 12 |
| 2 | 100 | 11/28/20 | Sat | 15 | 18 | 21 | 24 | 27 | 30 | 33 | 36 |
| 3 | 100 | 11/29/20 | Sun | 39 | 42 | 45 | 48 | 51 | 54 | 57 | 60 |
| 4 | 100 | 11/30/20 | Mon | 63 | 66 | 69 | 72 | 75 | 78 | 81 | 84 |
| 5 | 100 | 12/1/20 | Tue | 87 | 90 | 93 | 96 | 99 | 102 | 105 | 108 |
| 6 | 100 | 12/2/20 | Wed | 111 | 114 | 117 | 120 | 123 | 126 | 129 | 132 |

Green = model hour is complete    Yellow = model hour late more than 1 standard deviation    Red = model hour is missing

FIG. 10D

| Alerts | Add | Action ▼ | Export to CSV | | | | | |
|---|---|---|---|---|---|---|---|---|
| Quote Alerts | News Alerts | Condition Alerts | Time Alerts | Weather Alerts | Alert History | | | |
| Set Date | Fired Date | Location | Condition | Model Name | Model Run | Forecas... | Name | |
| ✓ 13:51:36 1... | | KORD | 2M Daily Avg... | ECMWF, ECM... | 12z | 1 - 17 | KORD 4 and 6... | |

| Regional GWDD | NG Futures Contracts | + | | | |
|---|---|---|---|---|---|

1010

Symbol List ▾ | Custom ▾ | Watch List ▾

| Symbol | Description | 2... | H... | C... | 1... |
|---|---|---|---|---|---|
| Gas Weighted L-48 - CONUS | | | | | |
| ▾ Gas Weighted L-48 - CONUS | | | | | |
| "GWUS" is the code for the lower 48- (a summary of 100 cities) each weig... | | | | | |
| estimated impact on US natural gas consumption | | | | | |
| HDDs + CDDs with adjustments to the traditional degree day formula to... | | | | | |
| GWUS MR0!-GFS | GWUS CONUS - GFS all runs | | | | |
| GWUS METR | GWUS CONUS - METAR Observation | | | | |
| Gas Weighted State | | | | | |
| ▸ Gas Weighted State [98] | | | | | |
| Gas Weighted Electricity Region | | | | | |
| ▸ Gas Weighted Electricity Region [28] | | | | | |
| Gas Weighted Census Region | | | | | |
| ▸ Gas Weighted Census Region [18] | | | | | |
| Gas Weighted EIA Storage Region | | | | | |
| ▸ Gas Weighted EIA Storage Region [12] | | | | | |
| Gas Weighted EIA Storage Sub Region | | | | | |
| ▸ Gas Weighted EIA Storage Sub Region [22] | | | | | |
| ▸ Vote to alter list [2] | | | | | |

Select Natural Gas Contract | +

1012

| GWUS-METR | HNG 1!-IUS ▾ | <-- Select NG Contra |
|---|---|---|
| | 12Z ▾ | |
| | GFS ▾ | |
| | MR4! ▾ | |

Weather Alert ✕

┌─ Alert Condition ─────────────────────────────────────┐

Alert Name │ KORD 4 and 6 Magic │

Location(s) │ KORD ✕ │ ◀── 1018

Forecast Parameters (Hover over digit field for UoM)

| 2M Daily Avg Temp 12 Hr Change ✕ ▼ | Greater Than ▼ | 4.0 | Or ▼ | 🗑 |
| 2M Daily Avg Temp 12 Hr Change ✕ ▼ | Less Than ▼ | -4.0 | And ▼ | 🗑 |
| 2M Daily Avg Temp official 30yr Anomaly ✕ ▼ | Greater Than ▼ | 6.0 | Or ▼ | 🗑 |
| 2M Daily Avg Temp official 30yr Anomaly ✕ ▼ | Less Than ▼ | -6.0 | Or ▼ | 🗑 |

1020 ↙

Add Parameter                                Threshold Helper

Note │ KORD 4 CHNG + 6 ANOM │

Commodity │ HNG 1!-IUS │ *

Action │ Bearish ▼ │

┌─ Model Settings ──────────────────────────────────────┐

Models          0z  6z  12z 18z
    ECMWF        ☐   ☐   ☑   ☐
    ECMWF ENS Mean ☐ ☐  ☑   ☐
    GFS          ☐   ☐   ☑   ☐
    GFS ENS Mean ☐   ☐   ☑   ☐

1022 ↗

Forecast Periods   ○ Days 1-5    ○ Days 6-10   ○ Days 1-17
                   ○ Next day    ○ Days 1-17   ○ Forecast day [    ] To [    ]

Forecast When  │ Greater Than ▼ │ 75.0 │ % Complete

┌─ Notification ────────────────────────────────────────┐

Day of use   ☑ Monday   ☑ Tuesday   ☑ Wednesday   ☑ Thursday ◀── 1024
             ☑ Friday   ☐ Saturday  ☐ Friday To change UoM Tools -> Preferences -> Currency and Unit       [ OK ]  [ Cancel ]

FIG. 10G

Add Weather... — 1026

Type — 1028
- Guidance | Accumulation | Progression | Alpha Micro | Alpha Macro

Location(s) — 1030
- KORD ×
- ☐ Plot Average of Selected Locations

Time Interval — 1032
- Hourly | Daily

Parameter(s) — 1034
- 2M Hourly Temp ×
- Interpolation: Interpolated Data
- Preliminary Daily Values:

Model(s)
- GFS Op. 25 Deg | GFS ENS Mean | GFS ENS Summary Stats | GFS ENS Percentile Rank
- ECMWF | ECMWF ENS Mean | ECMWF ENS Summary Stats | ECMWF ENS Percentile Rank The ECM, ECE & ECEX data is based on data and products of the European Center for Medium-Range Weather Forecast (ECMWF)

Run(s)
- Current | 0z | 6z | 12z | 18z
- Curr - 6hr | Curr - 12hr | Curr - 18hr | Curr - 24hr

Climatology
- +10yr | +15yr | +30yr | Official 30yr | ☐ Add Summary statistics

Observations

— 1036
- ☑ Observations Real-time (METAR)
- ☐ Summary statistics (Convert data to OHLC)
- Wayback (Forecast as of): Wayback Note:
Change Unit of Measure: Tools > Preferences > Currency and Units
Change AM/PM Colors: Chart Display Properties > Text & Colors > Background
Change Wx Model Colors: Chart Display Properties > Plot Colors Add | Apply | Close

Add Weather... ✕

Type
[ Guidance ] [ Accumulation ] [ Progression ] [ Alpha Micro ] [ Alpha Macro ]

Location(s)
[ GWUS ✕                                                              ▼ ]

Parameter(s)
[ GWDD ✕                                                              ▼ ]

Model(s)
[ GFS Op. 25 Deg ] [ GFS ENS Mean ] [ ECMWF ] [ ECMWF ENS Mean ]

The ECM, ECE & ECEX data is based on data and products of the European Center for Medium-Range Weather Forecast (ECMWF)

Run(s)
[ Current ] [ 0z ] [ 6z ] [ 12z ] [ 18z ]
[ Curr - 6hr ] [ Curr - 12hr ] [ Curr - 18hr ] [ Curr - 24hr ]

Climatology
[ + 10yr ] [ + 15yr ] [ + 30yr ] [ Official 30yr ]

Observations
[                                                                      ▼ ]

Wayback (Forecast as of): [ Wayback ] ☐
Period: [ 10/01/2020 ] ☐ — [ 10/31/2021 ] ☐

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ▼ ] [ Apply ▼ ] [ Close ]

| Add Weather... | ✕ |

Type
[ Guidance ] [ Accumulation ] [ Progression ] [ Alpha Micro ] [ Alpha Macro ]

Location(s)
[ GWUS ✕ ] ▼

☐ Plot Average of Selected Locations

Parameter(s)
[ GWDD ✕ ] ▼

Target Date: [ -1 day ▼ ] ☐

Model(s)

| GFS Op. 25 Deg | GFS ENS Mean | GFS ENS Summary Stats | GFS ENS Percentile Rank |
| ECMWF | ECMWF ENS Mean | ECMWF ENS Summary Stats | ECMWF ENS Percentile Rank |

The ECM, ECE & ECEX data is based on data and products of the European Center for Medium-Range Weather Forecast (ECMWF)

Run(s)
[ Current ] [ 0z ] [ 6z ] [ 12z ] [ 18z ]

☑ Observations Real-time (METAR)

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ▼ ] [ Apply ▼ ] [ Close ]

Add Weather...                                                                                       ✕

┌─ Type ─────────────────────────────────────────────────────────────────────────┐
│  [ Guidance ]  [ Accumulation ]  [ Progression ]  [ Alpha Micro ]  [ Alpha Macro ] │
└────────────────────────────────────────────────────────────────────────────────┘

Location(s)
[ GWUS ✕                                                                      ▼ ]

Parameter(s)
[ GWDD 12 Hr Change ✕ ] [ GWDD official 30yr Anomaly ✕ ] [ GWDD ✕ ] [ 2M Hourly Temp ✕ ]  ▼

Interpolation: [ Interpolated Data ▼ ]

Preliminary Daily Values: [                    ▼ ]

Model(s)

[ GFS<br>Op. 25 Deg ]   [ GFS ENS<br>Mean ]   [ ECMWF ]   [ ECMWF ENS<br>Mean ]

The ECM, ECE & ECEX data is based on data and products of the European Center for Medium-Range Weather Forecast (ECMWF)

Run(s)
[ Current ]  [ 0z ]  [ 6z ]  [ 12z ]  [ 18z ]
[ Curr - 6hr ] [ Curr - 12hr ] [ Curr - 18hr ] [ Curr - 24hr ]

Wayback (Forecast as of): [ Wayback ] ☐
Commodity: [ HNG 1!-IUS      ▼ ] 🔍

Note:
Change Unit of Measure: Tools > Preferences > Currency and Units
Change AM/PM Colors: Chart Display Properties > Text & Colors > Background
Change Wx Model Colors: Chart Display Properties > Plot Colors

[ Add ]  [ Apply ]  [ Close ]

FIG. 10K

SYSTEMS AND METHODS FOR CONVERTING LIVE WEATHER DATA TO WEATHER INDEX FOR OFFSETTING WEATHER RISK

TECHNICAL FIELD

The present disclosure generally relates to improving data structure distribution and, in particular to distribution systems, interactive graphical user interfaces (GUIs) and methods for the integration of disparate data structures for interaction and meaningful information about the combination of disparate data types, including real-time integration of weather and market data structures and real-time weather indices.

BACKGROUND

Problems exist in the field of digital distribution platforms. In general, a digital distribution platform may manage digital data content (e.g., digital goods, digital information, etc.) and distribute the content to various end-users. Conventional platforms may distribute digital data content from one or more data sources (e.g., data feeds, data files, user input and the like) that may be distributed across one or more networks, may include different data types, different data formats, different data communication requirements, different network security, different availability time periods and the like. Moreover, distribution platform may distribute data content in one or more distribution formats (e.g., in a data file, on a user interface, in a spreadsheet and the like), to particular end-users with varying amounts of data and/or personalized data and the like. Conventional platforms also exist that may provide the ability for user-interaction with the distributed data (e.g., data analysis tools, actions that may be performed with the data and the like) in addition to the presentation of distributed digital data content.

All of the above variables associated with data distribution make it technically difficult to manage data distribution and interaction for real-time distribution. Yet further, distribution of digital data content in real-time becomes increasingly difficult as the volume of digital data content to be distributed increases and/or as the digital data content changes more rapidly over time (e.g., with increasing volatility of the data content). For example, it may become increasingly technically difficult for a distribution platform to continually update an interactive user interface with the most up-to-date data content, when the data volume increases and/or the data content itself changes rapidly. In such instances, any transmission delays over one or more networks to obtain the data content coupled with any data handling delays by the distribution platform for handling the received data content (e.g., to convert a data format of received data content, to normalize any data content, to remove any data content not suitable for presentation, to generate data for distribution in one or more distribution formats, create aggregated output data, generate any user interfaces and the like) may introduce significant errors in distributed data and the ability by the end-user to interact with the distributed content. For example, the distributed data content may not provide the most up-to-date information, leading to a situation in which a user may perform an action based on stale information (e.g., an auction for an object at a price that no longer exists, respond to older data content when newer content exists, etc.).

Another significant technical problem that still exists in data distribution platforms includes the integration of data content for distribution that includes disparate data types. For example, while it may be possible to simply display disparate data types on user interface side-by-side, it may be difficult to integrate disparate data types in an intelligent manner, e.g., where the integration of the disparate data types provides meaningful information about the combination of disparate data types. For example, a first data type may include data values that are based on one set of underlying index values whereas a second (different and independent) data type may be based on a completely different and unrelated set of underlying index values. Thus, it may be technically difficult to suitably align and integrate disparate data types. It may be still more difficult to integrate disparate data types with real-time, rapidly changing data.

Accordingly, there is a need for a system (including a novel interactive GUI), and method for integrating and distributing disparate data types in a fully-automated (or near fully-automated) manner. All of this, without significant increases to the computational burden, cost, system complexity, re-programming requirements and system maintenance.

SUMMARY

Aspects of the present disclosure relate to systems, methods and non-transitory computer readable mediums for converting live weather data to a weather index for offsetting weather risk. A system includes one or more weather data source systems and a data distribution system in communication with the one or more weather data source systems via at least one network. The one or more weather data source systems are configured to generate one or more weather data streams. The one or more weather data streams include weather forecast model data and weather observations data. The data distribution system is configured to receive a weather index request; identify at least one instrument and at least one location associated with the weather index request; extract weather risk indication data among the one or more weather data streams associated with the identified at least one location based on one or more predefined parameters associated with the identified at least one instrument; convert the extracted weather risk indication data into a set of weather index values corresponding to the at least one location, based on a predetermined algorithm associated with the identified at least one instrument; generate a weather index presentation package comprising the set of weather index values for distribution to at least one user device; and update the weather index presentation package being distributed concurrent with changes to weather risk indication data.

BRIEF DESCRIPTION OF DRAWINGS

FIG. 7A is an example initiation screen for generating an accuracy chart, according to an aspect of the present disclosure.

FIG. 7B is an example accuracy chart associated with an accuracy weather perspective, according to an aspect of the present disclosure.

FIG. 8A is an example user interface illustrating examples of symbology construction, according to an aspect of the present disclosure.

FIGS. 9A, 9B, 9C, 9D, 9E, 9F, 9G and 9H are screenshots of an example interactive GUI for providing interactive tools for viewing and interacting with integrated weather and market data, according to an aspect of the present disclosure.

FIGS. 10A, 10B, 10C, 10D, 10E, 10F, 10G, 10H, 10I, 10J and 10K are screenshots of an example interactive GUI for providing interactive tools for viewing and interacting with integrated weather and market data, according to another aspect of the present disclosure.

DETAILED DESCRIPTION

Figure 1:
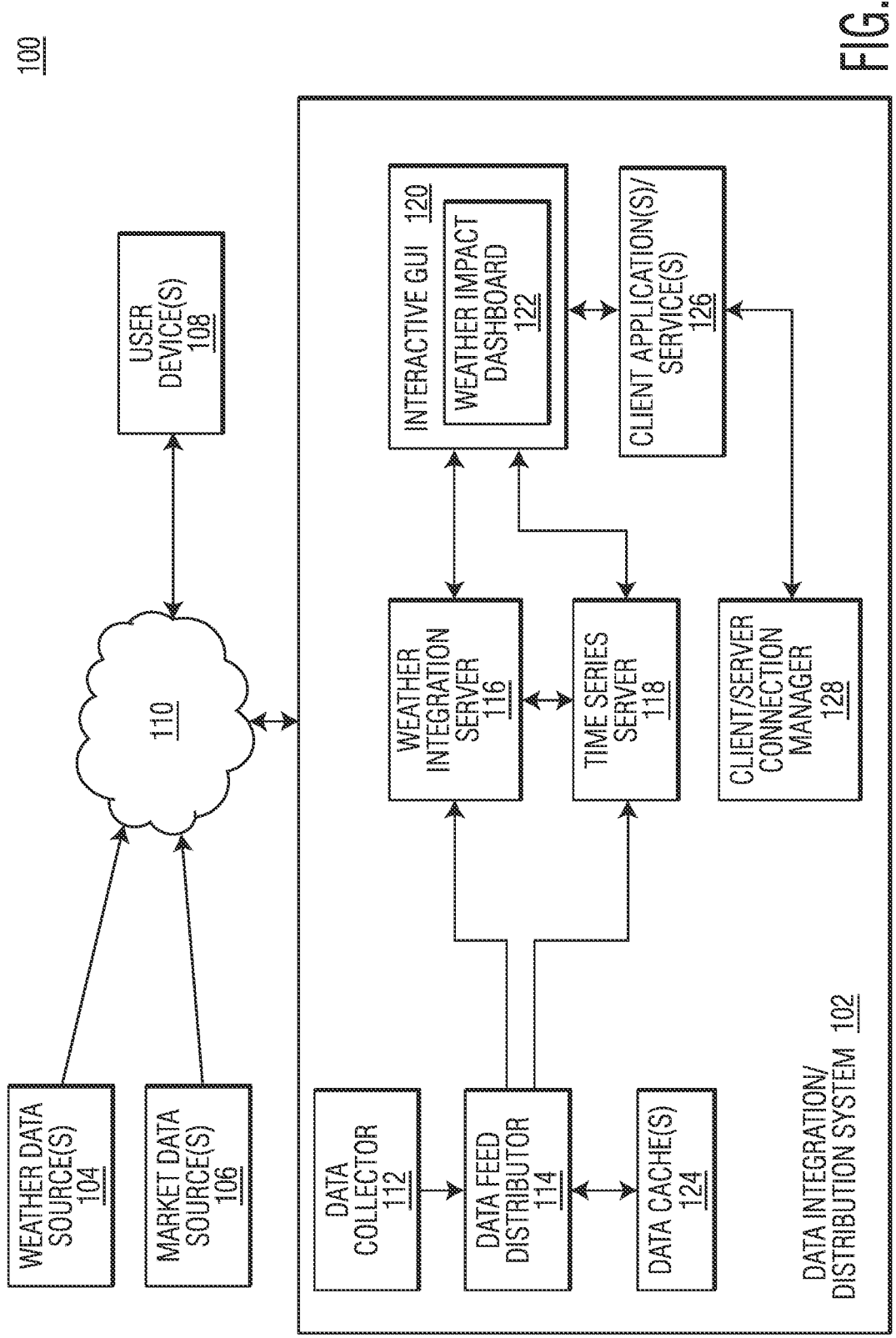
FIG. 1 is a functional block diagram of an example data distribution environment, according to an aspect of the present disclosure.

As discussed above, problems exist in the integration and distribution of disparate data types, including in a fully-automated (or near fully-automated) manner. One such combination of disparate data types involves weather data and market data. Each of these disparate data types may include historical data values, current (e.g., streaming/live) data values and future (e.g., forecast) data values. Each of these disparate data types also rely on underlying data and information that may be rapidly changing. Yet further, each of these disparate data types involve large volumes of data. For example, market data typically involves tens, if not hundreds, of thousands of live indications available to display at any given time, and where changes to market data may occur hundreds, if not thousands of times in a second. Similarly, weather data may involve continually changing weather observations from among a large number of locations (e.g., on a global scale, on a country-level scale, on a state-level scale, etc.), as well as weather forecast model data that may include a number of different models, and which models may be updated at different update intervals. All of the above variables make it technically difficult to manage data distribution and interaction for real-time distribution. Because weather and market data are also disparate data types, it becomes still further technically difficult to integrate both data types in an intelligent and meaningful manner in an interactive display, to provide insights into both data types (e.g., any correlations, predictive effects of one data type on the other data type and the like). Market data, such as market price data may be accessed in watch-lists, data tables, data grids, spreadsheets (e.g., Microsoft® Excel® via (real time data (RTD) links embedded into Excel), as well as interactive charts. These are basic functions of many conventional trading desktops (e.g., trading desktops provided by Bloomberg™, Refinitiv™ (e.g., Eikon™), Global View, DTN Exchange® and others) within the electronic financial trading community. These trading desktops were born in the 1980's and continue to evolve into highly specialized tools, designed to instantly display market data (using a time series server based technology) which was optimized for data delivery speed for viewing and interacting with market price data. Some conventional systems support plotting real-time market prices in real-time with updating charting tools.

Weather data has also experienced a similar evolution. Conventional interactions with weather data has been primarily using weather maps, considering it was the most efficient manner to view large amounts of data using a single image. Over the years, processing became more powerful and bandwidth became more plentiful, and both processing and bandwidth have become more affordable. The weather forecast models themselves became significantly larger in file size and the speed to process these larger weather forecast files, into maps, for internet based delivery (as opposed to fax) became the focus. At the same time, the increased computational power also allowed for the extraction of raw weather forecast 'data' from these computer-based files, could quickly convert the forecast files (e.g., in a native file format such as gridded binary format (GRIB) files) and deliver city or zip code based weather forecasts in a few minutes. From this raw 'data', the creation of timely weather forecast charting tools to display a specific city's weather forecast, over the next few days, became popular, for example, on webpages and eventually cellphones.

The present disclosure is the first to combine these two existing charting capabilities into a unique weather charting and analysis tool that integrates both weather and market data (i.e., disparate data types), including in some examples both streaming weather data and streaming market data. In some examples, time series server based technology inside a trading desktop may be leveraged and used to uniquely create a one of a kind weather "weather symbology." The specialized symbology allows weather forecasts to be plotted "in exchange time", meaning the specific time when that weather forecast "element" was made available into the public domain (e.g., a forecasted temperature, wind, humidity, etc. and/or a value-added calculation which may convert forecasted temperature into a value representing forecasted natural gas consumption called a Gas Weighted Degree Day (GWDD), etc.) as opposed to an "Interval start" time which displays the same forecast "element" (e.g., a predetermined number of days, such as 16 days forward). Importantly, the system of the present disclosure may contain pre-defined information in the symbology such as a weather model name, weather location, a "Forecast Valid Date (or Forecast Valid Day), Time of Day" and model hour in the future. The unique capability created by the present disclosure and offered inside a trading desktop of the present disclosure is the ability to instantly and easily visualize "Weather Alpha", which is the weather's financial impact on various traded market prices. For example, if a weather forecast for say "Forecast Valid Day 9" was significantly colder than the previous weather forecast and was released into the public domain at 10:31:12 am, which that streaming information (in some examples) then caused the price of Natural Gas, traded on an electronic Exchange, to move 5 cents in the following 10 seconds (after the release of this weather news/forecast data), users of a trading desktop of the present disclosure (also referred to herein as ICE Connect or ICE Connect's Trading Desktop) would have valuable insight over weather users, who simply review weather maps, or interact with weather data via some disparate source, which is not integrated with electronically traded market prices.

While this process of matching the "exchange time" (aka data receipt times) of both weather forecast data and market price data may appear simple on the surface, there are many complexities. The problems arise because conventional trading desktops were originally designed to handle prices for stocks, which involves plotting the market price with an "exchange time" (aka receipt time). Futures and forward contracts were subsequently incorporated and specialty views were created to accommodate an instrument which has a current market price in "exchange time" (aka receipt time) but also represents some point in the future. So a new symbol structure was created to represent these futures/forward contracts which represent future times the traded contract will expire, (such as a January natural gas contract, February, natural gas, etc.). These monthly futures contracts can also be stitched together to see a "forward curve" view (e.g., the January contract+February contract+March+ etc.) and all those individual market prices may be updated in real-time respectively.

The present disclosure handles weather data in a similar manner; in which a 16 day weather forecast (for example) is formed similar to a "forward curve." Each weather forecast may be stitched together (as it updates multiple times per day) thus creating a "forward curve" of a "forward curve." In some examples, the present disclosure allows users to interact with this weather data in one or more (e.g., three) primary user-weather perspective(s) to help organize the potentially multiple aspects of time related to the (e.g., streaming) data). The weather perspective(s) represent a type of (software) workflow that may provide access (e.g., visualization, observation and/or interaction tools) to weather data from different perspectives (e.g., slices of a database of weather data), thereby enhancing the symbology structure and respective user-experience. In some aspects, the present disclosure may create a particular weather symbology to provide weather visualization/observation/interaction tools including one or more weather perspectives (e.g., three), and a weather alpha workflow that combines weather and market data. Significantly, such a weather alpha workflow has not been accomplished prior to the present disclosure. Advantages of the present disclosure include an integrated presentation package (including in some examples one or more weather forecast charts, tables, grids (e.g. where a user may select a particular area of the grid and a predetermined (e.g., streaming) view of weather and market data may be generated responsive to the selection), etc. integrated (e.g., overlaid) with market data). In some examples, the weather perspectives may be configured to provide more efficient access to weather data in an optimal manner, resulting in user interfaces that quickly render any suitable chart, table, analytic value extremely fast using static, periodic, aperiodic and/or streaming data.

In some examples, aspects of the present disclosure relate to weather integration systems and interactive GUIs that improve streaming weather data in an efficient manner into an electronic trading desktop (as well as other client applications). Weather integration systems of the present disclosure are unique in that the functionality of streaming weather forecast data into a trading desktop and combining (integrating) the weather data with streaming market data (e.g., streaming price data) to create actionable knowledge does not exist outside of the present disclosure. The weather integration system is able to provide more credible weather forecast models that may be made available from a greater number of weather data sources. The weather integration system may also provide forecasts that extend farther out in time and may be configured to update the weather forecast data with higher temporal and spatial resolution creating larger and larger file sizes, It is understood that the ability to handle and process an ever growing amount of data is a technical problem, thus the ability to handle and process streaming raw data, and convert this streaming data into actionable knowledge via an interactive GUI (as performed by the systems of the present disclosure) represent a technical solution to a technical problem.

In some examples, weather integration systems and interactive GUIs of the present disclosure provides a unique technique of integrating data in an exchange time to line up changing perceptions of weather forecast model(s) with changes in market prices. The weather integration system creates a unique weather symbology that is optimally designed to blend with other data streams which are configured to operate within a time series server. In general, the weather symbology may be configured for both weather data streams and non-weather (e.g., market data) data streams. The weather integration system of the present disclosure may be configured to provide access to raw data via optimally arranged dataset(s) in a manner that may be helpful for indicating an impact of weather data on market data, such as providing user interfaces for back-testing changing market prices as they are associated with changing weather perspectives. In some examples weather data (e.g., streaming and/or static data) may utilize the novel symbology of the present disclosure, which allows weather data (live and/or historical data) to flow seamlessly through a trading desktop (e.g., for interactive presentation on a GUI), as well as for providing weather data to external systems (e.g., for further analysis, visualization, etc.). The symbology of the present disclosure is unique in that it employs the smallest possible building blocks to organize weather data in nearly any possible (user-customizable) manner. The highly granular symbology of the present disclosure allows users of a trading desktop to review weather data in a manner similar to market price data as well as combine any element of weather with any granular element of market price data.

The weather integration systems and interactive GUIs of the present disclosure provide users with unique advantages, including indicating precisely how changing weather perspectives may directly influence market prices. The weather integration system may provide various weather maps, various weather data and various value-analytics.

The weather maps may include, in some examples, weather maps as part of a robust weather maps application which may stream thousands of maps for each forecast hour from various government entity weather models being released into the public domain. The weather maps provided by the weather integration system may be provided very rapidly, and may configured to provide comprehensive information in a manner that is easy to use (e.g., user-friendly). Weather data provided by the weather integration system may be provided quickly and in a manner to be easily assessable. In some examples, the weather data may include, without being limited to, one or more of a forecast confidence (risk), a forecast volatility, a forecast accuracy; a forecast alpha and a rich history of historical forecasts and/or observations. The weather integration system may provide value-added analytics be configured to instantly convert weather data into accurate and actionable knowledge, tailored specifically for traded instruments, including, in a non-limiting example, to one or more of Gas Weighted Degree Day (GWDD), Electricity Weighted Degree Day, Propane Weighted Degree Day, Heating Oil Weighted Degree Day and the like.

In some examples, the weather integration system of the present disclosure may be configured to convert extremely large streams of weather and price data into actionable knowledge, including in a manner that is faster than conventional systems, and provides improved technical features including improved data speed, reliability, comprehensive data, a unique weather symbology that does not exist outside of the present disclosure and unique transformative weather workflows.

In some examples, the weather integration system may be configured to provide a data speed to ingest, process and deliver global government weather forecast (e.g., raw) data, to users, in both data and map formats with low latency. In some examples, the weather integration system may be provide improved reliability of weather data, including the ability to acquire, render and transmit (raw) weather data in a low latency fashion into various types of weather delivery mechanisms. In some examples, the weather integration system may provide comprehensive weather data, by using high (including highest) resolution data and accurate (including most accurate) data versions, of the most critical global weather forecast models (which few (if any) other weather providers currently offer), as well as an enhanced temporal and spatial resolution.

In some examples, the weather integration system may provide a unique weather symbology having unique symbol elements (also referred to herein as "Weather Legos"). The Weather Legos may be configured to breakdown streaming weather data into the smallest possible building blocks to power a time series server-based trading desktop, allowing users to instantly and easily interact with both weather and price data (e.g., through time & space). In some examples, "Weather Legos" allow users to create any weather display imaginable, or easily replicate a favorite display from another source. In some examples, the weather integration system may provide transformative weather workflows, which workflows may provide an improved speed of understanding the impact of weather including on market data. The workflows may leverage the "Weather Legos" and improved data speed, together with the full power of an electronic trading desktop, to create unique displays that allow users to more quickly and more precisely understand how changes in perceived weather may directly influence market prices. The unique displays of the present disclosure transform how market prices interact with weather data in the financial community. The displays of the present disclosure allow users to convert more weather and price data into actionable knowledge, and in a manner that is faster than conventional systems.

The weather integration system of the present disclosure are also unique in that it fully integrations two unique workflows (weather and market data, an example of disparate data structures) that are conventionally handled in a completely separate manner, because conventional systems were unable to integrate the two streaming workflows due to the technical complexities of the weather and market workflows. Instead, at best, some conventional trading desktops may simply provide access to weather (e.g., via i-frames) but cannot provide integrated weather and market data (e.g., weather data overlaid with market data). The weather integration system of the present disclosure (including the end-to-end infrastructure) is the first and only weather integration system of its kind. In some examples, the weather integration system may provide opportunities to scale electronic trading operations geared to leverage changing weather perspectives across many different asset classes, and may provide unique displays that improve identification of trading opportunities, including faster identification of trading opportunities.

In some examples, the weather integration system may derive one or more preliminary daily forecast variables (e.g., daily average temperature, gas weighted degree day (GWDD), heating degree day (HDD), cooling degree day (CDD), etc.), and may provide a "% Complete" value prior to the particular model's completion of that forecast day. In other words, each forecast day may have twenty four forecast model hours. When the noon forecast arrives, twelve of the twenty four possible forecast model files exist, in the public domain, so that the forecast day is 50% complete. When the 1 pm forecast model data arrives, the forecast day is now 54% complete, and so on. This innovative approach provides users valuable preliminary daily forecast data which may be directionally accurate. In other words, users may be presented a forecast day before (e.g., approximately about 4 minutes before) other weather vendors post their daily forecast data (from the same government weather forecast model).

In some examples, the weather integration system may provide an improved speed of understanding of weather and market data. The unique weather workflows (weather alpha and perspective workflows, described further below) allows users to make more informed and faster weather and price decisions. The same centralized weather workflows may easily allow a user to scale this unique process across an electronic trading floor and across electronically traded instruments, thereby allowing each trader to more easily monitor multiple traded markets, as it relates to changing weather perspectives (e.g., with greater accuracy and faster speed).

In some examples, the weather integration system may provide comprehensive model data, including higher resolution forecast data from government entity models. Because the weather integration system may provide a low latency infrastructure, the weather integration system, in some examples, may be configured to move large amounts of data around the world in seconds. This unique infrastructure may be leveraged to extract higher resolution versions of various forecast data including, in some examples, higher resolution versions of the GFS, GFS ENS, ECMWF and ECMWF ENS models. In some examples, the weather integration system may provide model data with enhanced spatial resolution (e.g., ¼ degree, whereas conventional resolution may be ½ degree) and enhanced time (temporal) resolution. In some examples, enhanced spatial resolution may provide a slightly more accurate weather model version (e.g., picking up on micro climates) which lower resolution versions may not be able to provide. In some examples, enhanced temporal resolution may include hourly time steps, meaning that users may receive forecast updates, for example, every 20 seconds. In contrast, conventional temporal resolution may be about three hourly updates which may occur every 60 seconds. In addition, in some examples, twenty four model hours (e.g., time steps) may be included in the first five days (120 hrs) of the GFS weather forecast model.

In some examples, the weather integration system may leverage the unique weather symbology combined with streaming market price data (e.g., market data stream(s) together with a trading desktop functionality to create an almost limitless combination of symbol element ("Weather Legos") designs to provide unique interactive GUIs, client applications, client services and trading desktop applications. In some examples, the weather symbology is configured to treat weather data like a traded instrument, so any weather symbol may be entered directly into a chart, table, watchlist, etc. to view the weather data directly. In some examples, the weather symbology may be configured to operate in trading desktops, spreadsheet applications and with one or more object-oriented programming languages (e.g., Python™).

In some examples, weather data may be accessed in real-time using the symbol elements, and the weather integration system may be configured to leverage both streaming weather data and streaming price data inside an electronic financial desktop. The unique weather symbol elements may also allow weather data to be accessed from one or more separate directions, including, in some examples three primary weather perspectives, including guidance, progression and (forecast) accuracy perspectives.

In some examples, the guidance perspective may be configured to assess weather forecast risk and confidence. For example, if all of the weather forecasts agree, there is less risk embedded into the market prices. Alternatively if there is a wide range in the forecasts, then there is greater risk (less confidence) in the perceived future weather, presenting greater price volatility of the market prices. In some examples, the progression perspective may be configured to assess a 'run-to-run' forecast volatility as well as how all weather forecast models relate to each other. In some examples, the progression perspective may use the principles of convergence and mean reversion to help users spot short-term and longer-term electronic trading opportunities. In some examples, the accuracy perspective may be suitable for users who take (or make) physical delivery of weather-related instruments such as power, natural gas, natural gas liquids and the like. For example, often there is a disconnect between the perception of the weather, at the time a monthly futures contract expires, versus what weather will actually occur inside of that month. It is important to understand the probability a weather forecast will be accurate (or inaccurate). The accuracy perspective may aid in such an understanding.

Referring now to FIG. 1, a functional block diagram of an example data distribution environment 100 (environment 100 herein) is shown. Environment 100 may include data integration/distribution (DID) system 102, one or more weather data sources 104, one or more market data sources 106 and one or more user devices 108 (associated with at least one user). In some examples, one or more components of environment 100 (e.g., DID system 102, weather data source(s) 104, market data source(s) 106 and/or user device(s) 108) may be communicatively coupled via one or more networks 110. Network(s) 110 may include, for example, a private network (e.g., a local area network (LAN), a wide area network (WAN), intranet, etc.) and/or a public network (e.g., the Internet).

Weather data source(s) 104 may include, without being limited to, weather forecast model sources, one or more weather observations data sources associated with one or more locations and the like. In some examples, sources for weather forecast model(s) may provide weather model data for generating weather forecasts for one or more geographical regions. In one non-limiting example, the weather forecast model source(s) may include one or more of National Oceanic and Atmospheric Administration (NOAA) United States (US) Global Forecast System (GFS), NOAA GFS global ensemble (GFS ENS), NOAA GFS global ensemble Extension (GFS ENS EXT), NOAA's Climate Forecast System Ensemble model (CFS ENS), European Center for Medium-Range Weather Forecast (ECMWF), ECMWF Ensemble, ECMWF Ensemble Extension (ECMWF EXT), ECMWF Seasonal model (SEAS) and its corresponding extension model (SEAS EXT) and other gridded binary format (GRIB) weather forecast model source(s). In general, a weather forecast model source may run a weather forecast model (e.g., periodically such as quarterly, monthly, multiple times per week, one or more times per day, asynchronously, in response to a predetermined condition, etc.) and may provide weather forecast data for up to a predetermined number of days. For example, the model for the GFS is run four times a day and may produce forecasts for up to 16 days in advance and run, for example, four times per day. As another example, the CFS ENS may run daily and may forecast out nine months into the future. In one non-limiting example, source(s) for weather observations data may include one or more of Meteorological Aerodrome Report (METAR) data and Climate Forecast System (CFS) data including CFS Reanalysis (CFS-R) data for one or more locations (e.g., one or more airports, weather stations, etc.). In some examples, CFS-R data may be used to provide global observation estimates, for an even greater number of weather parameters, as estimates which METAR sensors and/or limited physical locations may not provide. In general, weather observations data may be updated periodically (e.g., hourly, daily, monthly, quarterly, etc.), and may include various weather data (e.g., temperature, dew point, wind direction, wind speed, precipitation, cloud cover, visibility, barometric pressure and the like, as well as derived values such as GWDD) for one or more weather observation locations. In general, weather data source(s) 104 may include any suitable weather data sources for weather forecast model(s) and weather observations data associated with one or more locations. In general, weather data source(s) 104 that may be in communication with DID system 102 may comprise a server computer, a desktop computer, a laptop, a smartphone, or any other electronic device known in the art configured to capture data, receive data, generate weather forecast model data, store data and/or disseminate any suitable weather data.

Market data source(s) 106 may include, in general, any electronic source for market data (e.g. price data and/or trade-related data associated with one or more tradeable financial instruments). Non-limiting examples of types of market data that may be provided by market data source(s) 106 may include one or more of equities data, derivatives data, data associated with one or more indices, market depth data, energy market data, fundamental data, inter-dealer broker (IDB) data and over-the-counter (OTC) market data. In some examples, market data source(s) 106 may also include one or more news sources that may provide information associated with market data (e.g., observations on market data trends, news stories that may affect market data and the like). In some examples, fundamental data may include one or more sources which contain structured and/or non-structured data which may provide information associated with market data impacting supply, demand and/or transportation (such as shipping data, electricity emissions, natural gas pipeline flows, etc.). In general, market data source(s) 106 that may be in communication with DID system 102 may comprise a server computer, a desktop computer, a laptop, a smartphone, or any other electronic device known in the art configured to capture data, receive data, store data and/or disseminate any suitable market data.

User device(s) 108 may include, without limit, any combination of mobile and/or stationary communication device such as mobile phones, smart phones, tablets computers, laptop computers, desktop computers, server computers or any other computing device configured to capture, receive, store and/or disseminate any suitable data. In some examples, user device(s) 108 may include one or more external computer systems configured to receive weather and/or market data as processed by DID system 102, and may provide additional analysis, user interaction and/or distribution functionality. In one embodiment, user device(s) 108 may include a non-transitory memory, one or more processors including machine readable instructions, a communications interface which may be used to communicate with DID system 102, a user input interface for inputting data and/or information to user device(s) 108 and/or a user display interface for presenting data and/or information on user device(s). In some examples, the user input interface and the user display interface may be configured as a graphical user interface (GUI) (such as interactive GUI 900 shown in FIGS. 9A-9H). User device(s) 108 may also be configured to provide interactive GUI 120 of DID system 102 on the GUI of user device(s) 108. In some examples, user device(s) 108 may include computer system 1100 (shown in FIG. 11).

DID system 102 may include data collector 112, data feed distributor 114, weather integration server 116, time series server 118, interactive GUI 120, one or more data caches 124, one or more client applications and/or services 126, one or more data caches 124, and client/server connection manager 128. In some examples, one or more components 112-128 of DID system 102 may communicate with each other via a data and control bus (not shown). Although DID system 102 is shown in FIG. 1 as one component (e.g., a server), DID system 102 may include one or more components (e.g., one or more servers), whether co-located or linked across one or more networks.

Although not shown, DID system 102 may include at least one processor (e.g., processing device 1102 shown in FIG. 11) and non-transitory memory (e.g., memory 1106 shown in FIG. 11) storing one or more routines and or algorithms for performing the functions of DID system 102 described herein. An example implementation of one or more components of DID system 102 is shown by computer system 1100 (shown in FIG. 11).

In some examples, DID system 102 may obtain weather data and market data from among respective weather data source(s) 104 and market data source(s) 106 via data collector 112. Although not shown, data collector may include one or more input and/or output interfaces (e.g., an electronic device including hardware circuitry, an application on an electronic device) for communication with other components of environment 100 (e.g., weather data source(s) 104 and market data source(s) 106 (and, in some examples user device(s) 108).

Data collector 112 may be configured to obtain weather and market data through any suitable electronic data collection technique. For example, data collector 112 may obtain data through or more data feeds (including streaming (live) data feed(s)), one or more file transfers (including, in some examples, one or more secure file transfers), by data being pushed to DID system 102 and/or by DID system 102 pulling and/or extracting data and/or information from among weather data source(s) 104 and/or market data source(s) 106. In some examples, data collector 112 may include security protection (e.g., encryption, decryption) to protect the integrity of the obtained data.

In some examples, data collector 112 may perform one or more of filtering, data normalization, data reformatting, data aggregation and the like. In some examples, electronic data that may be obtained by data collector 112 may include data that may be unable to be processed, data that includes one or more errors and the like. In some examples, different sources among weather data source(s) 104 and market data source(s) 106 may transmit data with various unique, non-standard values and/or data formats (e.g., proprietary formats). Furthermore, data content may correspond to different forms of data, such as different currencies, date formats, time periods, etc.

Non-limiting examples of data filtering that may be performed by data collector 112 may include excluding null data values, excluding corrupted data, excluding outlier data values (e.g., a data value outside of a pre-defined value range, outside of a pre-defined time range) and the like. In some examples, data collector 112 may reformat the collected data to one or more common formats and/or normalize the collected data. In some examples, data collector 112 may be configured to aggregate and/or combine at least a portion of the collected data (e.g., according to one or more pre-defined categories (such as a type of data, one or more predetermined time periods, etc.)).

Data feed distributor 114 may be configured to receive the collected data from data collector 112. Data feed distributor 114 may also be configured to communicate with weather integration server 116 and time series server 118. In some examples, data feed distributor 114 may also be configured to communicate with client application(s)/service(s) 126. In some examples, data feed distributor 114 may also be configured to communicate with data cache(s) 124.

In general, data feed distributor 114 may be configured to process the received data (e.g., the collected market and weather data), and may distribute the received data to one or more among weather integration server 116, time series server 118, data cache(s) 124 and client application(s)/service(s) 126 (not all connections with data feed distributor 114 shown). Data feed distributor 114 may determine which component to distribute the received data to, based on one or more characteristics of the received data (e.g., data type, one or more predetermined conditions, one or more predetermined parameters and the like). In general, data feed distributor 114 may distribute weather data among the received data (collected from weather data source(s) 104) to weather integration server 116, and may distribute market data among the received data (collected from market data source(s) 106) to time series server 118.

Weather integration server 116 may be configured to receive weather data from data feed distributor 114, including weather forecast model data from among one or more weather forecast data models and weather observation data from one or more locations. Weather integration server 116 may be configured to communicate with time series server 118 and interactive GUI 120. Weather integration server 116 may be configured to segment (e.g., separate and/or index) the received weather data (from among the weather observations data and the weather forecast model data) into one or more segments in accordance with a predetermined weather symbology. (Weather symbology is described further below). In some examples, weather integration server 116 may also store at least a portion of the segmented weather data. Weather integration server 116 may provide the segmented weather data to time series server 118. In some examples, weather integration server 116 may also generate (and store) one or more weather maps from the weather forecast model data. In some examples, weather integration server 116 may provide weather map(s) to interactive GUI 120. In general, weather integration server 116 may provide segmented weather data to time series server 118 (as well as weather map(s) to interactive GUI 120) that may include real-time (e.g., streaming) data, near-real-time data, historical (e.g., static data) and/or any combination thereof.

In some examples, the segmented weather data may be generated to provide (weather symbology-segmented) weather data to time series serve 118 as a function of exchange time and/or interval time. Importantly, the segmented weather data, as generated by weather integration server 116, is in a format that can be readily integrated with market data within time series server 118. In some examples, the segmented weather data may be automatically updated based on (i.e., updated concurrent with) changes to the received weather data (e.g., new observation data, any updates to the weather forecast model data, etc.).

Time series server 118 may be configured to receive market data from data feed distributor 114 and segmented weather data t from weather integration server 116. Time series server 118 may also receive at least one weather data request (e.g., via interactive GUI 120, via client application(s)/service(s) 126). In some examples, the weather data request may be associated with at least one symbol element, and may be converted to weather symbology instruction. Time series server 118 may extract one or more portions of the segmented weather data (received from weather integration server 116) in accordance with the weather symbology instruction. In general, the weather symbology instruction may include one or more symbol elements (such as forecast location, weather perspective, weather model). In some examples, the weather symbology instruction may also include one or more variables (e.g., field(s) and/or condition(s)). (Examples of weather symbology instructions and weather perspectives are described further below.) Time series server 118 may be further configured to integrate the extracted weather data (in accordance with the weather symbology instruction) with at least a portion of market data (e.g., received from data distributor 114) to form an integrated presentation package. The integrated presentation package may be provided to interactive GUI 120 and/or client application(s)/service(s) 126 (including, in some examples, at least one application programing interface (API)).

In some examples, time series server 118 may include a tick engine and at least one database, for processing large amounts of market data that may change rapidly (e.g., user orders, market events, quotes, etc.). Time series server 118 may also include a presentation tool for generating presentation packages, including integrated weather and market data presentation packages. For example, time series server 118 may combine the extracted weather data (including, for example, weather forecasts, weather observations, weather symbology indications) with at least a portion of the market data (e.g., based on user input, pre-defined parameters, etc.) to form at least one integrated presentation package suitable for presentation (and interaction) (e.g., on interaction GUI 120, via an API, etc.). Although examples are described where presentation package includes both weather and market data, in some examples, at least one presentation package may be generated that includes (packaged) extracted weather data.

Figure 11:
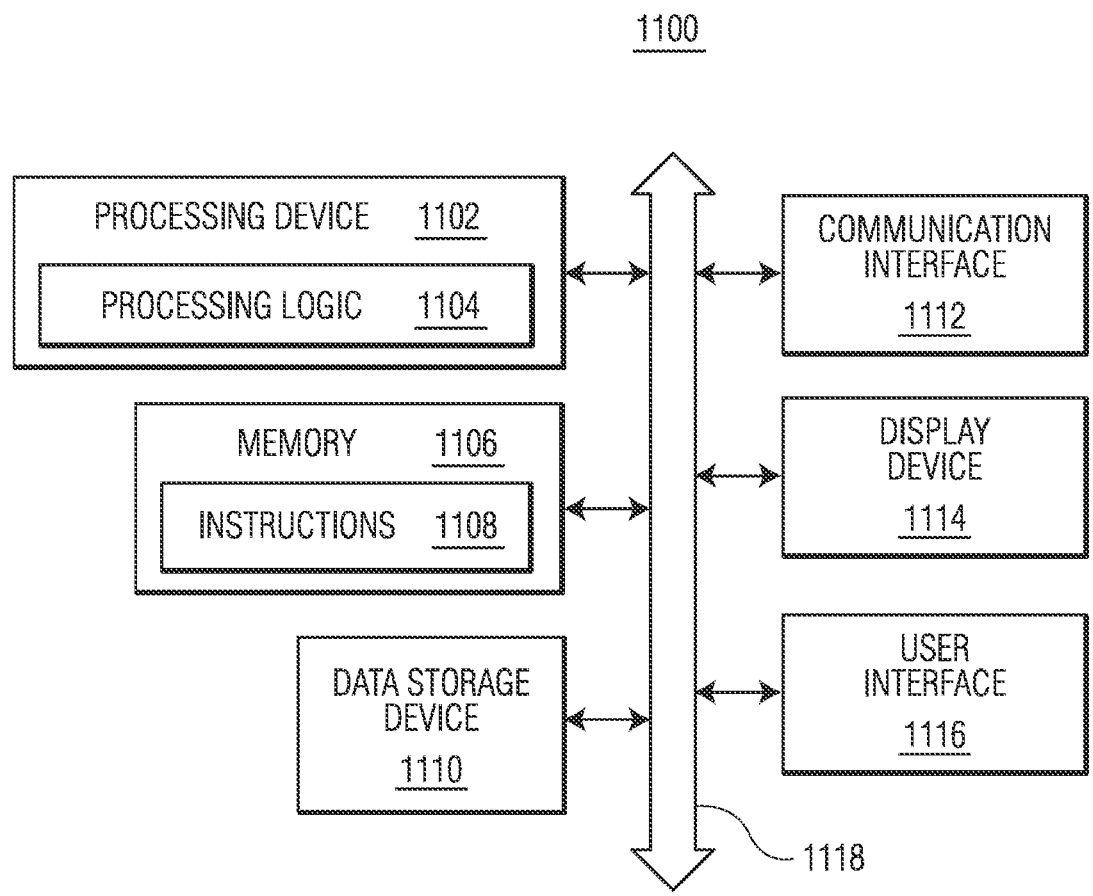
FIG. 11 is a functional block diagram of an example computer system according to an aspect of the present disclosure.

Although not shown, time series server 118 may include a controller (e.g., at least one processor, a microcontroller and the like, such as processing device 1102 shown in FIG. 11) and non-transitory memory (e.g., memory 1106 shown in FIG. 11) storing one or more routines and or algorithms for performing the functions of time series server 118 described herein. An example implementation of one or more components of time series server 118 is shown by computer system 1100 (shown in FIG. 11).

The integrated presentation package may include any suitable data and/or information (including weather data, market data, other suitable data and/or any combination thereof) configured in a manner for presentation and/or user interaction, including, but not limited to, one or more of at least one chart, at least one map, at least one watchlist, at least one alert, at least one grid application, at least one table, user input options including weather symbology input options and the like, In some examples, at least a portion of the data and/or information presented in the integrated presentation package may be user-customizable (including via the use of weather symbology). In some examples, the data and/or information in the presentation package may include one or more (live) data streams, such that the data and/or information presented by the presentation package may be updated concurrently with the data in the data stream(s). In some examples, the presentation package may also include historical (e.g., static data). In some examples, the presentation package may include at least one interactive weather grid that may be configured to allow user selection of a portion of the grid (e.g., clicking on a particular area with a pointing device). Responsive to the user selection, interactive GUI 120 may generate a predetermined streaming view of weather and market data associated with the selected portion.

An example of weather integration server 116 together with time series server 118 is described further below with respect to FIG. 2.

Interactive GUI 120 may be configured to generate weather impact dashboard 122 having a uniquely configured arrangement of one or more input regions, one or more notification regions and one or more display regions. In some examples, one or more portions of weather impact dashboard 122 may be automatically updated (including in real-time such as streaming data or near real-time) responsive to changes in weather data and/or market data. In some examples, the display region(s) may include an interactive display that permits/prompts user input and may be automatically updated in response to user input.

In some examples, weather impact dashboard 122 may include different configurations based on an underlying application and/or service (e.g., among client application(s)/service(s) 126 for which it is launched. For example, weather impact dashboard 122 may have a first configuration for a mobile application, may have a second (different) configuration for a desktop application and may have a third (different) configuration for a spreadsheet application. In some examples, weather impact dashboard 122 may include one or more windows with different configurations depending upon a particular weather perspective. In some examples, weather impact dashboard 122 may provide user input of a weather symbology instruction directly (e.g., a weather data request may include a weather symbology instruction itself). In some examples, weather impact dashboard 122 may provide one or more user input prompts that may be converted to a weather symbology instruction.

Examples of interactive GUI 120 are described further below with respect to FIGS. 9A-10F.

In some embodiments, DID system 102 may include data cache(s) 124 (e.g., a hardware component and/or software component) for storing data and/or information associated with the various functions of DID system 102. Data cache(s) 124 may be configured to store collected data (e.g., by data collector 112 and distributed by data feed distributor 114), including, for example, weather data from among weather data source(s) 104 and market data from among market data source(s) 106. In some examples, data cache(s) 124 may store requested weather datasets (generated by weather integration server 116) and/or integrated presentation package(s) (generated by time series server 118). In general, data cache(s) 124 may be configured to store any data in which faster data retrieval of the data for future requests may be useful. In some examples, data cache(s) 124 may include a data manager (DM) (not shown) for controlling collection and/or retrieval of data in data cache(s) 124.

In some examples, DID system 102 may include storage (e.g., one or more databases) to store any parameters, configurations, functions and/or other suitable data and/or information that may be useful for one or more of components 112-128. In some examples, the storage may be configured to store data distributed by data feed distributor 114 and/or data collected by data collector 112.

In some examples, DID system 102 may include client application(s)/service(s) 126 for creating instances of application(s) and/or service(s) for distributing data to user device(s) 108. In one non-limiting example, client application(s)/service(s) 126 may include one or more of a trading desktop, a spreadsheet application, a mobile application (e.g., an application that may be suitable for display screen of a mobile device such as a smartphone) streaming (e.g. raw, normalized, filtered and/or aggregated) data feeds and/or one or more APIs for receiving data in one or more object-oriented programming languages (e.g., Python™, R, etc.). In some examples, client application(s)/service(s) 126 may create instance(s) of application(s) and/or service(s) including interactive GUI 120 having at least one configuration of weather impact dashboard 122. In some examples, DID system 102 may be configured to expose a presentation package to one or more API(s) among client application(s)/service(s) 126.

In some examples, DID system 102 may include a client/server connection manager 128 (also referred to as connection manager 128) configured to manage client to server connection requests. In general, connection manager 128 may manage connection request(s) of user device(s) 108 to DID system 102, to access client application(s)/service(s) 126.

Figure 2:
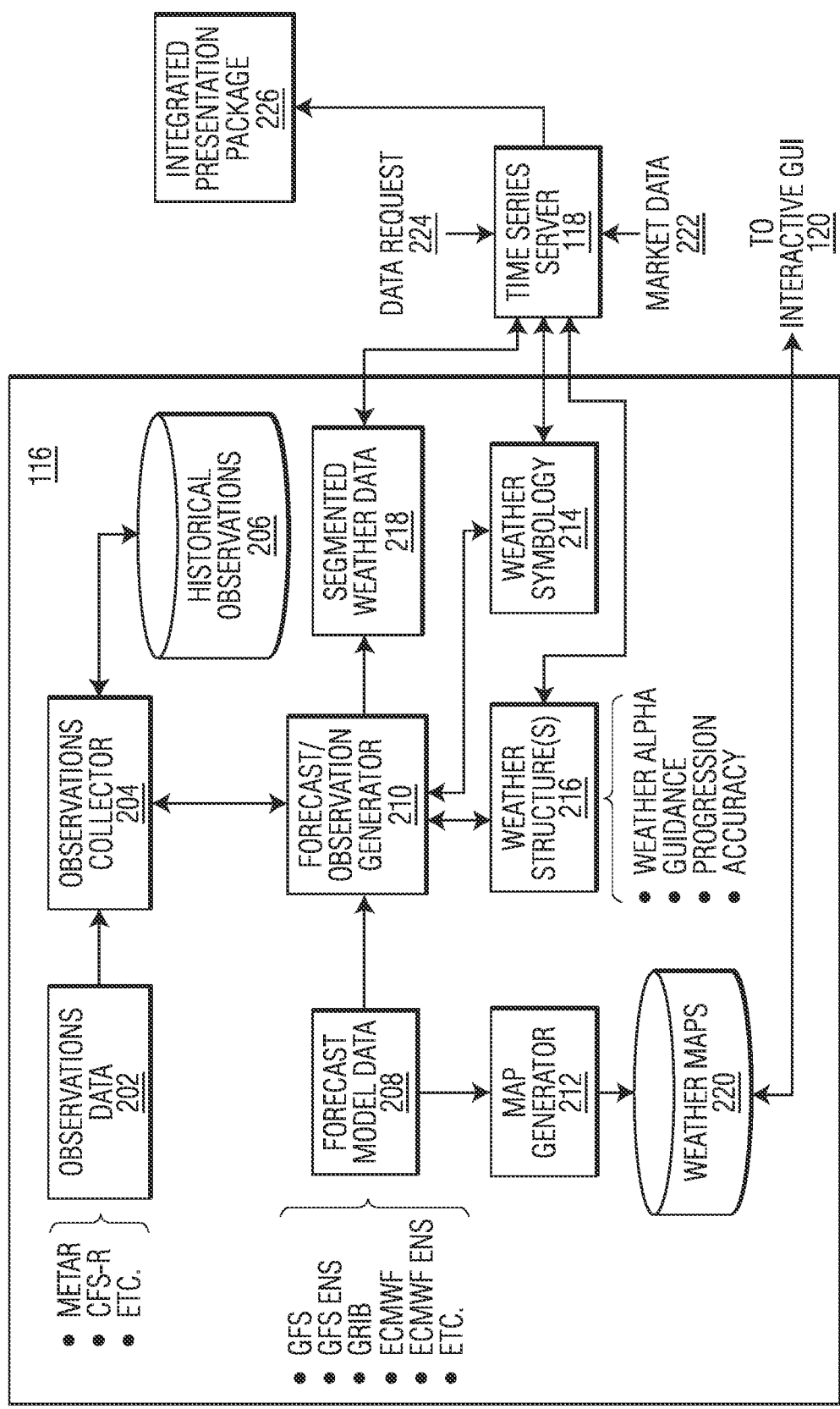
FIG. 2 is a functional block diagram of an example weather integration server, according to an aspect of the present disclosure.

Referring next to FIG. 2, a functional block diagram of example weather integration server 116 is shown. Weather integration server 116 may include observations collector 204, one or more databases 206, forecast/observation generator 210, map generator 212, weather symbology storage 214, storage 216 for one or more weather structures and one or more databases 220. In some examples, one or more components 204-216 and 220 of weather integration server 116 may communicate with each other via a data and control bus (not shown).

Although not shown, weather integration server 116 may include a controller (e.g., at least one processor, a microcontroller and the like, such as processing device 1102 shown in FIG. 11) and non-transitory memory (e.g., memory 1106 shown in FIG. 11) storing one or more routines and or algorithms for performing the functions of weather integration server 116 described herein. An example implementation of one or more components of weather integration server 116 is shown by computer system 1100 (shown in FIG. 11).

Observations collector 204 may be configured to obtain weather observations data 202 associated with one or more weather observation locations (e.g., from among weather data source(s) 104). In a non-limiting example, weather observations data 202 may include METAR, CFS-R observations data and CFS-R generated climatological data (e.g., a trailing 10 year climatology, a trailing 15 year climatology, a trailing 30 yr Climatology, etc.). In some examples, observations collector 204 may be configured to separate METAR and CFS-R observations data, CFS-R climatology data, and may process each type of data separately. In some examples, observations collector 204 may be configured to parse weather observations data 202, to identify one or more elements of weather observation data 202 that may be useful for generating segmented weather data 218. In some examples, observations collector 204 may generate one or more identifiers for the identified elements of the (parsed) weather observations data 202. In some examples, the identifier(s) may include an observation date, a time as to when the weather observation was observed and/or a timestamp indicating when a particular value/set of values was received.

Observations collector 204 may also store observations data 202 (after parsing) in database(s) 206 (e.g., as historical observations). Database(s) 206 may store observations data in any suitable format/arrangement for efficient data storage and retrieval. In some examples, database(s) 206 may store (parsed) weather observations data 202 based on identifiers generated by observations collector 204. Observations collector 204 may also provide at least a portion of weather observations data 202 (e.g., after parsing and/or from database(s) 206 to forecast/observation generator 210.

Forecast/observation generator 210 may be configured to obtain weather forecast model data 208 (e.g., from among weather data source(s) 104). In a non-limiting example, weather forecast model data 208 may include weather forecast models from GFS, GFS ENS, GFS ENS EXT, CFS ENS, ECMWF, ECMWF ENS, ECMWF ENS EXT, SAEAS and SEAS EXT forecast model sources. In one example, one or more (in some examples all) forecast models may originate in a GRIB file format and may be instantly converted into city level data for forecast valid times for a number of weather forecast variables, which may then be immediately run though time series server 118 so the data can stream through DID system 102. Forecast/observation generator 210 may also obtain weather observations data 202 from observations collector 204 (and/or form database (s) 206). Forecast/observation generator 210 may also be configured to communicate with weather symbology storage 214 and weather structure(s) storage 216. In general, forecast/observation generator 210 may be configured to use pre-defined symbol elements (stored in weather symbology storage 214) to segment forecast model data 208 and/or observations data 202 (e.g., via observations collector 204 and/or stored observation(s) via database(s) 206) into one or more pre-defined segments of weather data, to form segmented weather data 218. In some examples, at least a portion of forecast model data 208 may be stored in one or more databases (not shown), and forecast/observation generator 210 may use at least a portion of previously stored forecast model data to generate segmented weather data 218. Segmented weather data 218 may be provided to time series server 118.

Weather symbology storage 214 may be configured to store a pre-defined weather symbology. The pre-defined weather symbology may include one or more pre-defined symbol elements, one or more pre-defined variables (e.g. pre-defined condition(s) and/or fields) and one or more pre-defined rules for combining and/or arranging symbol elements into at least one weather symbology instruction having a pre-defined instruction structure. The symbol elements may be linked to respective segments of the weather data (including, in some examples, segments of weather data streams). The weather data may be segmented, (by forecast/observation generator 210) in accordance with the symbol elements of the weather symbology stored in storage 214. An example weather symbology is shown in FIG. 3C. In some examples, a weather symbology instruction may be used to extract portions of segmented weather data (e.g., by time series server 118) to create integrated presentation package 226.

Weather structure(s) storage 216 may be configured to store one or more pre-defined weather structures having one or more respective pre-defined rules (e.g., software workflows) for generating one or more pre-defined weather alpha workflows and one or more pre-defined weather perspectives. Time series server 118 may use the pre-defined weather structure(s) to create integrated presentation package 226. In general, the pre-defined weather perspective(s) may represent workflows (e.g., having one or more pre-defined rules) for converting segmented weather data 218 into user-customizable actionable knowledge (e.g., providing one or more different ways to assess various aspects of segmented weather data 218 that may not be directly observable by simply presenting weather forecast(s) and/or weather observation(s)). In a non-limiting example, the weather perspective(s) may include one or more pre-defined rules for generating integrated presentation package 226 in accordance with one or more of a guidance workflow, a progression workflow and an accuracy workflow. Examples of weather perspectives are described further below. In a non-limiting examples, the one or more pre-defined weather alpha workflows may include pre-defined rules for generating at least one of a weather macro alpha and a weather micro alpha (described further below).

In general, a weather symbology instruction (associated with weather data request 220), may be formed (e.g., by time series server 118) having the pre-defined instruction structure, using weather symbol element(s) and variable(s) in accordance the pre-defined rule(s) stored in weather symbology storage 214. In some examples, the weather symbology instruction may include a weather structure (e.g., a perspective), an observation location and a weather forecast model. The weather symbology instruction may include additional condition and/or function information, such as one or more of a model run, forecast valid days, forecast valid hours, etc. In some examples, the weather symbology instruction may be created based on one or more data requests 224 (e.g., received via user device(s) 108). Pre-defined rule(s) associated with the weather structure (of the weather symbology instruction) may be obtained from weather structure(s) storage 216 and may be used to create integrated presentation package 226. In some examples, integrated presentation package 226 may include at least a portion of segmented weather data 218 (e.g., based on a weather alpha workflow and/or a weather perspective) integrated together with market data 222 (received by time series server 118). In some examples, integrated presentation package 226 (at least a portion) may include at least a portion of segmented weather data 218 (e.g., without any market data 222).

Although weather symbology storage 214 and weather structure(s) storage 216 are shown as being part of weather integration server 116, storage components 214 and/or 216 may be external to weather integration server 116. As shown in FIG. 2, time series server 118 may be communicatively coupled to storage components 214 and 216.

Map generator 212 may receive at least a portion of forecast model data 208, and may render one or more weather forecast maps via any suitable well-known rendering technique. Map generator 212 may also store one or more weather forecast maps in database(s) 220. Database(s) 220 may store weather forecast map(s) in any suitable format/arrangement for efficient data storage and retrieval. One or more weather maps may be provided to interactive GUI 120 (e.g., via database(s) 220 and/or via map generator 212). Examples of types of maps that may be rendered are described further below with respect to FIG. 10C.

In operation, forecast/observation generator 210 may create segmented weather data of the collected (e.g., streaming) forecast and/or observations data) in accordance with the pre-defined symbol elements (and in some examples, symbology variables) stored in storage 214. In some examples, the weather data may be segmented by indexing portions of the weather data to the (linked) symbol elements (and symbology variables in some examples) and/or separating the weather data into subsets linked to the symbol elements (and symbology variables in some examples). In some examples, at least a portion of segmented weather data 218 may also be stored in one or more databases (not shown). Time series server 118 may receive at least one (weather) data request 224 (e.g., from user device(s) 108 via interactive GUI 120). Response to data request 224, time series server 118 may convert data request(s) 224 to a corresponding weather symbology instruction, based on pre-defined weather symbology rule(s) in weather symbology storage 214 (or may receive the weather symbology instruction directly in data request 224). Time series server 118 may determine which segment(s) of segmented weather data 218 to extract based on the symbol element(s) in the weather symbology instruction (that are linked to segment(s) of segmented weather data). Time series server 118 may also determine a particular weather structure among weather structure(s) stored in storage 216, based on the weather symbology instruction. Time series server 118 may create integrated presentation package 226 in accordance with corresponding pre-defined weather structure rules (e.g., workflow) for the particular weather structure. In some examples, time series server 118 may stitch together a weather forecast in accordance with the weather symbology instruction, by extracting segment(s) of segmented weather data 218 according to the particular weather structure. Moreover, time series server 118 may generate integrated presentation package 226 as a function of multiple time series formats, including exchange time and interval time, such that extracted segment(s) of segmented weather data 218 may be easily integrated with market data 222 by time series server 118, so that end users (e.g., via interactive GUI 120, via client application(s)/service(s) 126) may readily identify any impacts of weather data on market data 222.

In some examples, integrated presentation package 226 may be generated based on predetermined parameters (e.g., determined by weather integration server 116, determined by time series server 118, defined by the user, etc.), without receiving any data request 224 (and/or independent of any data request 224). For example, an initial launch page on weather impact dashboard 122 of interactive GUI 120 may be generated based on the predetermined parameters (via extracting portions of segmented weather data 218 in accordance with the predetermined parameters). A user of user device(s) 108 may then modify and/or customize integrated presentation package 226 that is ultimately presented on weather impact dashboard 122 by data request(s) 224.

Weather Workflows Overview

Before describing details of the symbology structure, an overview of example weather workflows (e.g., weather alpha and weather perspectives) of the present disclosure for interacting with weather data is provided. The weather alpha and weather perspectives workflows are unique to the present disclosure and have never been integrated into a trading desktop or any system (including any streaming system) containing market prices prior to the present disclosure. Although the present disclosure describes three primary weather perspective workflows, it is understood that the present disclosure is not limited to the example workflows described below, and that any suitable weather workflow for interacting with weather and market data to provide meaningful indications of weather impact on market data are also within the scope of the present disclosure. In some examples, the weather perspective and weather alpha workflows may be used by any suitable end-user including, without being limited to, traders, analysts, meteorologists, trading floor quants, investors, hedgers and the like.

Weather Alpha: A system which allows for a data display or charting display of weather forecast variables (like temperature, Degree Day, GWDD, wind, humidity, etc.) from a specific weather forecast model or multiple weather forecast models, initialized and released at a specific time of day (model run) from which a specific location or locations (e.g., city or region) which may (or may not) include preliminary estimated forecast values such as '% complete' or 'Fast& Full' or partial week month or seasonal aggregations called "Progress' or pre-calculated (streaming) values (i.e. "Change" from previous, "Anomaly/Difference" from Climatology) to be displayed in real-time, alongside market prices for any traded instrument which includes but is not limited to one or more traded commodities, equity or bond instruments which may or may not include futures, forward and/or various types of option contracts. The 'weather symbology' of the present disclosure allows the user a method to easily access weather forecast data in at least one of a "Seasonal", "Monthly" "Weekly", "Daily" and "Hourly" format in a manner consistent for data Analysis or Charting and/or aligning with other market data. See FIGS. 4A-4D (discussed further below). In general, an objective of weather alpha may include providing one or more tools to quickly understand the vast amount of streaming data specifically related to changing weather perceptions and a magnitude of weather forecast changes directly to (changing) prices of any traded instruments (e.g., on an electronic exchange system and/or offline of an electronic exchange system).

The example three primary weather perspective workflows may include:

1) Guidance: A system which allows for a data display, or charting display, of a weather forecast variable (like temperature, Degree Day, GWDD, wind, humidity, etc.) from MULTIPLE weather forecast models, initialized and released at one or more specific times of day (model runs) from which a specific location or locations (e.g., city or region) which may (or may not) include preliminary estimated forecast values such as '% complete' or 'Fast& Full' or partial week, month or seasonal aggregations called "Progress' or pre-calculated (streaming) value(s) (e.g., "Change" from previous and/or "Anomaly/Difference" from Climatology) to be displayed in real-time or its history, allowing the user to closely examine weather forecast risks, by visualizing if all weather forecasts are in agreement or disagreement with each other over the forecast duration. The 'weather Symbology' of the present disclosure allows the user a method to easily access weather forecast data in a manner consistent for data Analysis or Charting and/or aligning with other market data. See FIG. 5 (discussed further below). In some examples, Daily or Hourly represent weather forecast fields. The symbology allows weather forecasts to be treated as a continuation contract (e.g., such as a prompt month natural gas contract) or revert to previous weather forecasts. Data (including in some examples all data) in DID system 102 may be displayed as a function of receipt time or interval start time. In some examples, the Symbology may include an MR0 format (described herein).

2) Progression: This style of chart may hold a particular Forecast Valid Date/Time of Day on that specific Date constant (called a "Target Date") and shows how the weather forecast models have changed overtime, leading up to that "target date'. The system which allows for either a data display or charting display of a weather forecast variable (like temperature, Degree Day, GWDD, wind, humidity, etc.) from MULTIPLE weather forecast models, and any number of model runs, for a specific location (city or region) which may (or may not) include preliminary estimated values such as '% complete' or 'Fast& Full' or partial week, month or seasonal aggregations called "Progress' or pre-calculated forecast value (i.e. "Change" from previous and/or "Anomaly/Difference" from Climatology) to be displayed in real-time, allowing the user to closely examine weather forecast changes over time (to a point at which they all may converge). The 'weather Symbology' of the present disclosure allows the user a method to easily access weather forecast data in either a "Seasonal", "Monthly" "Weekly", "Daily" or "Hourly" format in a manner consistent for data Analysis and/or Charting and aligning with other market data. See FIGS. 6A-6C (discussed further below).

3) Accuracy: This style of chart or data query may look back at historical weather forecast 'model run dates' and 'model runs' and hold a Forecast Valid Day constant. For example 'Forecast Day #1' could be examined over the last 30 days of weather forecasts from a particular weather forecast model. Each of these Day 1 weather forecasts (which refer to a different Forecast Valid Date) can then be subtracted from their respective weather observation (then all (e.g., 30) data points may be averaged) to derive an average weather forecast Bias (hotter/colder) or other performance statistics. The 'weather Symbology' of the present disclosure allows the user a method to easily access weather forecast data in either a "Daily" or "Hourly" format in a manner consistent for data Analysis or Charting and/or aligning with other market data. See FIGS. 7A and 7B (discussed further below).

Overview of Weather Symbology

To accomplish the example weather perspective and weather alpha workflows (which may be important, for example, to traders, analysts, meteorologist and trading floor quants, investors, hedgers), lies an underlying comprehensive 'weather symbology'. This symbology structure is desirable for weather data to function inside a streaming time series server-based trading desktop (such as time series server 118), where the time series server also accommodates a fast streaming delivery of market prices. It is not the order of the elements listed in the 'weather symbology' but rather the function of what weather 'elements' can be extracted and applied to client application(s)/service(s) 126 (such as a trading desktop) which hosts market prices. To describe the methodology of the 'weather symbology', a unique structure is established by the present disclosure to mimic each of the three primary weather perspective workflows.

1) Guidance based weather symbology may use a ' location', a 'Weather Model Name' along with a specific 'Weather Model Run Date' and a Weather Model Run' to extract any weather forecast, initialized and produced any time of day, for either current running forecasts or historical weather forecasts. Along with that functionality, users may have shortcut codes, meaning a user may obtain the most current weather forecast for that 'Location', 'Weather Model Name' or 'Weather Model Run'. In addition, the Guidance based weather symbology structures may allow for either "specific" or "rolling" symbols, meaning a user can request a specific 'Weather Model Run Date' and/or specific 'Model Run' or "rolling". From that core information, the Guidance weather symbol can be further extended to include calendar, seasonal, monthly, weekly hourly or daily weather forecast data fields, for any specific location, for any weather forecast variable, for any preliminary estimated values such as '% complete' or 'Fast& Full' or progress, or pre-calculated values (e.g., "Change" from previous and/or "Anomaly/Difference" from Climatology) or Ensemble based statistics in the symbol itself. All of this weather information can then be easily combined in a manner consistent for data Analysis, Charting and/or aligning with other market data in either "Exchange Time" or "Interval Start" time. See FIG. 5 and the description herein for constructing the weather symbology.

2) Progression based weather symbology may use a 'location', a 'Weather Model Name' and an optional 'Weather Model Run' to extract all weather forecasts initialized and produced for a specific "target Date". The Progression based weather symbols can accommodate any weather forecast, produced any time of day, for current running forecasts and historical weather forecasts. Along with the functionality users may have shortcut codes, meaning a user may obtain the most current weather forecast for that 'Location', 'Weather Model Name' or 'Weather Model Run'. In addition, the Progression based weather symbology structure may allow for either "specific" or 'rolling symbols', meaning a user can request a specific or rolling 'Target Dates'. From that core information, the Progression weather symbol can be further extended to include calendar, seasonal, monthly, weekly daily or hourly weather forecast data, for any specific location, for any weather forecast variable, for any preliminary estimated values such as '% complete' or 'Fast& Full' or Progress or pre-calculated values (e.g., "Change" from previous and/or "Anomaly/Difference" from Climatology) or Ensemble based statistics in the symbol itself. All of this weather information can then be easily combined in a manner consistent for data Analysis, Charting and/or aligning with other market data in either "Exchange Time" or "Interval Start" time. See FIGS. 6A-6C.

3) Accuracy based weather symbology may use a 'location', a 'Weather Model Name' and an optional Weather Model Run' to extract all weather forecasts produced for a specific time in the future "Forecast Valid Day or Model Hour". This symbol may use the "!" for a rolling notation, so the user can always extract a particular 'Forecast Valid Day' in the future. For example a 'Day 1' may be a different "Date" with each new 'Weather Model Run Date', so Day 1 is rolling. The Accuracy based weather symbols can accommodate any weather forecast, produced any time of day, and operate during current running forecasts and historical weather forecasts. In addition the Accuracy based weather symbology structure may allow for 'rolling symbols' related to a "Forecast Valid Day" (e.g., as opposed to a specific 'Forecast Valid Date'/like used in a Progression's 'Target Date'). From that core information, returned from the weather symbology, the Accuracy weather symbol can be further extended to include, for example, calendar, seasonal, monthly, weekly daily or hourly weather forecast data, for any specific location, for any weather forecast variable, for any 'Fast& Full' or Progress, or Ensemble based statistics in the symbol itself. All of this weather information can then be easily combined in a manner consistent for data Analysis, Charting and/or aligning with other market data in either "Exchange Time" or "Interval Start" time. See FIGS. 7A and 7B.

There are many sources of quality weather forecasts from various government entities, such as weather agencies, educational institutions, national research laboratories, military as well as private companies. The initial focus is from two primary government weather forecast entities; being the American government NOAA and European government ECMWF. Each of the two entities produces multiple weather forecast products (a few examples of these weather forecast models include GFS, GFS ENS, GFS ENS EXT, CFS ENS, ECMWF, ECMWF ENS, and ECMWF ENS EXT, SEAS, SEAS EXT), which generally have the greatest influence on market prices related to numerous traded instruments around the globe. Four of these weather forecast models are from the United States (GFS, GFS ENS, GFS ENS EXT, CFS ENS) and the remaining five (ECMWF, ECMWF ENS, ECMWF EXT, SEAS and SEAS EXT) are from Europe. Four of these weather Forecast Models are produced four times per day (Model Runs), the remaining five are produced in less frequent updates (e.g., daily or twice per week, etc.).

Tables 1 and 2 below include a list of weather forecast models and weather forecast variables which are included in the 'weather symbology' of the present disclosure. In particular, Table 1 illustrates an example list of weather forecast models for the weather symbology of the present disclosure. Table 2 illustrates an example list of weather forecast variables for the weather symbology of the present disclosure. In Table 2, H represents an Hourly variable and D represents a Daily variable.

The 'weather symbology' described in the present disclosure may be configured to operate with all nine of these example weather models, as well as any and all other weather forecasts, either in the public or private domain.

TABLE 1

Example list of weather forecast models for the weather symbology

CITY FORECAST DATA

| Weather Model Name | Code | Spatial Resolution | Domain | Model Runs | Forecast Duration | Temporal Resolution |
|---|---|---|---|---|---|---|
| GFS | GFS | ¼ degree (aka 18 mile/28 km grid) | Global Forecast | 0z, 6z, 12z, 18z | 16 days 0-384 hrs | Hourly— 120 3 hr 121-384 |
| GFS Ensemble | GEFS | ¼ degree (aka 18 mile/28 km grid) | Global Forecast | 0z, 6z, 12z, 18z | 16 days 0-384 hrs | 3 hr—192 6 hr 198-384 |
| ECMWF | ECM | ¼ degree (aka 18 mile/28 km grid) | Global Forecast | 0z, 12z | 10 days 0-240 hrs | Hourly—90 3 hr 93-144 6 hr 150-240 |
| ECMWF | ECM | ¼ degree (aka 18 mile/28 km grid) | Global Forecast | 6z, 18z | 10 days 0-240 hrs | Hourly—90 |
| ECMWF ENS | ECE | ¼ degree (aka 18 mile/28 km grid) | Global Forecast | 6z, 18z | 15 days 0-360 hrs | Hourly—90 3 hr 93-144 |
| ECMWF ENS | ECE | ¼ degree (aka 18 mile/28 km grid) | Global Forecast | 0z, 12z | 15 days 0-360 hrs | Hourly 90 3 hr 93-144 6 hr 150-360 |
| ECMWF ENS EXT | ECMR | ¼ degree (aka 18 mile/28 km grid) | Global Forecast | 2× per week Monday & Thursday | 16-46 days | Daily |
| CFS | CFS | ½ degree | Global Forecast | 0z only | 0-9 months | Daily |
| SEAS | SEAS | ¼ degree (aka 18 mile/28 km grid) | Global Forecast | 1× month | 0-7 months | Daily |

TABLE 2

Example (non-limiting) list of a weather forecast variables for the weather symbology.

| Time Frame | Field Name | Front End Long | Short |
|---|---|---|---|
| WEATHER META DATA SPECIFICS | | | |
| | Time | Receipt Time | Receipt Time |
| | nstime | Nstime | nstime |
| | ns_exchange time | ns_exchange time | ns_exchange time |
| | Line_id | Line_id | Line_id |
| | sequence_number | sequence_number | sequence_number |
| | sequence_series | sequence_series | sequence_series |
| | flags | Flags | flags |
| | utcdatetime | UTC Forecast Valid Date and Forecast Valid Tme | UTC Date and Time |
| | localdatetime | LOCAL Forecast Valid Date and Forecast Valid Tme | Local Date and Time |
| | fastvfull | Ensemble Member fast vs full | ENS Fast or Full |
| | filetime | File Time | File Time |
| | location | Location | Location |
| | Model | Forecast Model Name | Model Name |
| | modeldate | Model Run Date | MR Date |
| | modelrun | Forecast Model Run | MR |
| | forecasthour | Forecast Model Hour | Mhr |

TABLE 2-continued

Example (non-limiting) list of a weather forecast variables for the weather symbology.

| Time Frame | Field Name | Front End Long | Short |
|---|---|---|---|
| | interpolated | Interpolated Value | Intrpl |
| | blended | Forecast and METAR are Blended | Blended |
| | localdate | Local Date | Local Date |
| | localhour | Local Hour | Local Hr |
| | ensemblevariable | Ensemble Variable | Ens Varbl |
| | utcdate | UTC Date | UTC Date |
| | utchour | UTC Hour | UTC Hr |
| | localforecastday | Local Forecast Day | Local Day |
| | percentcomplete | Percent Complete | % Comp |
| | | LIQUID PRECIPITATION | |
| H | APCP | Accum Precip 6 hr reset | APCP |
| H | APCPNO | Accum Precip hourly Interpolated | AccPrecip H Intrpl |
| D | DAYPRECIP | Daily Precipitation | Daily Precip |
| D | DAYPRECIP_Chng_6 h | Daily Precip 6 Hr Change | D Precip 6 hr CHG |
| D | DAYPRECIP_Chng_12 h | Daily Precip 12 Hr Change | D Precip 12 hr CHG |
| D | DAYPRECIP_Chng_18 h | Daily Precip 18 Hr Change | D Precip 18 hr CHG |
| D | DAYPRECIP_Chng_24 h | Daily Precip 24 Hr Change | D Precip 24 hr CHG |
| D | DAYPRECIP_Diff_10 Y Avg | Daily Precip 10 yr Anomaly | D Precip 10 yr ANOM |
| D | DAYPRECIP_Diff_15 Y Avg | Daily Precip 15 yr Anomaly | D Precip 15 yr ANOM |
| D | DAYPRECIP_Diff_30 Y Avg | Daily Precip 30 yr Anomaly | D Precip 30 yr ANOM |
| D | DAYPRECIP_Diff_30 Y Climo | Daily Precip Official 30 yr Anomaly | D Precip o30 yr ANOM |
| | | SNOW & RUNOFF | |
| H | WATR | Snow Water Runoff | SWRO |
| H | WATRNO | Snow Water Runoff Hourly interpolated | Runoff H Intrpl |
| D | DAYWATR | Daily Snow Water Runoff | D Runoff |
| D | WEASD | Snow Water Equivalent | SWE |
| H | WEASDNO | Snow Water Equivalent Hourly Interpolated | SWE H Intrpl |
| D | DAYWEASD | Daily Snow Water Equivalent | D SWE |
| H | SNOD | Snow Depth | SD |
| D | SNOD_Avg | Daily Avg Snow Depth | Avg SD |
| | | SOLAR | |
| H | DLWRF | Downward Long Wave Radition Flux | Long Wave Rad |
| H | DLWRFNO | Downward Long Wave Radition Flux Hourly interpolated | LWRad H intrpl |
| D | DLWRF_Avg | Downward Long Wave Radition Flux Daily Avg | LWRad D |
| H | DSWRF | Downward Short Wave Radition Flux | Short Wave Rad |
| H | DSWRFNO | Downward Short Wave Radition Flux Hourly Interpolated | SWRad H Intrpl |
| D | DSWRF_Avg | Downward Short Wave Radition Flux Daily Avg | SWRad D |
| H | GFLUX | Surface Ground Heat Flux W/m^2 | Grnd Heat Flux |
| H | GFLUXNO | Surface Ground Heat Flux W/m^2 Hourly Intrpl | Grnd Heat Flux H Intrpl |
| H | WILT | Wilt hourly | H Wilt |
| D | WILT_Avg | Daily Avg Surface Ground Heat Flux W/m^2 | DAvg Grnd Heat Flux |
| | | WIND SPEED & DIRECTION | |
| H | GUST | Wind Gust max per hour | Gust hr |
| H | WINDS_10 m | 10 Meter Wind Speed | 10 M W Speed |
| H | WINDD_10 m | 10 Meter Wind Direction | 10 M W Dir |
| H | TMP_80 m | 80 M Temp | 80 m T |
| H | PRES_80 m | 80 m Pressure | 80 m Pres |
| H | SPFH_80 m | 80 M Specific Humidity | 80 m SpcH |
| H | WINDS_80 m | 80 M Wind Speed | 80 m WS |
| H | WINDD_80 m | 89 M Wind Direction | 80 m WD |
| | | AGRICULTURE | |
| D | GUST_D_MAX | Daily Avg Wilt | Davg Wilt |
| H | SOILW_0_0.1 m | Soil Moisture 0 cm 100 cm deep | Soil Mo 0-100 cm |
| D | SOILW_0_0.1 m_Avg | Daily Avg Soil Moisture 0 cm-100 cm deep | DAvg Soil Mo 0-100 cm |
| H | SOILW_0. 1_0.4 m | Soil Moisture 100 cm-400 cm deep | Soil Mo 100 cm-400 cm |
| D | SOILW_0.1_0.4 m_Avg | Daily Avg Soil Moisture 100 cm-400 cm deep | DAvg Soil Mo 100 cm-400 cm |

TABLE 2-continued

Example (non-limiting) list of a weather forecast variables for the weather symbology.

| Time Frame | Field Name | Front End Long | Short |
|---|---|---|---|
| H | SOILW_0 4_1 m | Soil Moisture 400 cm-1 m deep | Soil Mo 400 cm-1 m |
| D | SOILW_0.4_1 m_Avg | Daily Avg Soil Moisture 400 cm-1 m deep | DAvg Soil Mo 400 cm-1 m |
| H | SOILW_1_2 m | Soil Moisture 1 m-2 m deep | Soil Mo 1 m-2 m |
| D | SOILW_1_2 m_Avg | Daily Avg Soil Moisture 1 m-2 m deep | DAvg Sod Mo 1 m-2 m |
| H | TSOIL_0_0.1 m | Soil Temp 0 cm-100 cm deep | Soil T 0-100 cm |
| D | TSOIL_0_0.1 m_Avg | Daily Avg Soil Temp 0 cm-100 cm deep | DAvg Soil T 0-100 cm |
| H | TSOIL_0.1_0.4 m | Soil Temp 100 cm-400 cm deep | Soil T 100 cm-400 cm |
| D | TSOIL_0.1_0.4 m_Avg | Daily Avg Soil Temp 100 cm-400 cm deep | DAvg Soil T 100 cm-400 cm |
| H | TSOIL_0.4_1 m | Soil Temp 400 cm-1 m deep | Soil T 400 cm-1 m |
| D | TSOIL_0.4_1 m_Avg | Daily Avg Soil Temp 400 cm-1 m deep | DAvg Soil T 400 cm-1 m |
| H | TSOIL_1_2 m | Soil Temp 1 m-2 m deep | Soil T 1 m-2 m |
| D | TSOIL_1_2 m_Avg | Daily Avg Soil Temp 1 m-2 m deep | DAvg Soil T 1 m-2 m |
| | | SKY & SURFACE-HOURLY | |
| H | TCDC_ALL | Total Cloud Cover entire atmosphere | Cloud All |
| H | TCDC_HIGH | Total Cloud Cover highest level | Cloud High |
| H | TCDC_LOW | Total Cloud Cover lowest level | Cloud Low |
| H | TCDC_MID | Total Cloud Cover mid level | Cloud Mid |
| H | PRMSL | Mean Sea Level Pressure | MSLP |
| H | VIS | Visibility | Vis |
| H | DPT_2 m | 2 M Dew Point | 2 m DP |
| H | RH_2 m | 2 M Relative Humidity | 2 m RH |
| H | SPFH_2 m | Specific Humidity | Spec Hum |
| H | TMP_Hourly_2 m | 2 M Hourly Temp | 2 m T Hourly |
| H | TMP_Hourly_2 m_Chng_12 h | 2 M Hourly Temp 12 Hr Change | 2 m hr T 12 hr CHG |
| H | TMP_Hourly_2 m_Chng_18 h | 2 M Hourly Temp 18 Hr Change | 2 m hr T 18 hr CHG |
| H | TMP_Hourly_2 m_Chng_24 h | 2 M Hourly Temp 24 Hr Change | 2 m hr T 24 hr CHG |
| H | TMP_Hourly_2 m_Chng_6 h | 2 M Hourly Temp 6 Hr Change | 2 m hr T 6 hr CHG |
| | | SKY & SURFACE DAILY | |
| D | TMP_D_Avt_2 m | 2 M Daily Avg Temp | 2 m DAvgT |
| D | TMP_D_Avg_2 m_Chng_6 h | 2 M Daily Avg Temp 6 Hr Change | 2 m DAvgT 6 hr CHG |
| D | TMP_D_Avg_2 m_Chng_12 h | 2 M Daily Avg Temp 12 Hr Change | 2 m DAvg T 12 hr CHG |
| D | TMP_D_Avg_2 m_Chng_18 h | 2 M Daily Avg Temp 18 Hr Change | 2 m DAvg T 18 hr CHG |
| D | TMP_D_Avg_2 m_Chng_24 h | 2 M Daily Avg Temp 24 Hr Change | 2 m DAvg T 24 hr CHG |
| D | TMP_D_Avg_2 m_Diff_10 Y Avg | 2 M Daily Avg Temp 10 yr Anomaly | 2 m DAvg T 10 yr ANOM |
| D | TMP_D_Avg_2 m_Diff_15 Y Avg | 2 M Daily Avg Temp 15 yr Anomaly | 2 m DAvg T 15 yr ANOM |
| D | TMP_D_Avg_2 m_Diff_30 Y Avg | 2 M Daily Avg Temp 30 yr Anomaly | 2 m DAvg T 30 yr ANOM |
| D | TMP_D_Avg_2 m_Diff_o30 Y Climo | 2 M Daily Avg Temp Officials 30 yr Anomaly | 2 m DAvg T o30 yr ANOM |
| D | TMP_D_MAX_2 m | 2 M Daily Max Temp | 2mD_XT |
| D | TMP_D_MAX_2 m_Chng_6 h | 2 M Daily Max Temp 6 Hr Change | 2 mD_XT 6 hr CHG |
| D | TMP_D_MAX_2 m_Chng_12 h | 2 M Daily Max Temp 12 Hr Change | 2 mD_XT 12 hr CHG |
| D | TMP D MAX 2 m Chng_18 h | 2 M Daily Max Temp 18 Hr Change | 2 mD_XT 18 hr CHG |
| D | TMP_D_MAX_2 m_Chng_24 h | 2 M Daily Max Temp 24 Hr Change | 2 mD_XT 24 hr CHG |
| D | TMP_D_MAX_2 m_Diff_10 Y Avg | 2 M Daily Max Temp 10 yr Anomaly | 2 mD_XT 10 yr ANOM |
| D | TMP_D_MAX_2 m_Diff_15 Y Avg | 2 M Daily Max Temp 15 yr Anomaly | 2 mD_XT 15 yr ANOM |
| D | TMP_D_MAX_2 m_Diff_30 Y Avg | 2 M Daily Max Temp 30 yr Anomaly | 2 mD_XT 30 yr ANOM |
| D | TMP_D_MAX_2 m_Diff_30 Y Climo | 2 M Daily Max Temp Official 30 yr Anomaly | 2 mD_XT o30 yrANOM |
| D | TMP_D_Min_2 m | 2 M Daily Min Temp | 2 mD_NT |
| D | TMP_D_Min_2 m_Chng_12 h | 2 M Daily Min Temp 12 Hr Change | 2 mD_NT 12 hr CHG |
| D | TMP_D_Min_2 m_Chng_18 h | 2 M Daily Min Temp 18 Hr Change | 2 mD_NT 18 hr CHG |
| D | TMP_D_Min_2 m_Chng_24 h | 2 M Daily Min Temp 24 Hr Change | 2 mD_NT 24 hr CHG |
| D | TMP_D_Min_2 m_Chng_6 h | 2 M Daily Min Temp 6 Hr Change | 2 mD_NT 6 hr CHG |
| D | TMP_D_Min_2 m_Diff_10 Y Avg | 2 M Daily Min Temp 10 yr Anomaly | 2 mD_NT 10 yr ANOM |
| D | TMP_D_Min_2 m_Diff_15 Y Avg | 2 M Daily Min Temp 15 yr Anomaly | 2 mD_NT 15 yr ANOM |
| D | TMP_D_Min_2 m_Diff_30 Y Avg | 2 M Daily Min Temp 30 yr homely | 2 mD_NT 30 yr ANOM |
| D | TMP_D_Min_2 m_Diff_30 Y Climo | 2 M Daily Min Temp Official 30 yr Anomaly | 2 mD_NT o30 y ANOM |
| | | DEGREE DAYS-DAILY | |
| D | HDD | Heating Degree Day 65 degrees | HDD |
| D | CDD | Cooling Degree Day 65 degrees | CDD |
| Gas Weeks | HDD_NG Wks | Heating Degree Day 65 degrees (NGwk) | HDD NGwk |
| Gas Weeks | CDD NG WKs | Cooling Degree Day 65 degrees (NGwh| | CDD NGwk |
| D | GWDD | GWDD | GWDD |
| D | GWDD_Chng_6 h | GWDD 6 Hr Change | GWDD 6 hr CHG |
| D | GWDD_Chng_12 h | GWDD 12 Hr Change | GWDD 12 hr CHG |
| D | GWDD_Chng_18 h | GWDD 18 Hr Change | GWDD 18 hr CHG |
| D | GWDD_Chng_24 h | GWDD 24 Hr Change | GWDD 24 hr CHG |
| D | GWDD_Diff_10 Y Avg | GWDD 10 yr Anomaly | GWDD 10 yr ANOM |
| D | GWDD_Diff_15 Y Avg | GWDD 15 yr Anomaly | GWDD 15 yr ANOM |
| D | GWDD_Diff_30 Y Avg | GWDD 30 yr Anomaly | GWDD 30 yr ANOM |
| D | GWDD_Diff_o30 Y Avg DIFF | GWDD Official 30 yr Anomaly | GWDD o30 yr ANOM |
| Gas Weeks | GWDD_NG WKs | Gas Weighted Temp (NG weeks) | GW Temp (NGwk) |

TABLE 2-continued

Example (non-limiting) list of a weather forecast variables for the weather symbology.

| Time Frame | Field Name | Front End Long | Short |
|---|---|---|---|
| Gas Weeks | GWDD_Chng_6 h_NG WKs | Gas Weighted Temp 12 Hr CHNG (NGwk) | GW T 12 hr CHG (NGwk) |
| Gas Weeks | GWDD_Chng_12 h_NG WKs | Gas Weighted Temp 18 Hr CHNG (NGwk) | GW T 18 hr CHG (NGwk) |
| Gas Weeks | GWDD_Chng_18 h_NG WKs | Gas Weighted Temp 24 Hr CHNG (NGwk) | GW T 24 hr CHG (NGwk) |
| Gas Weeks | GWDD_Chng_24 h_NG WKs | Gas Weighted Temp 6 Hr CHNG (NGwk) | GW T 6 hr CHG (NGwk) |
| Gas Weeks | GWDD_Diff_10 Y Avg_NG WKs | Gas Weighted Temp 10 yr Anomaly (NGwk) | GW T 10 yr ANOM (NGwk) |
| Gas Weeks | GWDD_Diff_15 Y Avg_NG WKs | Gas Weighted Temp 15 yr Anomaly (NGwk) | GW T 15 yr ANOM (NGwk) |
| Gas Weeks | GWDD_Diff_30 Y Avg_NG WKs | Gas Weighted Temp 30 yr Anomaly (NGwk) | GW T 30 yr ANOM (NGwk) |
| Gas Weeks | GWDD_Diff_o30 Y AvgDlFF_NG WKs | Gas Weighted Temp Official 30 yr Anomaly (NGwk) | GW T o30 yr ANOM (NGwk) |
| D | GWAvgT | Gas Weighted Daily Avg Temp | GW Avg Temp |
| D | GWAvgT_Chng_12 h | Gas Weighted Avg Temp 12 Hr CHNG | GW AvgT 12 hr CHG |
| D | GWAvgT_Chng_18 h | Gas Weighted Avg Temp 18 Hr CHNG | GW AvgT 18 hr CHG |
| D | GWAvgT_Chng_24 h | Gas Weighted Avg Temp 24 Hr CHNG | GW AvgT 24 hr CHG |
| D | GWAvgT_Chng_6 h | Gas Weighted Avg Temp 6 Hr CHNG | GW AvgT 6 hr CHG |
| D | GWAvgT_Diff_10 Y Avg | Gas Weighted Avg Temp 10 yr Anomaly | GW AvgT 10 yr ANOM |
| D | GWAvgT_Diff_15 Y Avg | Gas Weighted Avg Temp 15 yr Anomaly | GW AvgT 15 yr ANOM |
| D | GWAvgT_Diff_30 Y Avg | Gas Weighted Avg Temp 30 yr Anomaly | GW AvgT 30 yr ANOM |
| D | GWAvgT_Diff_o30 VAvg DIFF | Gas Weighted Avg Temp Official 30 yr Anomaly | GW AvgT o30 yr ANOM |
| Gas Weeks | GWAvgT_NG WKs | Gas Weighted Avg Temp (NG weeks) | GW Avg Temp (NGwk) |
| Gas Weeks | GWAvgT_Chng_12 h_NC WKs | Gas Weighted Avg Temp 12 Hr CHNG (NGwk) | GW AvgT 12 hr CHG (NGwk) |
| Gas Weeks | GWAvgT_Chng_18 h_NG WKs | Gas Weighted Avg Temp 18 Hr CHNG (NGwkl | GW AvgT 18 hr CHG (NGwk) |
| Gas Weeks | GWAvgT.Chng_24 h.NG WKs | Gas Weighted Avg Temp 24 Hr CHNG (NGwkl | GW AvgT 24 hr CHG (NGwk) |
| GM Weeks | GWAvgT Chng_6 h NG WKs | Gas Weighted Avg Temp 6 Hr CHNG (NGwk) | GW AvgT 6 hr CHG (NGwk) |
| Gas Weeks | GWAvgT_Diff_10 Y Avg_NG WKs | Gas Weighted Avg Temp 10yr Anomaly (NGwb| | GW AvgT 10 yr ANOM (NGwk) |
| Gas Weeks | GWAvgT_Diff_15 Y Avg_NG WKt | Gas Weighted Avg Temp 15yr Anomaly (NGwk) | GW AvgT 15 yr ANOM (NGwk) |
| Gas Weeks | GWAvgT_Diff_30 Y Avg_NG WKt | Gas Weighted Avg Temp 30yr Anomaly (NGwk) | GW AvgT 30 yr ANOM INGwk) |
| Gas Weeks | GWAvgT_Diff_o30YAvgDIFF_NG WKs | Gas Weighted AvgTemp Official 30yr Anomaly (NGwk) | GW AvgT o30 yr ANOM (NGwk) |
| D | GWMaxT | Gas Weighted Max Temp | GW Max Temp |
| D | GWMaxT_Chng_12 h | Gas Weighted Max Temp 12 Hr CHNG | GW XT 12 hr CHG |
| D | GWMaxT_Chng_18 h | Gas Weighted Max Temp 18 Hr CHNG | GW XT 18 hr CHG |
| D | GWMaxT_Chng_24 h | Gas Weighted Max Temp 24 Hr CHNG | GW XT 24 tM CHG |
| D | GWMaxT_Chng_6 h | Gas Weighted Max Temp 6 Hr CHNG | GW XT 6 hr CHG |
| D | GWMaxT_Diff_10 Y Avg | Gas Weighted Max Temp 10 yr Anomaly | GW XT 10 yr ANOM |
| D | GWMaxT_Diff_15 Y Avg | Gas Weighted Max Temp 15 yr Anomaly | GW XT 15 yr ANOM |

TABLE 2-continued

Example (non-limiting) list of a weather forecast variables for the weather symbology.

| Time Frame | Field Name | Front End Long | Short |
|---|---|---|---|
| D | GWMaxT_Diff_30 Y Avg | Gas Weighted Max Temp 30 yr Anomaly | GW XT 30 yr ANOM |
| D | GWMaxT_Diff_o30 Y Avg DIFF | Gas Weighted Max Temp Official 30 yr Anomaly | GW XT o30 yr ANOM |
| Gas Weeks WKs | GWMaxT_NG | Gas Weighted Max Temp (NG weeks) | GW Max Temp (NGwk) |
| Gas Weeks WKs | GWMaxT_Chng_12 h.NG | Gas Weighted Max Temp 12 Hr CHNG (NGwk) | GW XT 12 hr CHG (NGwk) |
| Gas Weeks WKs | GWMaxT_Chng18 h.NG | Gas Weighted Max Temp 18 Hr CHNG (NGwk) | GW XT 18 hr CHG (NGwk) |
| Gas Weeks WKt | GWMaxT_Chng_24 h.NG | Gas Weighted Max Temp 24 Hr CHNG (N6wk) | GW XT 24 hr CHG (NGwk) |
| Gas Weeks WKs | GWMaxT_Chng_6 h.NG | Gas Weighted Max Temp 6 Hr CHNG (NGwk) | GW XT 6 hr CHG (NGwk) |
| Gas Weeks WKs | GWMaxT_Diff_10 Y Avg_NG | Gas Weighted Max Temp 10yr Anomaly INGwk) | GW XT 10 yr ANOM (NGwk) |
| Gas Weeks G WKs | GWMaxT_Diff_15 Y Avg_N | Gas Weighted Max Temp 15yr Anomaly (NGwk) | GW XT 15 yr ANOM INGwk) |
| Gas Weeks G WKs | GWMaxT_Diff_30 Y Avg_N | Gas Weighted Max Temp 30yr Anomaly (NGwk) | GW XT 30 yr ANOM (NGwk) |
| Gas Weeks | GWMaxT_Diff_o30 Y AvgCLIMO_NG WKs | Gas Weighted Max Temp Official 30yr Anomaly (NGwk) | GW XT o30 yr ANOM (NGwk) |
| D | GWMinT | Gas Weighted Min Temp | GW Min Temp |
| D | GWMinT_Chng_12 h | Gas Weighted Min Temp 12 Hr CHNG | GW NT 12 hr CHG |
| D | GWMinT_Chng_18 h | Gas Weighted Min Temp 18 Hr CHNG | GW NT 18 hr CHG |
| D | GWMinT_Chng_24 h | Gas Weighted Min Temp 24 Hr CHNG | GW NT 24 hr CHG |
| D | GWMinT_Chng_6 h | Gas Weighted Min Temp 6 Hr CHNG | GW NT 6 hr CHG |
| D | GWMinT_Diff_10 Y Avg | Gas Weighted Min Temp 10 yr Anomaly | GW NT 10 yr ANOM |
| D | GWMinT_Diff_15 Y Avg | Gas Weighted Min Temp 15 yr Anomaly | GW NT 15 yr ANOM |
| D | GWMinT_Diff_30 Y Avg | Gas Weighted Min Temp 30 yr Anomaly | GW NT 30 yr ANOM |
| D | GWMinT_Diff_o30 Y Avg DIFF | Gas Weighted Min Temp Official 30 yr Anomaly | GW NT o30 yr ANOM |
| Gas Weeks WKs | GWMinT_NG | Gas Weighted Min Temp (NG weeks) | GW Min Temp (NGwk) |
| Gas Weeks WKs | GWMinT_Chng_12 h_NG | Gas Weighted Min Temp 12 Hr CHNG (NGwk) | GW NT 12 hr CHG (NGwk) |
| Gas Weeks WKs | GWMinT_Chng_18 h_NG | Gas Weighted Min Temp 18 Hr CHNG (NGwk) | GW NT 18 hr CHG (NGwk) |
| Gas Weeks WKs | GWMinT_Chng_24 h_NG | Gas Weighted Min Temp 24 Hr CHNG (NGwk) | GW NT 24 hr CHG (NGwk) |
| Gas Weeks WKs | GWMinT_Chng_6 h_NG | Gas Weighted Min Temp 6 Hr CHNG (NGwk) | GW NT 6 hr CHG (NGwk) |
| Gas Weeks WKs | GWMinT_Diff_10 Y Avg NG | Gas Weighted Min Temp 10 yr Anomaly (NGwk) | GW NT 10 yr ANOM (NGwk) |
| Gas Weeks WKs | GWMinT_Diff_15 Y Avg_NG | Gas Weighted Min Temp 15 yr Anomaly (NGwk) | GW NT 15 yr ANOM (NGwk) |
| Gas Weeks WKs | GWMinT_Diff_30 Y Avg_NG | Gas Weighted Min Temp 30 yr Anomaly (NGwk) | GW NT 30 yr ANOM (NGwk) |
| Gas Weeks WKs | GWMinT_o30 AvgDIFF_NG | Gas Weighted Min Temp Official 30 yr Anomaly (NGwk) | GW NT o30 yr ANOM [NGwk] |

Components of DID system 102 (FIG. 1) and/or weather integration server 116 (FIG. 2) of the present disclosure may be embodied on a single computing device. In other examples, components of DID system 102 and/or weather integration server 116 may be embodied on two or more computing devices distributed over several physical locations, connected by one or more wired and/or wireless links. It should be understood that DID system 102 of the present disclosure refers to a computing system having sufficient processing and memory capabilities to perform the specialized functions described herein.

Some portions of the present disclosure describe embodiments in terms of algorithms and/or routines and symbolic representations of operations on information. These algorithmic descriptions and representations are used to convey the substance of this disclosure effectively to others skilled in the art. These operations, while described functionally, computationally, or logically, are to be understood as being implemented by data structures, computer programs or equivalent electrical circuits, microcode, or the like. Furthermore, at times, it may be convenient to refer to these arrangements of operations as routines or algorithms. The described operations and their routines/algorithms may be embodied in specialized software, firmware, specially-configured hardware or any combinations thereof.

Figure 3A:
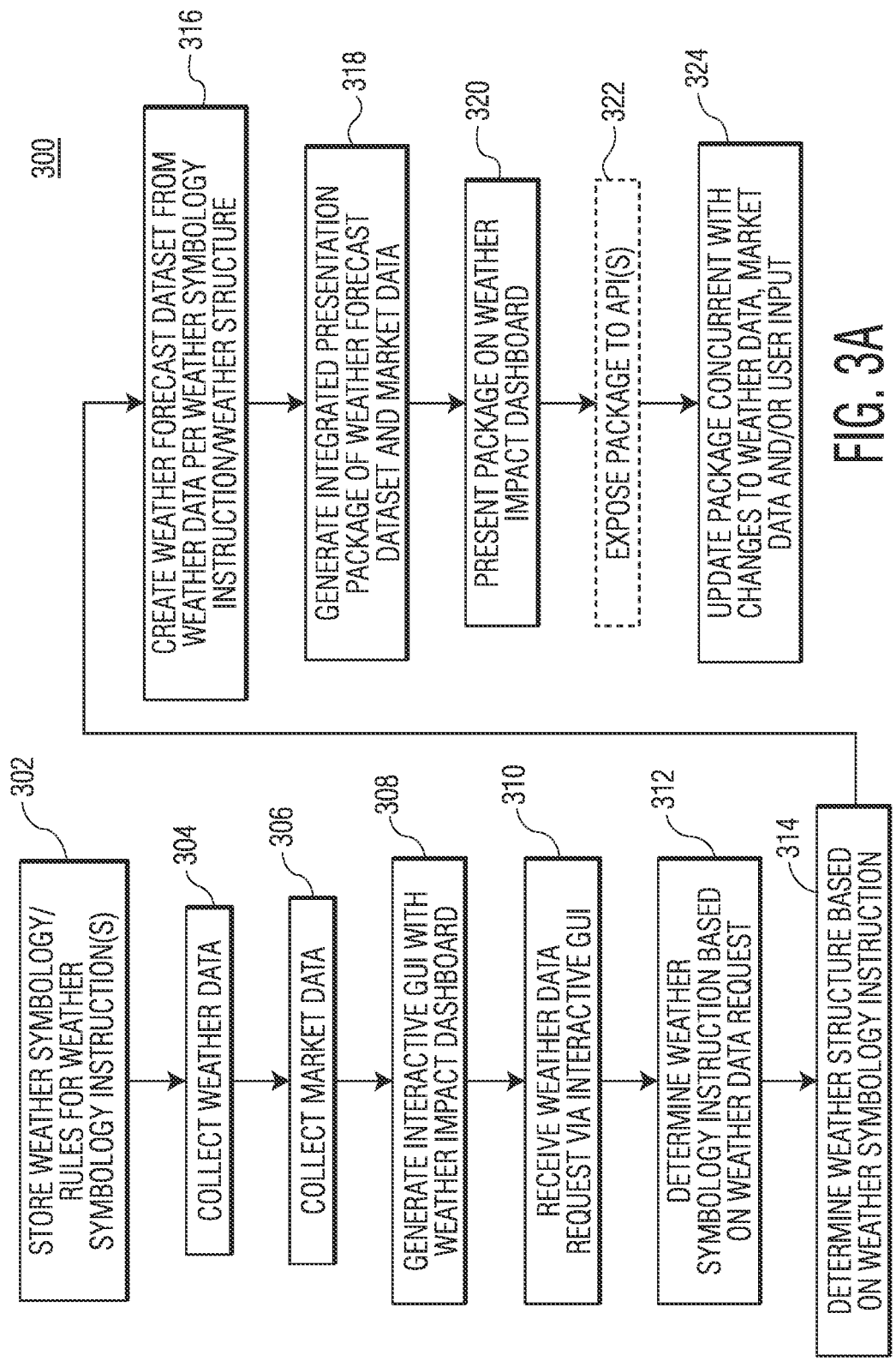
FIG. 3A is a flowchart diagram of an example method of generating integrated weather and market data, according to an aspect of the present disclosure.
Figure 3B:
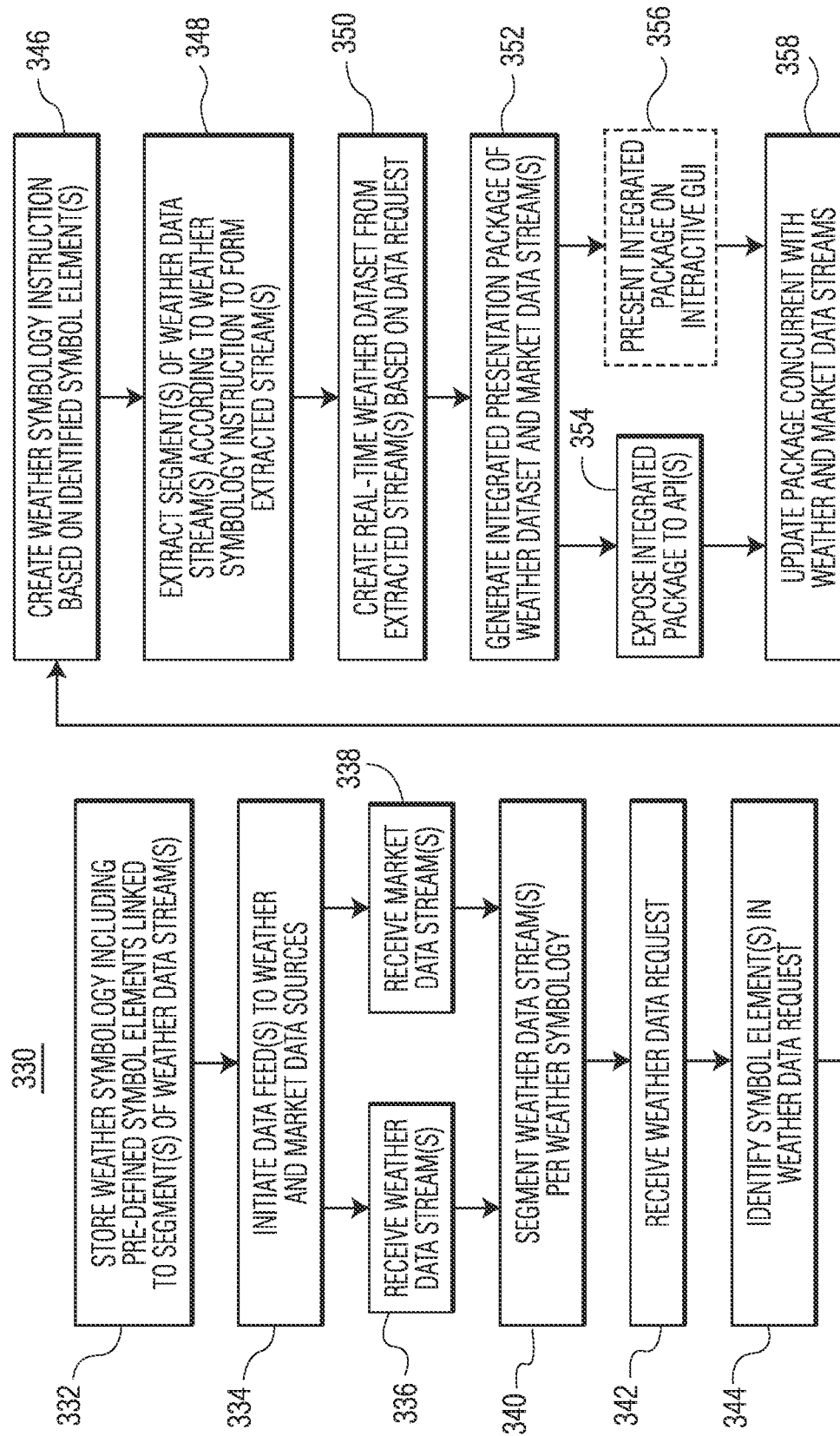
FIG. 3B is a flowchart diagram of an example method of generating integrated weather and market data for streaming data, according to another aspect of the present disclosure.
Figure 3C:
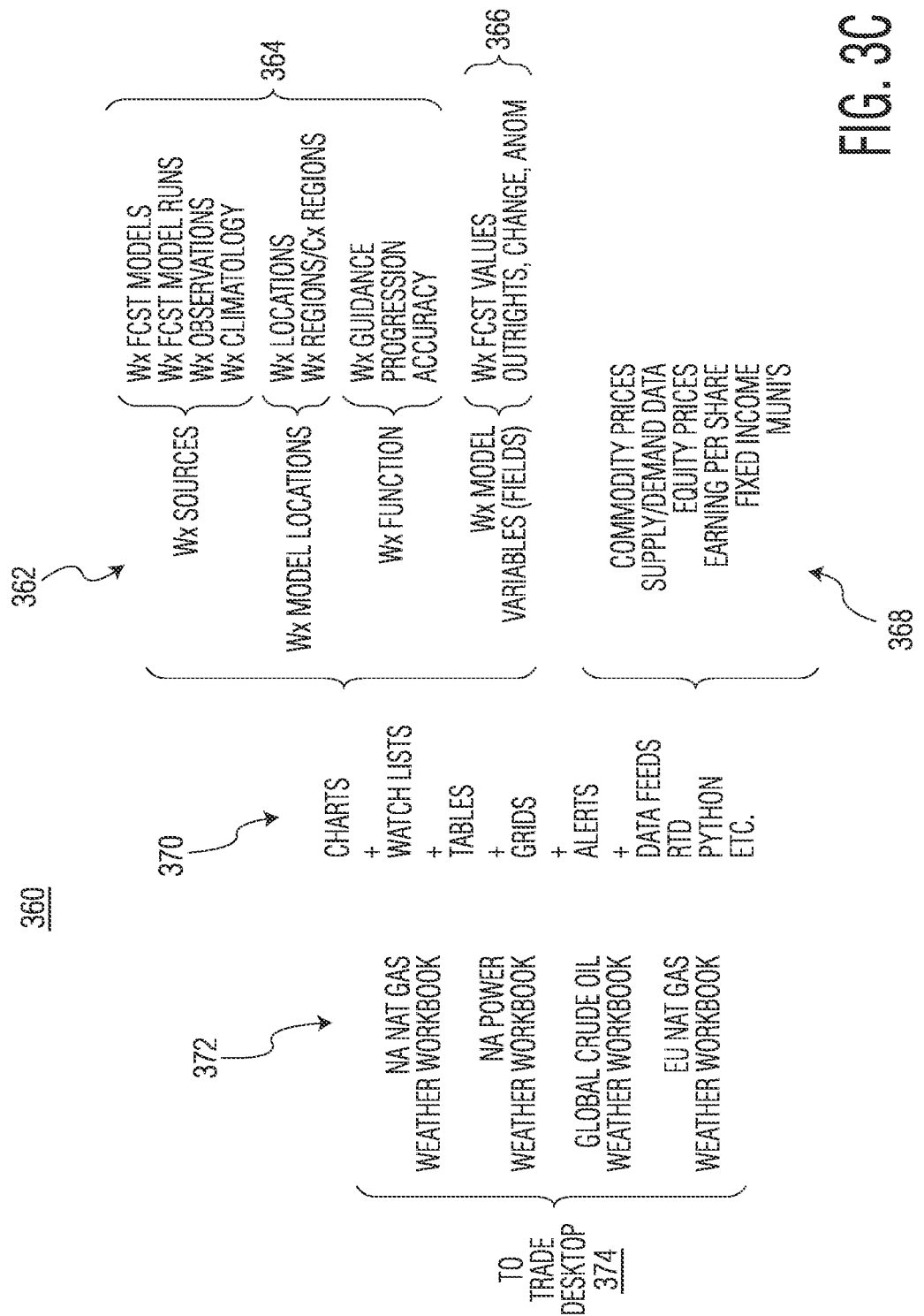
FIG. 3C is a hierarchical diagram illustrating an example weather symbology and use of the weather symbology to form various presentation packages, according to an aspect of the present disclosure.

Those skilled in the art will appreciate that DID system 102 (of FIG. 1) may be configured with more or less components to conduct the methods described herein with reference to FIGS. 3A and 3B. The methods described herein (that may be conducted by DID system 102 of the present disclosure) may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components associated with components 204-216 of weather integration server 116 of FIG. 2. With respect to FIGS. 3A and 3B, although these flowcharts may illustrate a specific order of method steps, it is understood that the illustrated methods are exemplary, and that the order of these steps may differ. Also, in some examples, two or more steps may be performed concurrently or with partial concurrence.

FIG. 3A is a flowchart diagram of an example method 300 of generating integrated weather and market data associated with data distribution environment 100 of FIG. 1, and weather integration server 116 and time series server 118 of FIG. 2, according to an aspect of the present disclosure.

At step 302, weather integration server 116 may store a pre-defined weather symbology (e.g., in storage 214). The weather symbology may include one or more pre-defined symbol elements, one or more variables and one or more pre-defined rules for combining and/or arranging elements among the symbol elements to form a weather symbology instruction having a pre-defined instruction structure. As discussed herein, the inclusion of one or more symbol elements in the pre-defined instruction structure may be used to create a variety of weather symbology instructions. In general, a weather symbology instruction may include symbol elements including at least one weather observation location, a weather structure (such as a weather perspective) and weather forecast model information. The weather symbology instruction may include additional variable information (such as condition(s) and/or function(s)) for generating desired weather forecast/observations data that may be integrated with market data, and that may provide actionable knowledge. In some examples, the symbol elements may be linked to different segments of weather data stream(s) associated with weather data source(s) 104.

At step 304, data collector 112 may collect weather data among weather data source(s) 104. In some examples, the weather data may include weather observations data for one or more observation locations and weather forecast model data for one or more weather forecast models (including, in some examples, different model runs). At step 306, data collector 112 may collect market data among market data source(s) 106. In some examples, collected weather data (step 304) may be distributed to weather integration server 116 and collected market data (step 306) may be distributed to time series server 118 (e.g., by data feed distributor 114). In some examples, weather integration server 116 may segment the collected weather data (step 304) into one or more segments based on the weather symbology (stored in step 302). It is understood that both the weather data and the market data may change over time and that steps 304 and 306 may include repeatedly collecting the weather and market data respectively, as the corresponding data changes. It is also understood that updates to the weather data may occur at different frequencies than updates to the market data. In some examples, the collection of weather and market data (steps 304 and 306) may include the capture of (real-time) weather data stream(s) and (real-time) market data stream(s) (e.g., via one or more data feeds).

At step 308, DID system 102 may generate interactive GUI 120 including weather impact dashboard 122 for display on user device(s) 108. In some examples, a configuration of weather impact dashboard 122 may depend on an underlying client application/service 126 for which it is launched (e.g., a trading desktop, a mobile application, a spreadsheet application, an API, etc.). At step 310, time series server 118 may receive a weather data request (e.g., data request 224) from user device(s) 108 via interactive GUI 120.

At step 312, time series server 118 may determine a weather symbology instruction based on the received weather data request (step 310). In some examples, the weather data request may directly include the weather symbology instruction. In some examples, time series server 118 may convert the weather data request into the weather symbology instruction having the pre-defined instruction structure, in accordance with the pre-defined rules and pre-defined symbology elements (step 302) stored in storage 214.

At step 314, time series server 118 may determine a pre-defined weather structure (e.g., a perspective) from the weather symbology instruction (determined in step 312). At step 316, time series server 118 may create a weather forecast (and/or observations) dataset (also referred to as weather forecast/observations dataset) from among the collected weather data, based on the weather symbology instruction including the weather structure indicated in the weather symbology instruction. For example, time series server 118 may obtain the corresponding weather perspective among the weather structure(s) (from storage 216), and may extract at least a portion of the segmented weather data 218 (from among the collected observation data and at least a portion of the weather forecast model data) based on the symbol elements/variable(s) in the weather symbology instruction. The extracted weather forecast/observation(s) data associated with the weather symbology instruction and any other data and/or information associated with the corresponding weather structure may then form the weather forecast/observations dataset. The weather forecast/observations dataset may also be formed as a function of exchange time and interval time, for ease of integration with the collected market data.

At step 318, time series server 118 may generate an integrated presentation package comprising a combination of the weather forecast/observations dataset (step 316) and a portion of the collected market data (step 306), configured in such a manner so that the weather forecast/observations dataset is integrated with the portion of the collected market data. At step 320, the integrated presentation package (step 318) may be presented on interactive GUI 120 via weather impact dashboard 122. In some examples, the integrated presentation package may be presented in such a manner to permit user interaction, including, in some examples, user-customization of the integrated presentation package. At optional step 322, DID system 102 may expose the integrated presentation package to one or more APIs. In some examples, step 320 may not be performed and step 322 may be performed instead. In some examples, steps 308 may not be performed and step 310 may include receiving a weather data request via user device(s) 108, without being received via an interactive GUI (e.g., via client application(s)/service(s) 126).

At step 324, the integrated presentation package may be updated (e.g., on weather impact dashboard 122, via one or more APIs) concurrent with changes to the weather data, the market data and/or user input (including changes in real-time). In some examples, the weather and market data may each include real-time data streams, such that steps 318 and 320 (and/or optional step 322) may generate and present the presentation package in real-time, using real-time streaming data.

FIG. 3B is a flowchart diagram of an example method 330 of generating integrated weather and market data for streaming data associated with data distribution environment 100 of FIG. 1, and weather integration server 116 and time series server 118 of FIG. 2, according to an aspect of the present disclosure.

At step 332, a pre-defined weather symbology may be stored, for example, in storage 214. As described herein, the weather symbology may include pre-defined symbol elements that may be linked to one or more segments of one or more weather data streams. In some examples, storage 214 may also store one or more rules for generating weather symbology instruction(s). In some examples, DID system 102 may include a pre-defined market symbology, similar to the weather symbology, that may be linked to one or more segments of one or more market data streams.

At step 334, one or more data feeds to weather data source(s) 104 and market data source(s) 106 may be initiated, for example, via data collector 112. In example method 330, weather data source(s) 104 and market data source(s) 106 may provide streaming data via corresponding data feed(s). In some examples, data collector 112 may also receive other data/information from among weather data source(s) 104 and market data source(s) 106 in a non-streaming manner, such as, periodically, in response to an event, condition and the like. At step 336, data collector 112 may receive one or more weather data streams from weather data source(s) 104 (via respective data feed(s) initiated in step 334). At step 338, data collector 112 may receive one or more market data streams from market data source(s) 106 (via respective data feed(s) initiated in step 334).

At step 340, the received weather data stream(s) (in step 336) may be segmented (e.g., separated and/or indexed), for example, by weather integration server 116, based on the weather symbology (stored in step 332), to form segmented (streaming) weather data. For example, the weather data stream(s) may be segmented in accordance with the (linked) pre-defined symbol elements. In this manner, a particular segment of the segmented weather data that is linked to a particular pre-defined symbol element may be extracted and the extracted (streaming) segment used to create an integrated presentation package, stream to user device(s) 108, provided to an external system for further analysis and the like. In some examples, time series server 118 may be configured to segment the received market data stream(s) into one or more segments based on a pre-defined market symbology.

At step 342, time series server 118 may receive a weather data request (e.g., via interactive GUI 120, via client application(s)/service(s) 126, etc.). At step 344, time series server 118 may identify one or more requested symbol elements (and in some examples, one or more variables) in the received weather data request (step 344). At step 346, time series server 118 may create at least one weather symbology instruction based on the identified symbol element(s) (and, in some examples any variables) as identified in step 344. In some examples, the received weather data request (step 342) may directly include in a weather symbology instruction, so that steps 344 and 346 may be skipped.

At step 348, time series server 118 may extract one or more segments of the segmented weather data stream(s) according to the weather symbology instruction (step 346) to form one or more extracted weather stream(s) associated with the weather symbology instruction. In particular, the identified symbol elements, that are linked to corresponding segments of the segmented weather data stream(s) may be used to extract particular segment(s) of the segmented weather data stream(s). In some examples, any variables (e.g., conditions, functions) in the weather symbology instruction may be used to further extract segment(s) and/or portion(s) of segment(s) of the segmented weather data stream(s).

At step 350, time series server 118 may create a real-time (streaming) weather dataset from the extracted weather stream(s), based on the weather data request (step 342). More particularly, a weather structure that may be indicated in the weather symbology instruction (determined from the weather data request) may be obtained from storage 216, and may be used to create the real-time weather dataset from the extracted weather stream(s). The real-time weather dataset may be formed as a function of exchange time and interval time, for ease of integration with the market data stream(s).

At step 352, time series server 118 may generate an integrated presentation package of the real-time weather dataset and one or more market data stream(s) (received at step 338). In some examples, time series server 118 may also extract one or more segments among similarly segmented market data stream(s) based on any market data symbology (e.g., indicated in the weather data request, based on pre-defined parameter(s) set by DID system 102, based on pre-defined parameter(s) indicated by the user, and the like).

At step 354. DID system 102 may expose the integrated presentation package to one or more APIs. At optional step 356, the integrated presentation package may be presented on weather impact dashboard of interactive GUI 120. In some examples, step 354 may not be performed and step 356 may be performed instead. In some examples, both steps 354 and 356 may be performed.

At step 358, the integrated presentation package may be updated (e.g., via one or more APIs, on weather impact dashboard 122, etc.) concurrent with changes to the weather data stream(s), the market data steam(s) and/or user input.

Referring to FIG. 3C, hierarchical diagram 360 illustrating example weather symbology 362 and use of weather symbology 362 to form various presentation packages 370 are shown. In general, weather symbology 362 may include one or more weather symbol elements 364 (e.g., weather model sources, weather model locations and weather functions also referred to as weather perspectives). Weather symbology 362 may also include one or more weather variables 366 (e.g., functions and/or conditions). Symbol element(s) 364 and weather variable(s) 366 may be linked to particular segments of one or more weather data streams. A combination of symbol element(s) 364 and weather variable(s) 366 may be arranged into at least one weather symbology instruction (having the instruction structure described herein) in order to extract the particular linked segments of the weather data stream(s) to form a weather dataset. Similarly, time series server 118 may use market data symbology 368 (symbol elements/variables associated with, for example, commodity prices, supply/demand data, equity prices, earning per share data, fixed income data, municipal bonds, etc.) to extract particular segments from market data stream(s). Time series server 118 may combine the weather dataset (from among weather symbology 362 and market data symbology 368) to form one or more presentation packages 370 (e.g., charts, watchlists, tables, grids, alerts, data feeds, data associated with object oriented programming languages (e.g., Python™), spreadsheet-formatted data (such as with RTD links), etc.). Presentation package(s) 370 may be presented to user device(s) 108 via client application(s) service(s) 126. In some examples, presentation packages(s) 370 may be further configured into one or more weather workbooks 372 (e.g., natural gas (North America (NA), Europe (EU)), power, global crude oil, etc.) for presentation on trade desktop 374.

In general, weather symbology 362 may be configured to instantly convert weather data into accurate and actionable knowledge, tailored specifically for traded instruments, via one or more (interactive) presentation packages. In some examples, weather data may be accessed in real-time suing weather symbology 362. Because of the weather symbology of the present disclosure, extremely large streams of weather and price data may be converted into Actionable Knowledge (such as presentation packages 370, weather workbooks 372 and the like). Of significance, weather symbology 362 provides a mechanism to rapidly break down streaming weather data into the smallest possible building blocks in a manner configured to be integrated with market data handled by time series server 118, and for interactive presentation on trading desktop 374. The actionable knowledge (e.g., components 370, 372) created by DID system 102 allows users to instantly and easily interact with both weather and price data streams (e.g., including through time and space). Still further, weather symbology 362 allows user to create any user-customizable weather display. In some examples, weather symbology 362 may be configured to treat weather data similar to a traded instrument, so that weather symbol element 364/weather variable 366 may be entered directly into a chart, table, watchlist, etc. to view the weather data directly. Yet further, weather symbology 362 also allow the weather data to be accessed from multiple directions (e.g., three separate directions, catering to (in some examples) three primary weather workflows (e.g., guidance, progression and accuracy).

Description of Weather Symbology

Next, a detailed description of the weather symbology of the present disclosure is provided.
1) General: All symbols (also referred to as symbol elements) have the same basic structure. In general, a weather symbology instruction includes a same pre-defined weather symbology instruction structure:
    a. Location {space} Function {underscore}_ Model Run {Dash}- Wx Model. {dot} field name
        i. EX: KORD MR0!_12z-GFS
        ii. wx variables can be added at the end of the weather symbol
        iii. 'Model Run' is an optional field
        iv. Dates are expressed as YYMMDD (2 digits each)
            1. If a specific hour of the day (or model hour) is required, it accepts
            1-3 digits:
                a. YYMMDDHHH
        v. Model runs (2 digits along with a "z", for example 06z)
        vi. Rolling Symbols have a bang "!"
2) Guidance (aka Model Runs): All weather symbols below can access any time aggregations such as seasonal, monthly, weekly and as an example both "Daily" weather forecast fields (e.g., days 1-16) or "Hourly" weather forecasts (e.g., model hours 1-384). See FIG. 5.
    a. ROLLING
        i. KORD MR0! (Model Run Now) is the current model (whatever wx model is running now, or the last model to run (if in between model runs). This instruction extracts the latest weather model which is coming in now or the last model to have run.
            1. EX: KORD MR0!-GFS
        ii. KORD MR0!_12z-GFS is requesting the latest 12z model run.
            1. To access any previous model run of the 12z see below. If the 12z was omitted the symbol would return the last run of the GFS, whichever model run was the most current.
        iii. MR1! (1 through 99) is that many "model runs ago" for whatever comes after it. Will go back x # of runs for the suffix. So MR1!_12x-GFS will be yesterday's 12z GFS, MR1! GFS will be 1 model run ago.
            1. KORD MR1!-GFS (for −1 model run back, from which ever model run of the GFS is current)
            2. KORD MR1!_12 z-GFS (for the previous days run of the specific 12z GFS)
    b. Specific
        i. Daily
            1. KORD MR200301-GFS (YY,MM,DD): returns all the GFS weather forecast model runs which were produced on Mar. 1, 2020 (aka Model Run Date) This function provides extraction of a historical weather forecast from specific "model run dates" and for specific weather models and model runs.
        ii. Model Run Specific
            1. KORD MR200301_12z-GFS (YY,MM,DD): returns only the 1 model run (i.e. 12z) of the GFS which was produced on Mar. 1, 2020 and is the 12z. This function provides extraction of a historical weather forecast from specific "model run dates" and for specific weather models and runs.
3) Progression (aka Forecast Dated Day & Forecast Dated Hour): Provides an analysis of how the forecast models changed over time for a specific Forecast Valid 'Day', 'Date' or 'time of day' (aka hour) on a specific Date also known as the "Target Date. Can be displayed in "Exchange time" or "interval start"). Note: when charting these symbols it may be useful to 'chart' using "exchange time" (on the x axis) to view this progression data in the correct order (i.e. as it was released by model run), considering the Forecast Valid 'day/date' is locked into the symbol (i.e. the Forecast Valid data is normally plotted on the x axis using local day/date. See FIGS. 6A-6C.

a. Specific:
  i. Daily Forecast: KORD FDD200301_12z-GFS (YY,MM,DD): This symbol provides a history of all the 12z GFS weather forecasts, which pertain to that specific target 'Date' which is noted in the symbol; e.g., Mar. 1, 2020. Note: If the "12z" was omitted in this symbol, the alternate symbol design would return "all model runs" of the GFS, which provided a (daily) forecast for that specific date.
  ii. Hourly Forecast: KORD FDH20030113_12z-GFS (YY,MM,DD,HH) Same as above, but provides a specific hour (aka time of day) on a specific date. This symbol provides a history of all the 12z GFS Forecasts and may return the weather forecasts which pertain to that specific 'Date', e.g., Mar. 1, 2020 at 1 pm "local time" for that specific location. In an example, this specific "time of day" is noted by hour "13", which is appended to the date. The "13" represents the "local time" of day, for that specific location. The last 2 digits range from 01 (1 am) to 24 (midnight). Note: If the "12z" was omitted in this symbol, the new symbol would return "all model runs" of the GFS, which provided an "Hourly" forecast for that time of day, for that specific date.

b. Rolling
  i. Daily Forecast: KORD FDD2!-12z-GFS: This symbol acts exactly in the same manner as above, except that the specific "Date" may be unknown (just the Forecast Valid "Day" may be known). For example if a user did not know tomorrow's "Date" this rolling symbology structure may be used to lock into the "Date" which is now "Day2".
    1. In summary: This symbol provides a history of all the 12z GFS weather forecasts, which pertain to that specific target "Date" which is now noted in the symbol; as "Day2". Tomorrow that same "Day2" element in the weather symbol, will refer to a different specific "Forecast valid Date".
    2. Note: If the "12z" was omitted in this symbol, the new symbol would return "all 4 model runs" of the GFS, which provided a daily forecast for that specific 'Date', which is currently Day 2.
    3. Note because "Day 1" equals "Today". That is different than the manner in which we normally count. For example, FDD7! is 6 days from today.
  ii. Hourly Forecast: KORD FDD2_H13!-12z-GFS: Provides a history of all the 12z Forecasts and may return the weather forecasts which pertain to that specific "Forecast Day" at that specific "Time of Day" on tomorrow Day 2, being "Local Hour 13" which is 1 pm. Note: These times are expressed as the local hour of the specific location's day/date.
    1. If the "12z" was omitted in this symbol, the new symbol would return "all 4model runs" of the GFS, which provided a Hourly forecast for that specific date & time which is currently defined as Model Hour 120.
    2. Note the H is two (2) digits ranging from 1-24, with 1=1am and 24=midnight.
  iii. Model Hour: KORD FDH012z-GFS: Returns the history of 12z GFS weather forecasts for only model hour 0. This is independent of what every the local day/time is related to the forecast Valid period (acting very similar to an accuracy workflow like the KORD FCH13!_12z-GFS example (below).
    1. If the "12z" was omitted in this symbol, the new symbol would return "all 4model runs" of the GFS, which provided a Hourly forecast for Model Hour 0.
    2. Note that H is two (2) digits ranging from 0-384.

4) Accuracy (aka Forecast Continuation Day & Forecast Continuation Hour): This symbology structure may line up the weather forecast data in a manner which allows a user to easily match the extracted weather forecasts with weather observations. These observations can then be subtracted from the extracted forecasts to derive forecast accuracy statistics such as Bias, root mean square error (RMSE), Error, standard deviation (std) of error, etc. In summary, this Accuracy based symbology may return all historical weather forecast information in a manner which lines up all previous weather forecasts for a specific (rolling) days in the future (like all the 'Day 1' forecasts would be lined up (then all day 2, 3, 4, etc.) or specific (rolling) "model hours" in the future (like model hour 3, 6, 9, 12, etc.) See FIGS. 7A and 7B.

a. Rolling
  i. Daily Forecast: KORD FCD1!_12z-GFS: Provides the "Day 1" forecast from all 12z GFS weather forecasts stored in a database.
    1. Note: If the "12z" was omitted in this symbol, the new symbol would return "all 4 model runs" of the GFS.
  ii. Hourly Forecast: KORD FCH13!_12z-GFS: Provides the "model hour 13" forecast from all 12z GFS weather forecasts stored in a database. Note: These are forecast "model hours" and range from 0-384 as opposed to the manner in which "Forecast Valid" date & time of day is used (as in FDH above) which starts at '1' indicating 1am local time, for a specific location.
    1. Note: If the "12z" was omitted in this symbol, the new symbol would return "all 4model runs" of the GFS.

5) METAR SYMBOLOGY: METAR is one particular source of global weather observations. METAR reports weather observations from key airports (globally) in a relatively timely manner, so there is typically little (if any) cleaning to this weather observation data stream.
  a. General Structure <Location><Suffix>
    i. KORD-METR 6) MISCELLANEOUS (MISC.):
  a. AutoListing: save the user time from typing in many different symbols.
    i. MR's
      1. *<Location> MR!<Model>—returns 4 current model runs
      2. Example: *KORD MR!-GFS
      3. *<Location> MR!<Model><N-N>—returns the last N Model Runs
      4. Example: *KORD MR!_12z-GFS 0-2 ii. FDD's (Progression)
  1. *<Location> FDD!<Model>-returns FDD 1-16
  2. Example: *KORD FDD!_12z-GFS
  3. *<Location> FDD!<Model><N-N>-returns the last N FDD
  4. Example: *KORD FDD!_12z-GFS 1-5
  5. *<Location> FDH!<Model>-returns all hourly symbols
  6. Example: *KORD FDH!_12z
  7. *<Location> FDH!<Model><N-N>-returns N hourly symbols
  8. Example: *KORD FDH!_12z 1-12
iii. FC's (Accuracy)
  1. *<Location> FCD!<Model>-returns all continuous daily history symbols
  2. Example: *KORD FCD!_12z
  3. *<Location> FCD!<Model><N-N>-returns N continuous daily history
  4. Example: *KORD FCD!_12z 1-12
b. Forecast Valid Days: 1-16 (or beyond, depending upon the duration of the various wx forecast models): Day 1=today (there is no Day 0). In some examples, "Day 1=today", so "Forecast Valid Day 4" is "3 days" from now (For example: (1) today/Monday, (2) tomorrow/Tuesday, (3) next day/Wednesday, (4) target day/Thursday).
c. Model Runs (00z-23z). Most Weather Forecast Models are 00z, 06z, 12z, 18z)
d. Forecast Valid Hours in a Specific 'Date' or 'Day' (e.g., in local time)
  i. Range from 1-24 (e.g., 13=1:00 pm local time)
e. Forecast 'Model Hours', in some examples, may be from the start of the weather model run and extend out into the future. In some examples, weather forecast models are 384 or 240 hours into the future.
  i. Range from 0-384 (for example).
f. Ensemble Variables
  i. Location_ {underscore} Ensemble variable {space} Function _ {underscore} Model Run {Dash}-Wx Model
    1. EX: KORD MEAN MR0!_12z-GFS
  ii. In some examples, a default variable for Ensemble models is the "MEAN" or average of all perturbations
  iii. Other selectable Ensemble variables may include:
    1. MAX (highest ensemble member)
    2. MIN (lowest ensemble member)
    3. MEAN (Average of all ensemble members or also can be used as 50% of all members)
    4. +1/−1 STD (1 standard deviation is derived which can be added or subtract from the MEAN)
    5. PER10 ($10^{th}$ percentile of all members)
    6. PER25 ($25^{th}$ percentile of all members)
    7. PER75 ($75^{th}$ percentile of all members)
    8. PER90 ($90^{th}$ percentile of all members)
  iv. GFS ENS: Fast vs Full—
    1. Fast may be derived using, for example, 50% of the total Ensemble members. For example, the first 10, of the 20 ensemble members. These preliminary values have an extraordinarily high correlation to capture the directional change (and magnitude) of the Full forecast. The benefit to providing this directional perspective is receiving this information approximately 30 seconds before all ensemble members can be modeled and transmitted to other users. This concept works for streaming Ensemble models (e.g., GFS ENS), when ALL Ensemble members are computed.
  v. Interpolated Values:
    1. In some examples systems of the present disclosure may receive weather forecasts (which may arrive "As-Is"), and interpolate the forecast hours which were not forecasted by the weather model. In some examples, systems of the present disclosure may extract the "Trailing Minimum" and "Trailing Maximum" temperatures from the weather forecast grib files, and then using a diurnal pattern based upon data (or a blend of data), may place these trailing Minimum & Maximum values between the reported forecasts which reside on the top of each hour.
  vi. % Complete:
    1. This is a unique element of the present disclosure which allows users an advantage, viewing official daily weather forecast information a few minutes prior to the rest of the marketplace. This process may provide "preliminary forecasted values" for daily Max, Min, Avg temperature, or daily GWDD, Heating Degree Day (HDD), Cooling Degree Day (CDD) values, when the weather forecast model is partially (e.g., 50%) completed for any forecast Day and provide real-time updates as that forecast Day runs through 100% complete. The preliminary Daily values of the present disclosure may provide users insight, a few minutes in advance of other services, who only publish a forecast Day at 100%.

Figure 8A:
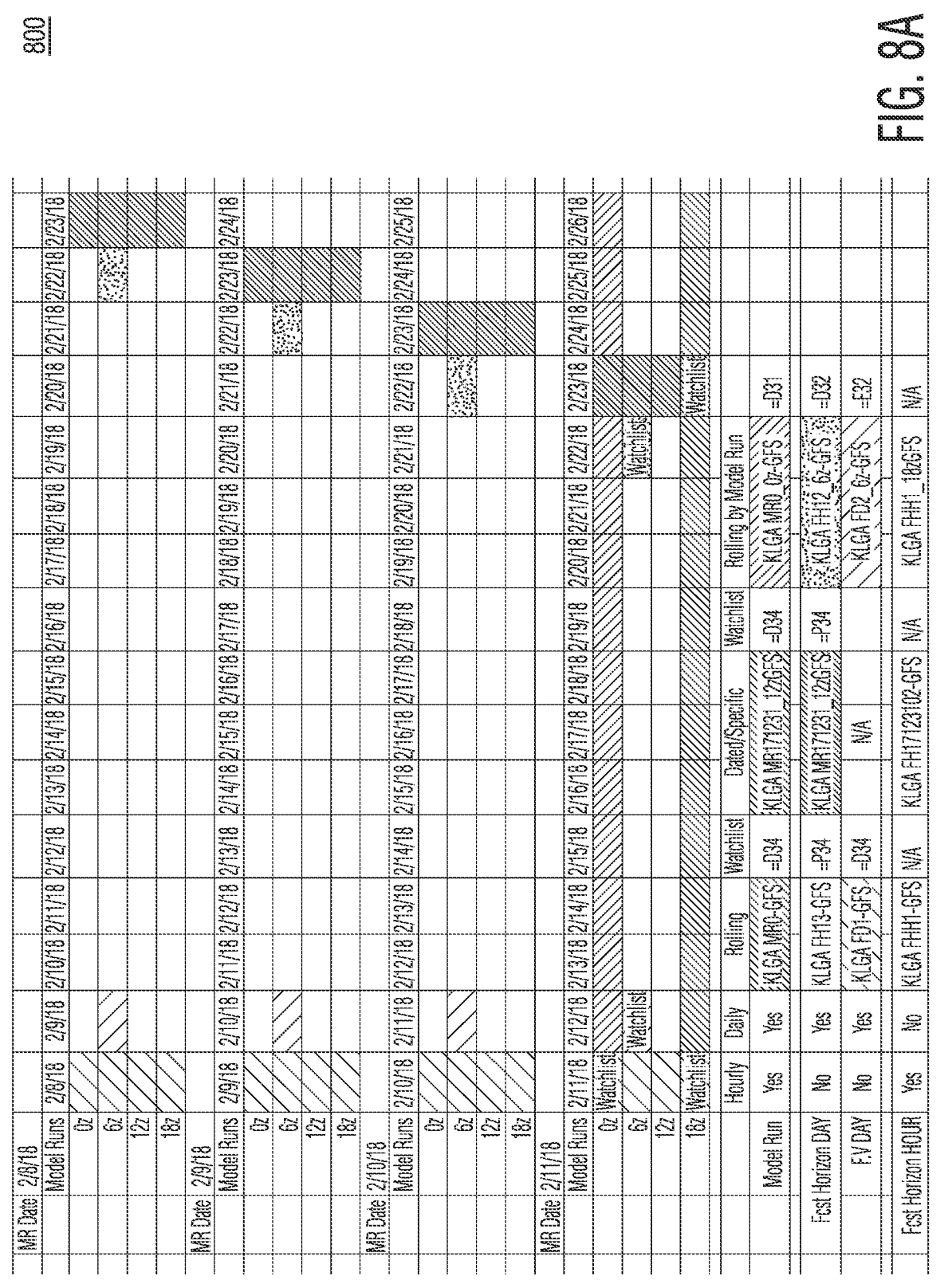
Figure 8B:
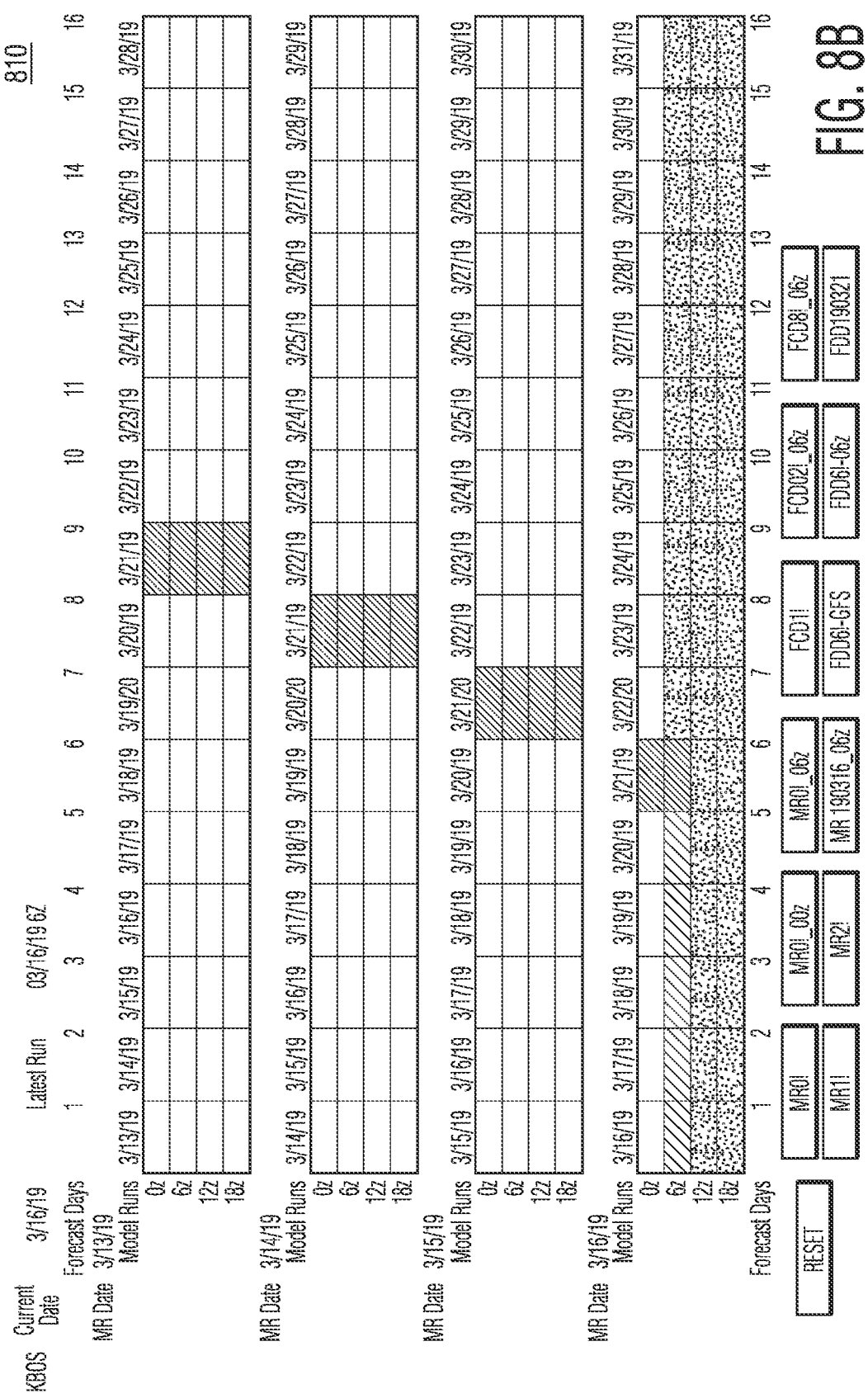
FIG. 8B is an example user interface illustrating examples of various weather symbology structures, according to an aspect of the present disclosure.

FIGS. 8A and 8B provide for specific operational examples of how the various weather symbology structures operate using sample weather forecasts. For example, FIG. 8A illustrates example interactive GUI 800 of a spreadsheet application, illustrating examples symbology construction, according to an aspect of the present disclosure. FIG. 8B illustrates example interactive GUI 810 illustrating examples of various weather symbology structures for a spreadsheet application.

Table 3 provides brief descriptions of example weather terminology used throughout the present disclosure.

TABLE 3

Example Weather Symbology Terminology

| Term | Description |
|---|---|
| Receipt Time (e.g., exchange time) | The time reported is the time at which the file arrived at the server(s). |
| Location | Locations may be global airport codes (ICAO) and/or custom regions designed to represent specific geographic regions related to a specific commodity (such as a gas weighted Energy Information Administration |

TABLE 3-continued

Example Weather Symbology Terminology

| Term | Description |
|---|---|
| | (EIA) region-based commodity or one or more Independent System Operator (ISO) regions to mimic an entity that controls and monitors the operation of an electrical power system for a given geographic region). |
| Example Weather Models/Model Names | GFS-GFS (¼ degree spatial resolution. Time steps: mhr 0-120 @1 hr; mhr 121-384 @3 hr-run 4x per day). |
| | GEFS-GFS Ensemble (¼ degree spatial resolution. Time steps: mhr 0-120 @1 hr-mhr 121-384 @3 hr. run 4x per day. Fast = 17 members/Full = 35 members. |
| | ECM-ECMWF's high resolution model (¼ degree spatial resolution for surface variables and 1 degree resolution for upper air variables. Time steps: mhr 0--90@1 hr_mhr 93-144 @3 hr_mhr 150-240 @6 hr_0z & 12z ONLY. 06 & 18z mhr 0-90 @ 1 hr. |
| | ECE-ECMWF Ensemble model (ENS) (½ degree spatial resolution for surface variables and 1 degree resolution for upper air variables. Time steps: mhr 0--90@1 hr_mhr 93-144 @3 hr_mhr 150-240 @6 hr_ 0z & 12z ONLY. 06 & 18z mhr 0-90 @ 1 hr_mhr 93-144@3 hr. Full = 52 members. |
| | ECEX-ECMWF Ensemble Extension (ENS) (½ degree spatial resolution for surface variables and 1 degree resolution for upper air variables. Time steps: mhr 0--384 @24 hr-run 2x per week). |
| | GEFSX-GFS Ensemble EXTENSION (¼ degree spatial resolution. Time steps: mhr 0-120 @1 hr-mhr 121-384 @3 hr. run 1x per day. Fast = 11 members/Full = 22 members. |
| | CFSX-CFS Ensemble EXTENSION (¼ degree spatial resolution. Time steps: mhr 0-5,400 (9 mo) @6 hr-run 1x per day. Full = 5 members. |
| | SEAS-ECMWF"s Seasonal Model (¼degree spatial resolution. Time steps: mhr 0-5,040 (7 mo) @6 hr-run 5th of every month. Full = 5 members. |
| | Note that the spatial resolution is subject to change based upon the sources. |
| Model Run | Currently 0z, 6z, 12z, 18z. |
| | This may change depending upon modification by weather agencies to modify the frequency of model runs. |
| Model Hour (aka Forecast Hour) | Currently integers between 0-384. 0 hour is the initial hour from which the weather forecast is initialized and the model physics then prognosticates forward into the future. |
| Time Steps/ Reporting interval | Is the difference between Model Hours described above. For example if the forecasted model hours were 0, 3, 6, 9, 12, etc., the model would possess '3 hour' time steps. |
| Forecast Valid Date | A particular time for which a weather forecast will pertain to a calendar 'Date'. Dates are based upon midnight-to-midnight local time of the forecasted location. "FV Dates" are mostly used in "Specific Dates" for the weather symbology structure. |
| Forecast Valid Day | A particular time for which a weather forecast will pertain to a calendar 'Day' in the future, which is based upon midnight-to-midnight local time of the forecasted location. Mostly used in "Rolling Dates" for the weather symbology structure. For example; Day 2 represents a forecast for tomorrow, regardless of which specific calendar date it represents. |
| Forecast Valid Hour (Time of Day) | A particular weather forecast for a particular time of Day or Date, which is based upon midnight-to-midnight local time of the forecasted location. This Forecast Valid Hour can be applied in either "specific" or rolling" weather symbology structure. For example; HH01 is 1:00 am in the morning, local time. |
| How Model Hour relates to Forecast Valid Day/FV Date/FV Time of Day (these are expressed in local time for the forecast location) | Each Model Hour provides a global forecast which may correspond to a specific Forecast Valid Day, Date and Time, given the global time zone of the specific forecast location. For example, Model Hour 1 may be equal to 1 am London time, but may directly correspond to 7 pm Chicago time (which is 6 hrs behind London). FV Day = Day 1, 2, 3, etc.. FV Date = a specific calendar date FV Time of Day = a specific time on a specific Date |
| Percent Complete | AKA "Preliminary Daily Values" provides users an early view of what the forecasted daily value will (likely) be a few minutes in advance. Percent Complete displays the percentage of potential hourly data used to derive a daily value for a specific forecast date/day. For example, the second forecast day (for some location) consists of 24 forecast hours. When 12 of those 24 files are received, a preliminary daily value may be generated for that specific day, As each subsequent forecast hour updates from the forecast model, so will the % complete, unit 100% is achieved for that specific forecast day. |

TABLE 3-continued

Example Weather Symbology Terminology

| Term | Description |
|---|---|
| "As-Is" model data (aka "Raw" model data) | This refers to the specific model hours in which a weather forecast model provides a forecast. |
| Interpolated | This refers to the forecast hours in between the "As-Is model data" from which the weather forecast model did not provide weather forecast data. The present disclosure implements a sophisticated method to interpolate those in between hours. |
| Blended | Indicates whether a weather forecast data is combined with observation data. |
| Ensemble Models | Ensemble runs may produce eight (8) distinct outputs regarding ensemble statistics for a given variable.<br>Max-The highest ensemble member<br>Min-The lowest ensemble member<br>Mean-The average of all ensemble members.<br>Std-1 standard deviation of all the ensemble members.<br>10%--$10^{th}$ percentile of the ensemble values.<br>25%--$25^{th}$ percentile of the ensemble values.<br>50%--$50^{th}$ percentile of the ensemble values can be displayed by using the "Mean" (listed above).<br>75%--$75^{th}$ percentile of the ensemble values.<br>90%--$90^{th}$ percentile of the ensemble values. |
| Ensemble Member Count | This is how many ensemble members are included in the analysis. For GEFS 'Fast', an early look at the ensemble data may be provided using a portion (e.g., 22) of the total (e.g., 45) GEFS ensemble members. |
| Guidance Charts | Plot weather forecasts going out into the future (standard weather charts) |
| Progression Charts | May "lock" a particular "Forecast Valid Date or Time of Day" (also known as the "Target Date") and show how the previous weather forecasts have changed over time for that "Forecast Valid" Day, Date or Time of Day. |
| Target Date | Used in a progression chart it is the specific Date and/or Time of Day which is held constant from which an examination of how all the previous weather forecast Models/Model Runs have changed (overtime) for that particular Day/Date/Time. |
| Alpha Charts | This is the unique display in the marketplace and exclusive to aspects of the present disclosure. Streaming weather forecasts as they are made available into the public domain in conjunction with real-time market prices, can more easily expose the relationship between changing weather perspectives and changes in traded instruments. |
| NOAA | National Oceanic and Atmospheric Administration<br>www.noaa.gov |
| NCEP | National Center for Environmental prediction<br>www.ncep.noaa.gov |
| ECMWF | European Center of Medium Range Weather Forecasts www.ecmwf.int |
| CFSR | A source of global weather observations. The Re-Analysis data from the CFS weather forecast model may be used to compile, in some examples, greater than 41 analog years and at least four climatological datasets. |
| METAR | A source of streaming global weather observations from instrumentation located at airports. |
| Exchange Time (aka receipt time) | Is the time when the data is received. |
| Interval Start Time | A setting used in charts to allow for Future dates, so that weather forecast data may be plotted forward in time. |

Example: Weather Data with Respect to Exchange Time and Price Data

Figure 4A:
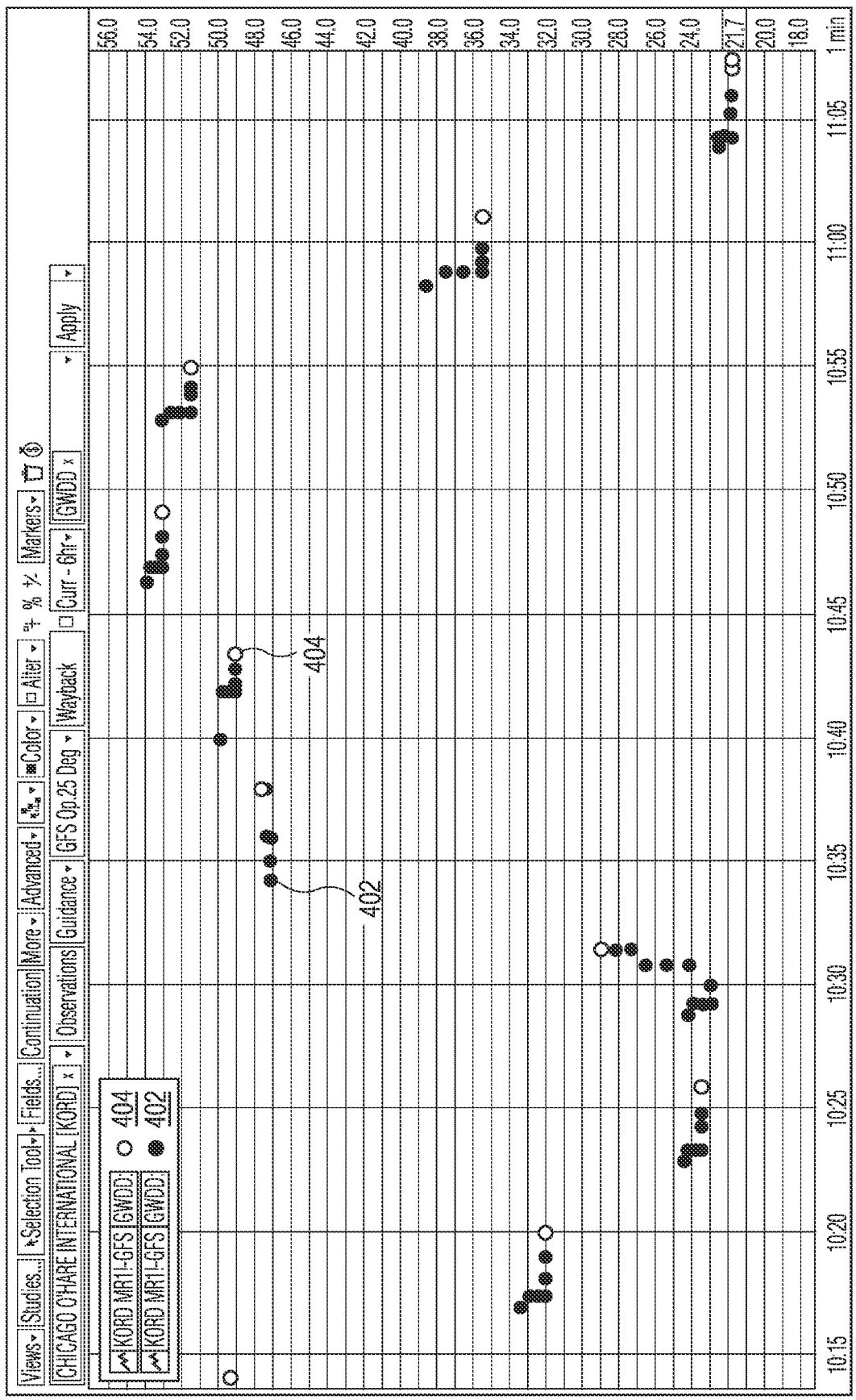
FIG. 4A is screenshot including a chart of example weather forecast data and price data as a function of exchange time, according to an aspect of the present disclosure.

The following is an example of charting weather data with respect to exchange time and price data. FIG. 4A is screenshot including a chart of example weather forecast data and price data as a function of exchange time. The example shown in FIG. 4A illustrates a scenario where each weather Forecast Valid Day is being produced by the weather forecast model (source). The x axis describes the "exchange time" which each dot (elements 402, 404) is received. Each dot 402 is a 'preliminary view' of that day's forecast element (such as daily average temperature, GWDD, HDD, CDD, etc.), in which a condition code ("% complete") may begin providing 'preliminary views' when a forecast day is 50% (for example) and may stop when that forecast day is completed at 100%. Dot 404 at the end of a forecast valid day is the 100% conclusion.

Not shown here, is the price of any traded commodity using a minute Open/High/Low/Close (OHLC) bar. In general, OHLC represents an example manner in which traded prices may be displayed, over some time interval (e.g., one minute, five minutes, fifteen minutes, one day, etc.). For example, trading data may be organized into one minute intervals and a single bar may depict the OHLC over each of the one minute time spans (or any suitable time period). In some examples, one minute OHLC bars may be displayed together with weather "tick" data to aid in identifying trading opportunities. The presentation of the combination of the two data sets on interactive GUI 120 provides advantages, including in makes it easy to visualize and track (including in real-time) when weather moves in a significant manner to move the price of a traded financial instrument.

Figure 4B:
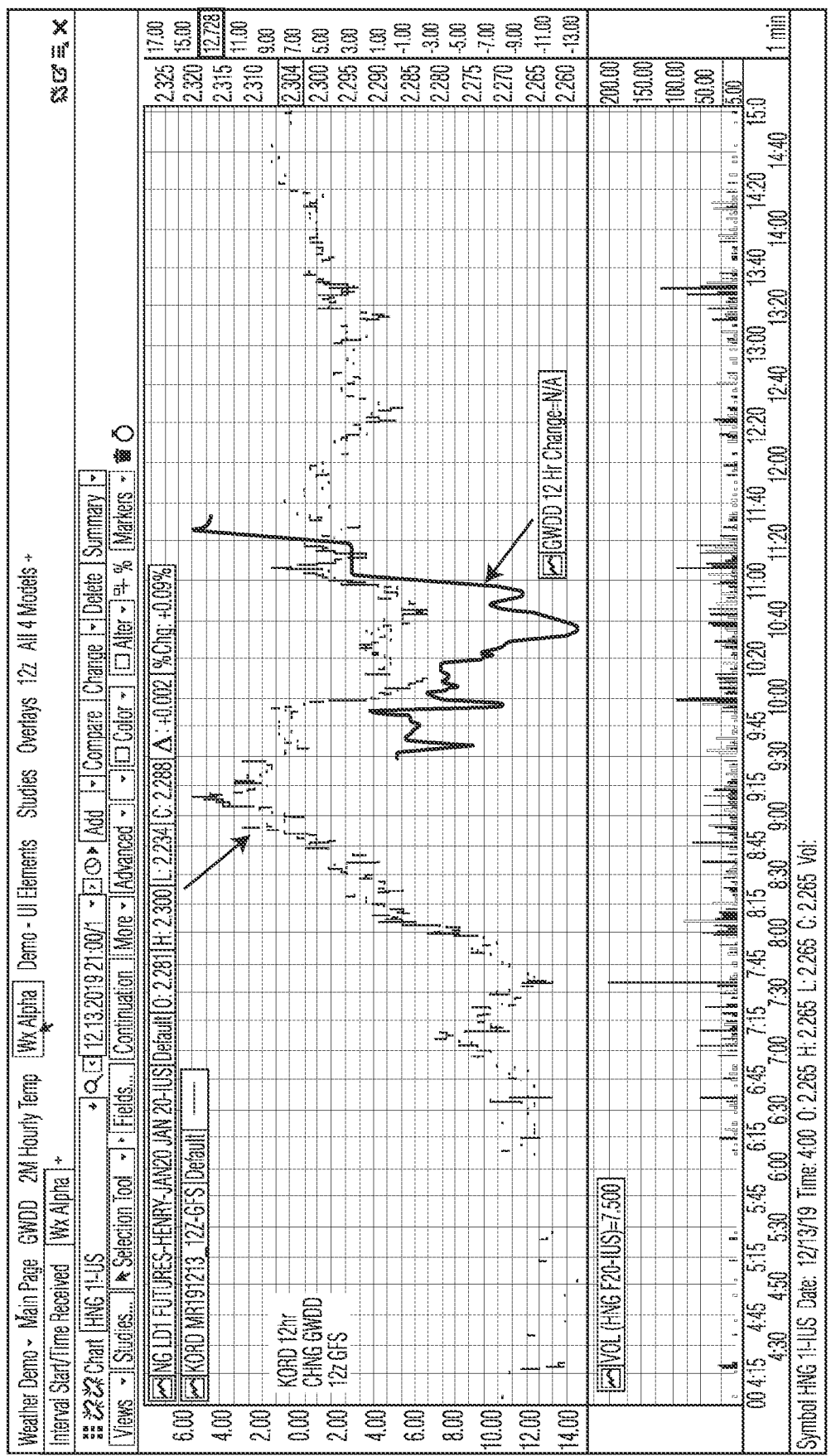
FIGS. 4B and 4C are screenshots of an example 16 day weather forecast for a particular location as a function of exchange time with respect to natural gas price data, according to an aspect of the present disclosure.
Figure 4C:
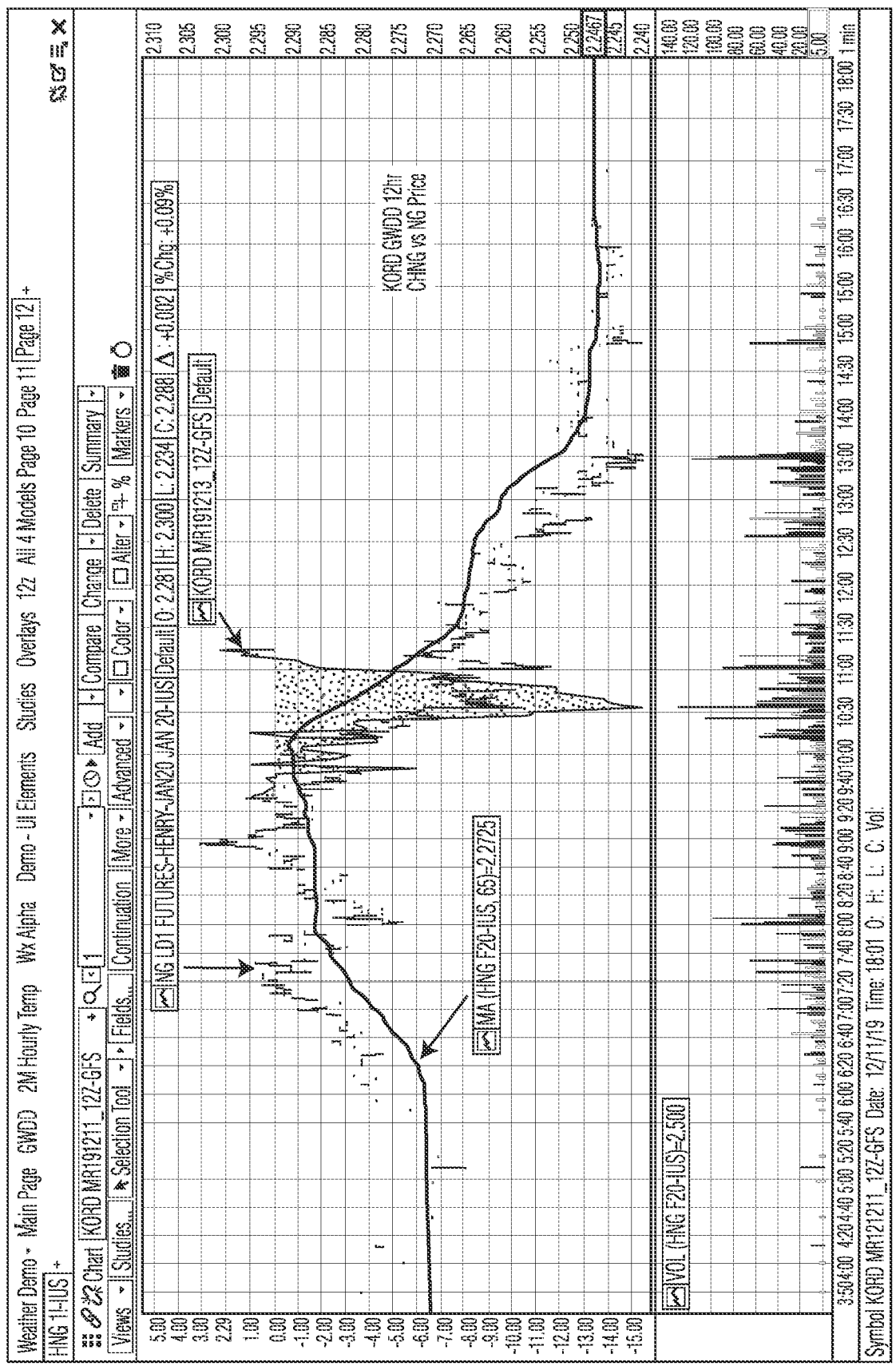
Figure 4D:
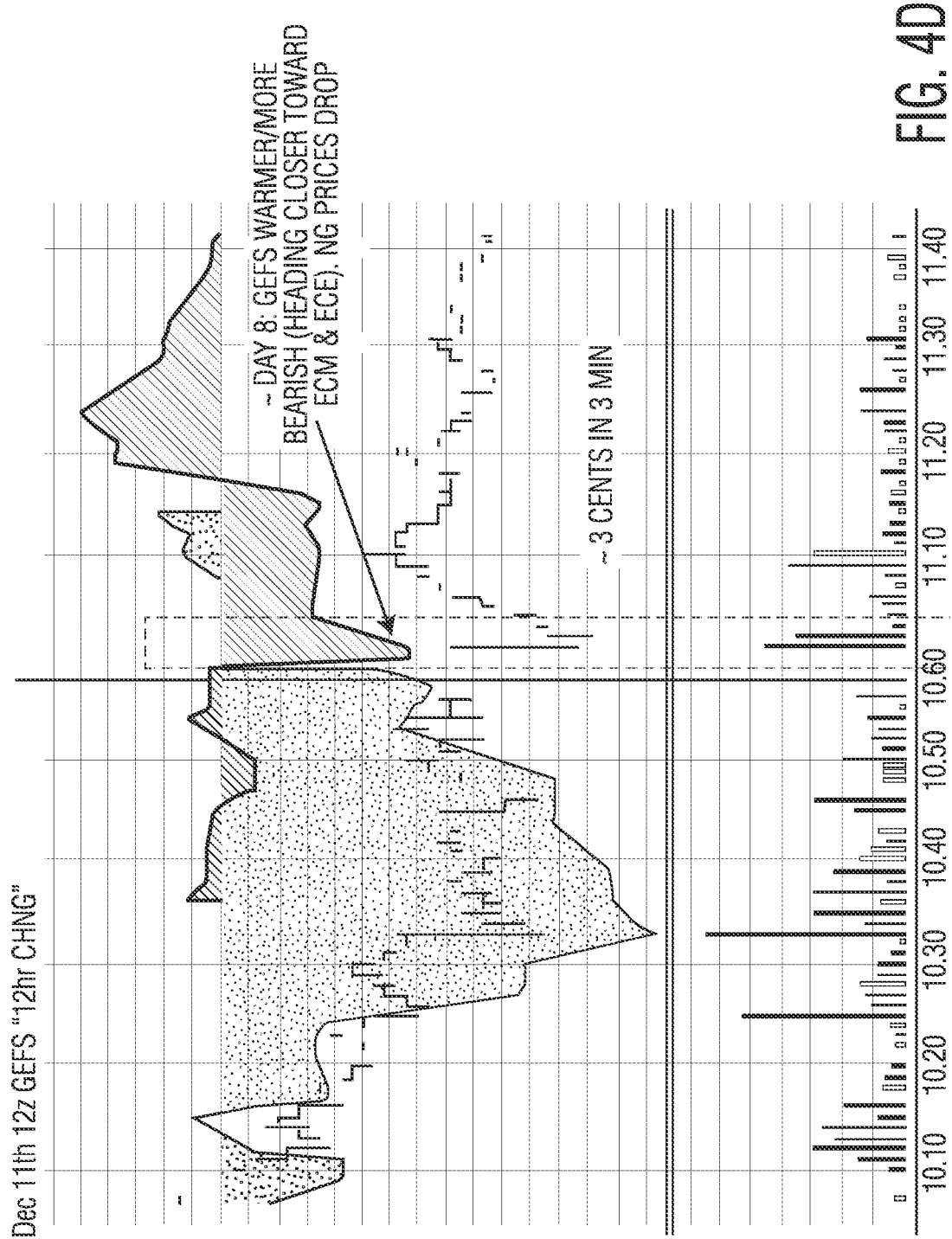
FIG. 4D is a screenshot of an example weather alpha workflow chart as a function of exchange time, according to an aspect of the present disclosure.

FIGS. 4B-4D are screenshots of an example 16 day weather forecast for a particular location as a function of exchange time with respect to natural gas price data. In particular, FIGS. 4B and 4C show an example 16 day weather forecast from the 12z GFS weather forecast model in 'exchange time' for the GWDD variable as it relates to the price of Natural gas at Henry Hub. FIG. 4D is a screenshot of an example weather alpha workflow chart as a function of exchange time. As shown in FIG. 4D, when GWDD goes down, price should go down and vice-a-versa.

Example of a Guidance Chart

Figure 5:
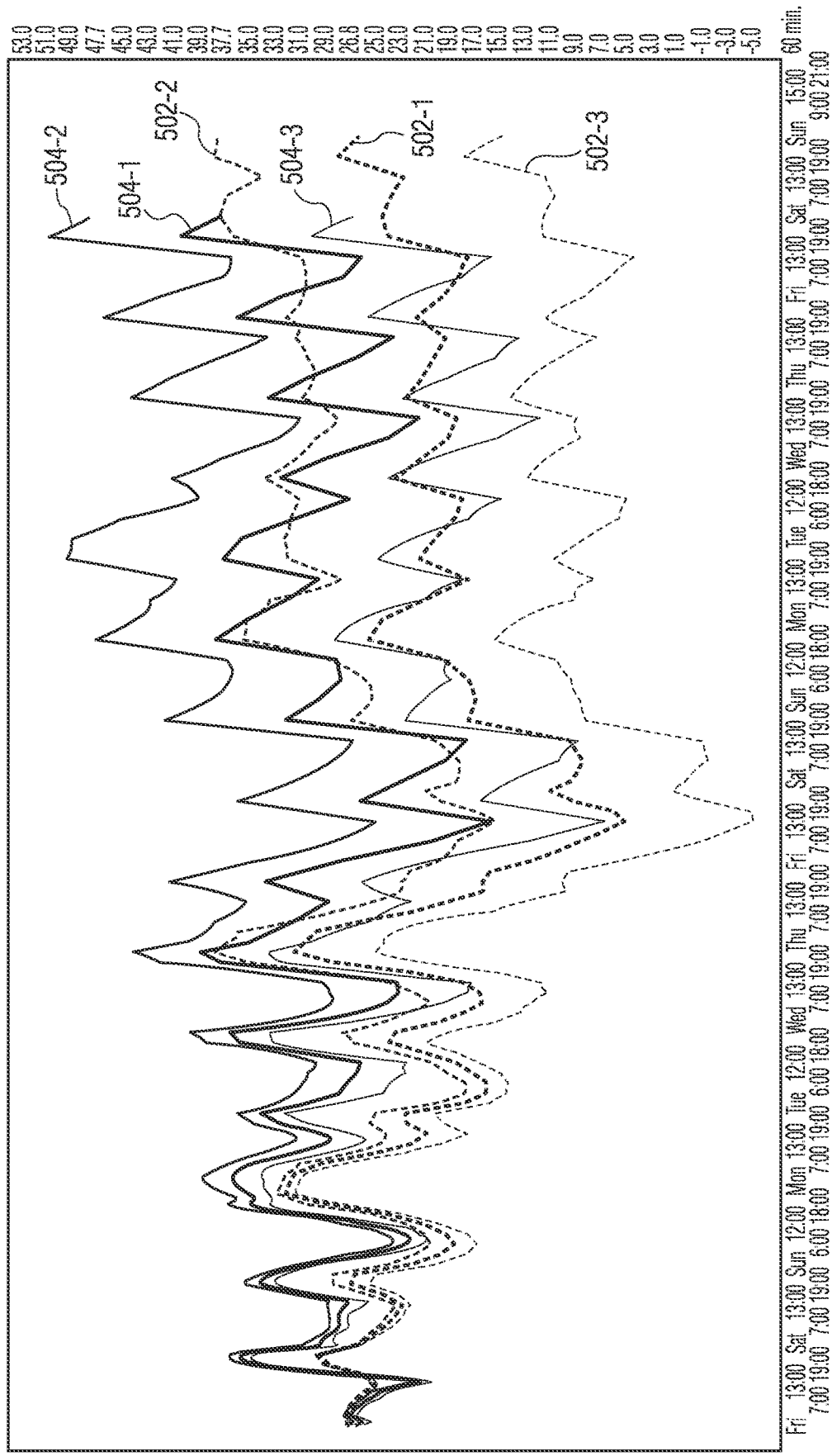
FIG. 5 is a screenshot including an example guidance chart associated with a guidance weather perspective, the guidance chart illustrating weather forecast data as a function of a forward time period, according to an aspect of the present disclosure.

In some examples, the weather symbology of the present disclosure may be used for guidance weather perspective workflows, and may be configured to generate guidance charts of weather forecast datasets. FIG. 5 is a screenshot including an example guidance chart associated with a guidance weather workflow, the guidance chart illustrating weather forecast data as a function of a forward time period. The example chart starts 'now' at the current hour and extends forward in time 16 days (hour-by hour or 0-384 hours into the future) as seen on the x axis and Temperature displayed (in F) on the y axis for Chicago O'Hare airport. Set of curves 502 shows the 0z GEFS Ensemble mean (curve 502-1) as well as the +1STD (curve 502-2) and −1STD (curve 502-2) around the mean (curve 502-1). Set of curves 504 shows the 0z ECE Ensemble mean (curve 504-1) as well as the +1STD (curve 504-2) and −1STD (curve 504-2) around the mean (curve 504-1).

Table 4 is an example output of the data behind the same guidance chart with the weather symbology. In some examples, system 102 may provide users with the ability to plot this data in various presentation formats (e.g., a data grid, a spreadsheet, a watchlist) and may update the resulting data in real-time as the underlying data input(s) change.

TABLE 4

Example Weather Chart Output Data

| Date | Time | 0Z GEFS | +1STD 0z GEFS | 0z ECE | −1STD 0z GEFS | −1STD 0z ECE | +1STD 0z ECE |
| --- | --- | --- | --- | --- | --- | --- | --- |
| Feb. 21, 2020 | 22:00 | 24.4 | 37   | 38.3 | 11.9 | 28.1 | 48.5 |
| Feb. 21, 2020 | 21:00 | 24.3 | 36.8 | 38.9 | 11.9 | 28.7 | 49   |
| Feb. 21, 2020 | 20:00 | 24.2 | 36.6 | 39.4 | 11.8 | 29.2 | 49.6 |
| Feb. 21, 2020 | 19:00 | 24.1 | 36.5 | 40   | 11.8 | 29.7 | 50.2 |
| Feb. 21, 2020 | 18:00 | 24   | 36.3 | 40.5 | 11.8 | 30.1 | 50.9 |
| Feb. 21, 2020 | 17:00 | 23   | 35.4 | 38.1 | 10.6 | 28.1 | 48.2 |
| Feb. 21, 2020 | 16:00 | 22   | 34.4 | 35.7 | 9.5  | 25.8 | 45.6 |
| Feb. 21, 2020 | 15:00 | 20.9 | 33.5 | 33.4 | 8.3  | 23.5 | 43.2 |
| Feb. 21, 2020 | 14:00 | 19.9 | 32.6 | 31   | 7.1  | 21.1 | 40.8 |
| Feb. 21, 2020 | 13:00 | 18.8 | 31.8 | 28.6 | 5.9  | 18.6 | 38.6 |
| Feb. 21, 2020 | 12:00 | 17.8 | 31   | 26.2 | 4.7  | 15.9 | 36.5 |
| Feb. 21, 2020 | 11:00 | 17.9 | 30.8 | 26.5 | 5    | 16.4 | 36.5 |
| Feb. 21, 2020 | 10:00 | 18   | 30.7 | 26.7 | 5.4  | 16.9 | 36.5 |
| Feb. 21, 2020 | 9:00  | 18.2 | 30.6 | 26.9 | 5.7  | 17.3 | 36.6 |
| Feb. 21, 2020 | 8:00  | 18.3 | 30.6 | 27.2 | 6    | 17.7 | 36.7 |
| Feb. 21, 2020 | 7:00  | 18.4 | 30.6 | 27.4 | 6.2  | 17.9 | 36.9 |
| Feb. 21, 2020 | 6:00  | 18.5 | 30.6 | 27.6 | 6.5  | 18.2 | 37.1 |
| Feb. 21, 2020 | 5:00  | 18.7 | 30.5 | 28.5 | 6.9  | 19.1 | 37.8 |
| Feb. 21, 2020 | 4:00  | 18.9 | 30.5 | 29.3 | 7.3  | 20   | 38.6 |
| Feb. 21, 2020 | 3:00  | 19.1 | 30.6 | 30.1 | 7.7  | 20.8 | 39.4 |
| Feb. 21, 2020 | 2:00  | 19.3 | 30.6 | 30.9 | 8.1  | 21.5 | 40.3 |
| Feb. 21, 2020 | 1:00  | 19.6 | 30.7 | 31.7 | 8.4  | 22.1 | 41.3 |
| Feb. 21, 2020 | 0:00  | 19.8 | 30.9 | 32.5 | 8.7  | 22.7 | 42.4 |
| Feb. 21, 2020 | 23:00 | 20.1 | 31   | 33.1 | 9.3  | 23.3 | 42.9 |
| Feb. 21, 2020 | 22:00 | 20.5 | 31.1 | 33.7 | 9.8  | 23.8 | 43.6 |
| Feb. 21, 2020 | 21:00 | 20.8 | 31.3 | 34.3 | 10.4 | 24.3 | 44.2 |
| Feb. 21, 2020 | 20:00 | 21.2 | 31.5 | 34.8 | 10.8 | 24.8 | 44.9 |
| Feb. 21, 2020 | 19:00 | 21.5 | 31.8 | 35.4 | 11.2 | 25.2 | 45.7 |

Example: Progression Charts

Figure 6A:
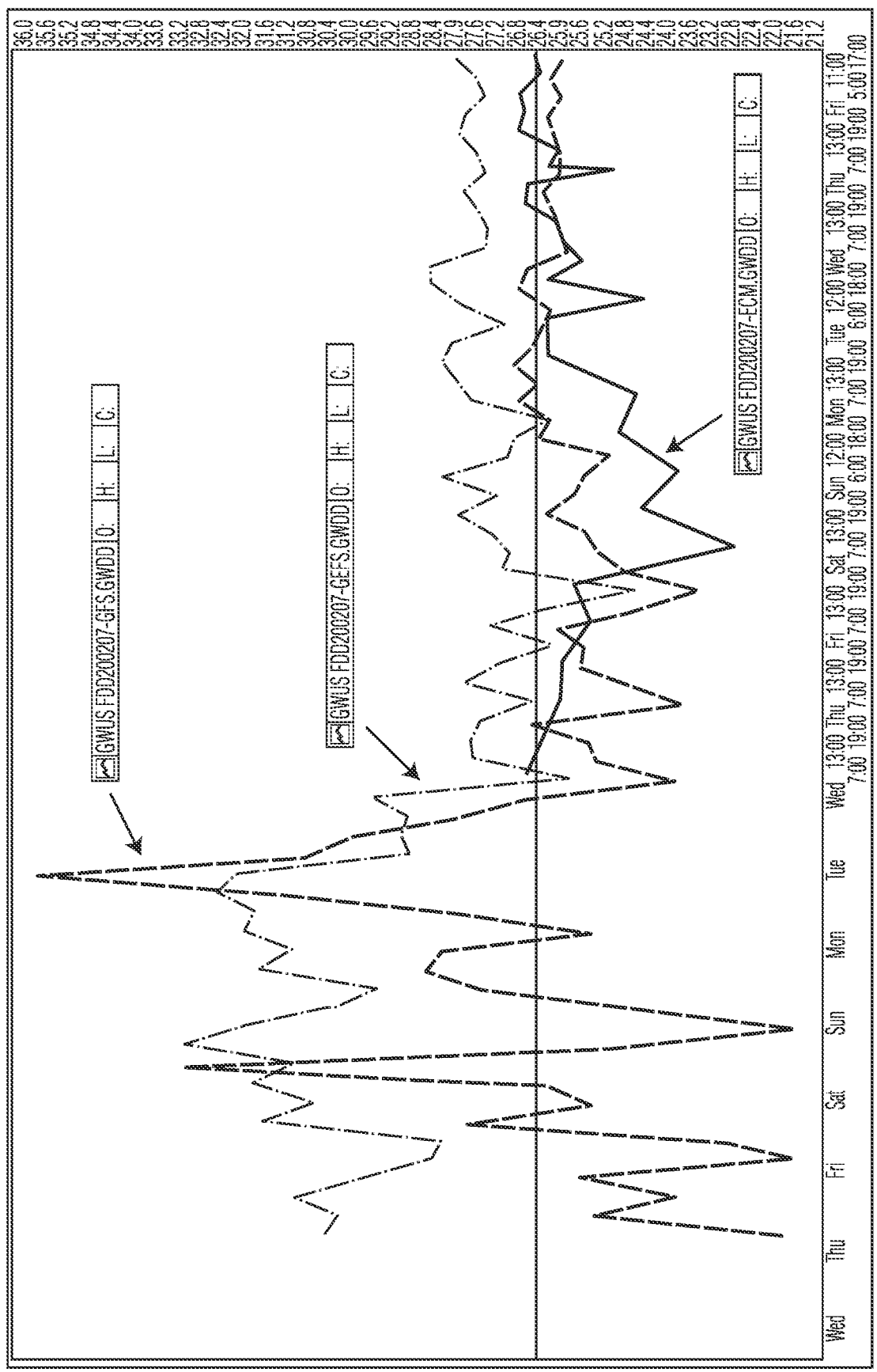
FIG. 6A is a screenshot including an example progression chart associated with a progression weather perspective, according to an aspect of the present disclosure.
Figure 6B:
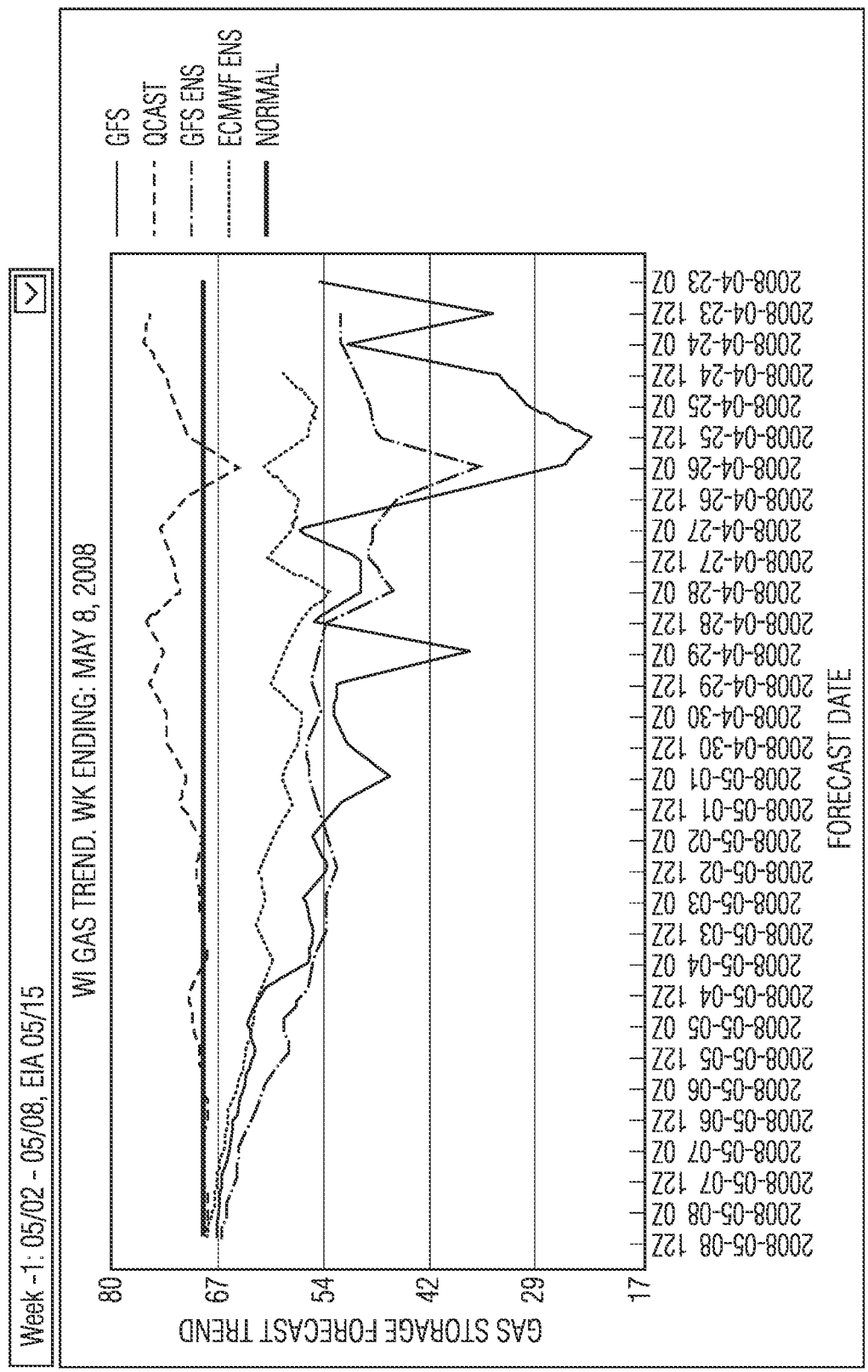
FIG. 6B is a screenshot of an example progression chart illustrating natural gas storage estimates and weather model progression as a function of forecast date, according to an aspect of the present disclosure.
Figure 6C:
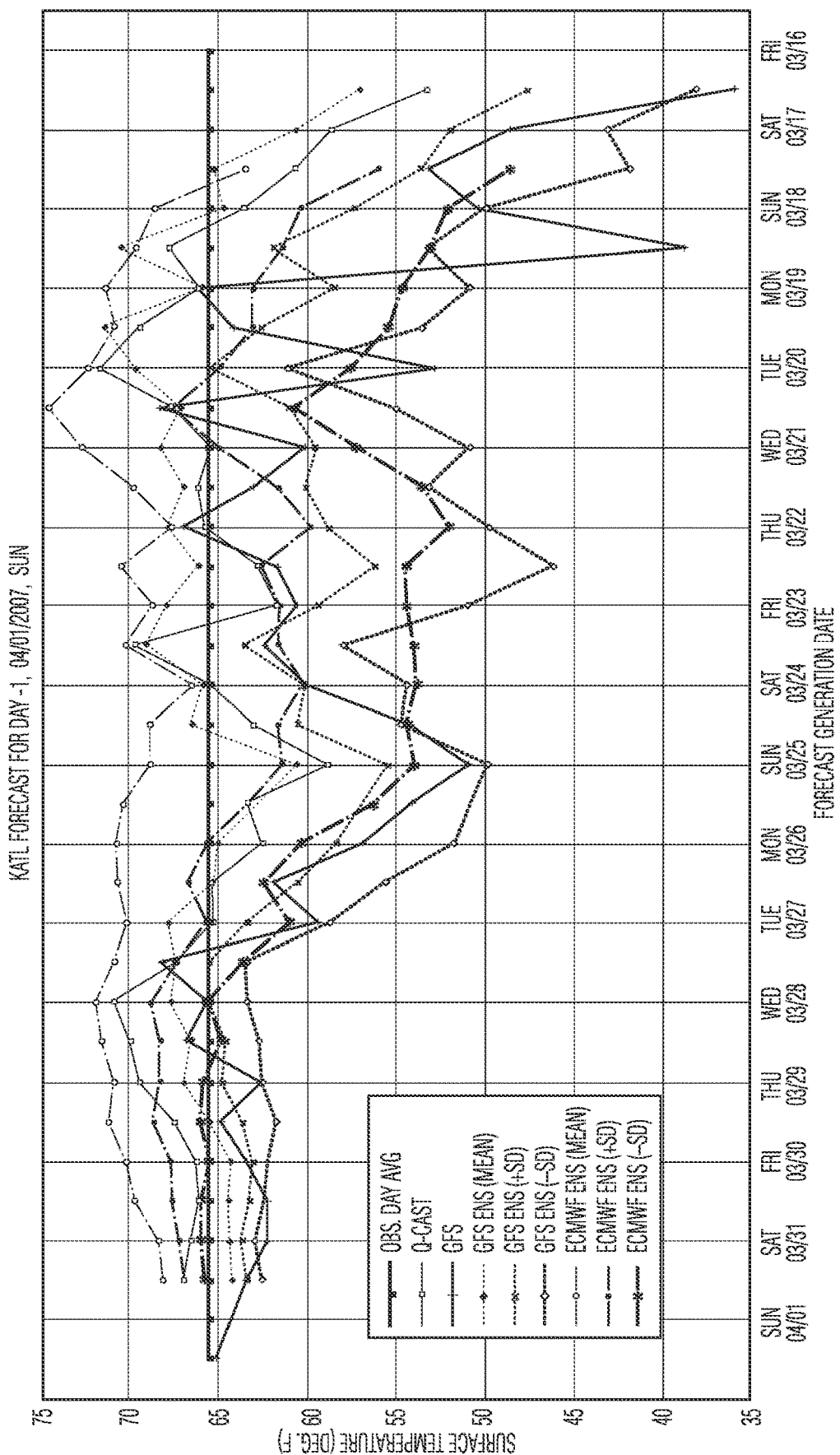
FIG. 6C is an example progression chart for several weather models as a function of forecast date, according to an aspect of the present disclosure.

In some examples, the weather symbology of the present disclosure may be used for progression weather perspective workflows, and may be configured to generate progression charts of weather forecast datasets. FIGS. 6A-6C show the convergence of weather forecast models, as the forecast changes over time, from day-to-day for a specific Forecast Valid Day, using Progression charts of the present disclosure. In particular, FIG. 6A is a screenshot including an example progression chart associated with a progression weather workflow; FIG. 6B is a screenshot of an example progression chart illustrating natural gas storage estimates and weather model progression as a function of forecast date; and FIG. 6C is an example progression chart for several weather models as a function of forecast date.

In FIG. 6A, as shown in the far left (16 days ago), there was more risk for today's forecast (Friday February $7^{th}$), which appeared to flatten out approximately 5 days prior to today February $7^{th}$ (yet the models still show a few degrees difference). FIG. 6B, illustrates example natural gas storage estimates (reads in the opposite direction of FIG. 6A, from right to left).

Example: Accuracy Charts

In some examples, the weather symbology of the present disclosure may be used for accuracy weather perspective workflows, and may be configured to generate accuracy charts of weather forecast datasets. FIG. 7A is an example initiation screen for generating an accuracy chart. In some examples, the weather symbology may easily organize weather forecast model data using the FCD and FCH commands, allowing weather forecast accuracy to be quickly understood via presentation on interactive GUI 120. It may be appreciated that any knowledge of which weather forecast is most likely to be correct may be an informational advantage, particularly for interacting with market data.

FIG. 7B is an example accuracy chart associated with an accuracy weather workflow. This data display shown in FIG. 7B is an example using the weather symbol structure of the present disclosure using the Accuracy style codes which begin with FCD.

Example: System Operation

An example of system operation of weather integration server 116 is provided below. In this example, MR refers to a Model Run, MRD refers to a Model Run Date, MRH refers to a Model Run Hour, MR0 refers to a Model Run Offset, FDD refers to a Forecast Dated Date, DD refers to a Dated Date, DDO refers to a dated date offset, FCD refers to a Forecast Continuation Day, CDO refers to a Continuation Day Offset, FDH refers to a Forecast Dated Hour, DH refers to a Dated Hour, DHO refers to a Dated Hour Offset, FCH refers to a Forecast Continuation Hour, CHO refers to a Continuation Hour Offset., "LOC" refers to location and "REQ" refers to request. In Table, 5, DM represents a data manager (such as for data cache(s) 124).

Table 5 below illustrates non-limiting examples of system operation according to aspects of the present disclosure.

TABLE 5

Examples of System Operation

| Request | Request Type | Rolling/Specific | DM | Underlying Symbol |
|---|---|---|---|---|
| KBOS MR0!-GFS Latest Model Run for Boston from GFS<br>MODEL: GFS<br>LOC: KBOS<br>REQ: MR<br>MRO: 0 | MR<br>>MRD is calculated from Reference date (Today), Number of Runs in the day and MRO.<br>>NO MRH- use latest model run hour. | Rolling<br>REF_DATE: 2019 Mar. 16 (Today) | >Return current day's latest Forecast data.<br>>Keeps user updated of new model runs.<br>>Confirmed clear down for all model run changes. | KBOS MR190316_6z-GFS<br>Key gets updated every model run.<br>User may be updated every model run.<br>Chart user may clear down and re-request historical data every new model run.<br>Users may receive data updates (hourly/daily) as new data comes in from data feed.<br>Underlying symbols are updated on model run changes. Ex for GFS:<br>1. KBOS MRYYMMDD_0z-GF<br>2. KBOS MRYYMMDD_6z-GF<br>3. KBOS MRYYMMDD_12z-GF<br>4. KBOS MRYYMMDD_18z-GF |
| KBOS MR1!-GFS Latest Model Run (01) for Boston from GFS<br>MODEL: GFS<br>LOC: KBOS<br>REQ: MR<br>MRO: −1 | MR<br>>MRD is calculated from Reference date (Today), Number of Runs in the day and MRO.<br>>NO MRH- use latest model run hour. | Rolling<br>REF_DATE: 2019 Mar. 16 (Today)<br>MRO: −1<br>1 run back | >DM may return expired symbol.<br>>User may get updates on current model runs for symbol and source.<br>>Live Chart request may generate new historical request for each model run update. | >Expired Symbol.<br>>No Underlying symbol.<br>>User may be updated every model run.<br>>Chart user may clear down and re request historical data every new model run. |
| KBOS MR0!_00z-GFS Latest 00z for Boston from GFS<br>MODEL: GFS<br>LOC: KBOS<br>REQ: MR<br>MRO: 0<br>MRH: 00z | MR<br>MRD is calculated from Reference day (Today), Number of Runs in the day and MRO. | Rolling<br>REF_DATE: 2019 Mar. 16 (Today) | >If current day has MRH: 0Z DM may return latest forecast data for today with MRH (00z).<br>>Else may return expired symbol. | KBOS MR 190316_0z-GFS<br>>User may be updated every model run and requested MRH.<br>>Chart user may clear down and re-request historical data every new model run. |
| KBOS MR1!_0Z-GFS Last Model Hour 00z for Boston from GFS<br>MODEL: GFS<br>LOC: KBOS<br>REQ: MR<br>MRO: −1<br>MRH: 00z | MR<br>MRD can be calculated from reference day(Today), Number of Runs in the day, MRO and MRH. | Rolling<br>REF_DATE: 2019 Mar. 16 (Today) | >DM may return expired symbol.<br>>User may receive updates on current model runs for symbol and source.<br>>Live Chart request's | >Expired Symbol,<br>>No Underlying symbol<br>>User may be updated every model run and requested MRH.<br>>Chart user may clear down and re request historical data every new model run. |

TABLE 5-continued

Examples of System Operation

| Request | Request Type | Rolling/Specific | DM | Underlying Symbol |
|---|---|---|---|---|
| | | | may generate new historical request for each model run update and MRH. | |
| KBOS MR190316_0z-GFS Return Model run: 2019 Mar. 16 at Model run: 00z data for Boston from MODEL: GFS LOC: KBOS REQ: MR MRD: Mar. 16, 2019 MRH: 00z | MR MRD is from request (Use format to determine specific) | Specific MRD: Mar. 16, 2019 MRH = 00z | >DM may return data if current day is specific day and has date for MRH (00z) And no further updates. >if MRD is current day but MRH is in a future DM may wait until that MRH is received in data feed. | KBOS MR190316_0z-GFS Same as client symbol |
| KBOS MR 190316_6z-GFS Return Model run: 2019 Mar. 16 at Model run: 00z data for Boston from MODEL: GFS LOC: KBOS REQ: MR MRD: Mar. 16, 2019 MRH: 06z | MR MRD is from request (Use format to determine specific) | Specific MRD: 2019 Mar. 16 MRH = 06z | >DM may return data if current day is specific day and has date for MRH (00z) and no further updates. >if MRD is current day but MRH is in future DM may wait until that MRH received in data feed. | KBOS MR 190316_6z-GFS Client symbol |
| KBOS FDD8!-GFS 7 h Forecast Dated Day from Today (Current day: 1) MODEL: GFS LOC: KBOS REQ: FDD DDO: 8 | FDD Forecast Dated Date is calculated from Reference Date and DDO Ex: Today: 2019-03-16 DDO: 8 days (note current day: 1) Interested Date: 2019-03-23 Database Options: Find all Model Run Dates (or time indexed field)which may have | Rolling REF_DATE: 2019 Mar. 16 (Today) | >If current day has the interested forecast date, DM may return the latest forecast data for that date. >Keeps user updated for new runs which have the FDD. | KBOS FDD190323-GFS Key gets updated every day. User may be updated every model run. Chart user may clear down and re request historical data if needed. |

TABLE 5-continued

Examples of System Operation

| Request | Request Type | Rolling/Specific | DM | Underlying Symbol |
|---|---|---|---|---|
| | particular FDD. Or use an index for Forecast Date to find Data. | | | |
| KBOS FDD190321-GFS Data from all Model runs with forecast for 2019 Mar. 21 MODEL: GFS LOC: KBOS REQ: FDD FDD: 2019 Mar. 16 | FDD FDD is from request. Database Options: Find all Model Run Dates (or time indexed field) which may have particular FDD. Or use an index for Forecast Date to find Data. | Specific FDD: 2019 Mar. 16 | >May return expired symbol if FDD is not current day. >Subscribes and Returns data if FDD is Current Date and in future. >No further updates after FDD goes out of scope. | KBOS FDD190321-GFS Client symbol |
| KBOS FDD12!_00z-GFS 12<sup>th</sup> Forecast Dated Day from Today with Model Run Hour of 00z. i.e., 00z runs with forecast date of 2019 Mar. 27 MODEL: GFS LOC: KBOS REQ: FDD DDO:12 MRH: 00z | FDD Forecast Dated Date is calculated from Reference Date and DDO. Ex: Today: 2019 Mar. 16 DDO: 12 days Interested Date: 2019 Mar. 27 Database Options: Find all Model Run Dates (or time indexed field) which may have particular FDD. Or use an index for Forecast Date to find Data. | Rolling REF_DATE: 2019 Mar. 16 (Today) | >If current day has the interested FDD and MRH, DM may return the latest forecast data for that date. >Keeps user updated for new runs which have the FDD and MRH. | KBOS FDD190327_00z-GFS Key gets updated every day. User may be updated every model run and requested MRH. Chart user may clear down and re request historical data if needed. |
| KBOS FCD1!-GFS Forecast Day 1 (from possible total 16 (1-17)) Model Runs MODEL: GFS LOC: KBOS REQ: FCD CDO: 1 Model Run Limit: Max Model Runs, going back to n model runs | FCD >Use the Model Run Limit and filter with FCD. >Confirm max 'n' model runs limit with DM. | Rolling REF_DATE: 2019 Mar. 16 (Today) | >Subscribes and Returns data for all model runs for that Forecast Day (1-17). >First Watchlist record returned may be latest update for current day. | >No Underlying symbol. >User may be updated every model run. |
| KBOS FCD1!_06z-GFS Forecast Day 1 (from possible total 16) Model Runs MODEL: GFS LOC: KBOS REQ: FCD CDO: 1 MRH: 06z | FCD >Use the Model Run Limit and filter with FCD and MRH. >Confirm max 'n' model runs limit with | Rolling REF_DATE: 2019 Mar. 16 (Today) | >Subscribes and Returns data for all model runs for that Forecast Day (1-17) with MRH of 06Z >Watchlist | >No Underlying symbol >User may be updated every model run and requested MRH. |

TABLE 5-continued

Examples of System Operation

| Request | Request Type | Rolling/ Specific | DM | Underlying Symbol |
|---|---|---|---|---|
| Model Run Limit: Max Model Runs, going back to n model runs | DM. | | may be empty if there is no record for FCD and MRH. >But DM may update after referenced Forecast Day comes in a Model Run. | |

Example: Model Run Updates to Users

In some examples, weather integration server 116 may provide one or more model run updates in response to latest model run requests and/or rolling back requests from users (e.g., via user device(s) 108).

For a Latest Model Run (MR0) Request, a model run update may be sent for every new model run for the related source and location. In some examples, the model run update may be used by the chart user to clear a history, such that no new history request may be needed.

For a Rolling Back (MRNN<1-99>) Request, in some examples, when a user subscribes for a model run going backwards, an expired symbol response may be provided (or a different weather response indicating the information is historical). From there on forward, the user may be provided with updates for every new model run for that location and source.

In some examples, an expired symbol response and model run update may be used by all users (e.g., data may get updates for individual fields) to clear state and chart users re-request historical data from one or more databases.

In some examples, when a new model run starts, all chart users may need the chart to be re-drawn (which may cause weather integration server 116 to receive a request for historical data (if not cached) for a previous model run). To avoid all chart users requesting historical data at a same time during new model runs, weather integration server 116 may include logic to pre-request data at a pre-defined user interval before a new run starts.

In some examples, for any rolling request if the user request includes a model run hour, the user may be notified when that specific model run hour is received from a weather data source(s) data feed.

Example: Forecast Dated Date Requests (FDD) and Forecast Continuation Day (FCD)

In some examples FDD requests, FDH requests and/or FCD requests may be received that may be subscribed to via a previous model run, a current model run and/or for a future model run. FDD and FDH requests relate to the progression weather perspective, and FCH requests relate to the accuracy weather perspective (described above).

For example, when a user requests data for FDD and FCD and are subscribed to current model run, the resulting chart(s) may be updated for every new model run for the related source and location. In some examples, for every new day runs (e.g., 00z), all users with charts open may have charts re-drawn for FDD/FDH and may request historical data for that FDD/FDH and FCD/FCH.

For future model runs, a user may subscribe for a future symbol. In this example, the user may receive no forecast data response and may receive an update on that symbol when the future event occurs.

In some examples, users may not need to re-request historical data for new model run updates.

Example: Weather Field Filtering

In some examples, a filter option may be provided in weather impact dashboard 122. The filter option may provide users (e.g., via user device(s) 108) the ability to include a filter option to a weather impact request. In one example, the format for a filter option may be:
  filters="field_1=<value>&field_2=<value>"
For example, for filtering by daily symbol (interval_type=D) and with 100% complete, the following filters option may be used: filters="interval_type=D&PercentComplete=100", where the term "interval_type" may include Hourly (H, default) and Daily (D). In some examples, if the interval_type is not specified, system 102 may lookup interval_type after inspecting the fields. In some examples, an additional optional filter DEBUG=T&columns=* may be used to request all fields.

Example: Model Run Information

In one non-limiting example, weather integration server 116 may provide model run information for GFS and GEFS weather data models. The model run information may include model hours (e.g., 0z, 6z, 12z, 18z, based on GMT), may provide about 385 hourly records and about 209 daily records.

Example: Symbology Specification

Next, an example symbology specification is described, according to an aspect of the present disclosure.

In this non-limiting example, the symbology for forecasts may include at least five different methods to retrieve a symbol and/or data. Example retrieval methods may include: (i) by symbol type and field, (ii) by symbol type and aggregation, (iii) by model run and model run date, (iv) by valid day/date-time and (v) by valid day or date. FIG. 8A illustrates an example user interface illustrating examples of symbology construction.

Table 6 illustrates an example symbol list and available fields that may be used for retrieval by symbol type and field. Table 7 illustrates an example symbol list and available aggregations that may be used for retrieval by symbol type and aggregation.

TABLE 6

Example Symbol List and Available Fields

| Symbol Type | Example | Intraday | Daily |
|---|---|---|---|
| Model Run-Rolling | KORD MR0-GFS | Yes | Yes |
| Model Run-Specific | KORD MR190228_12z-GFS | Yes | Yes |
| Model Run-Rolling run | KORD MR0_0z-GFS | Yes | Yes |
| Horizon Day-Rolling | KORD FH13-GFS | No | Yes |
| Horizon Hour-Rolling | KORD FHH1-GFS | Yes | No |
| Horizon Day-Specific | KORD FH190228-GFS | No | Yes |
| Horizon Hour-Specific | KORD FH19022812-GFS | Yes | No |
| Horizon Day-Rolling run | KORD FH12_12z-GFS | No | Yes |
| Horizon Hour-Rolling run | KORD FHH1_18z-GFS | Yes | No |
| Valid Day-Rolling | KORD FD1-GFS | No | Yes |
| Valid Day-Rolling run | KORD FD1_12z-GFS | No | Yes |

TABLE 7

Example Symbol List and Available Aggregations

| Symbol Type | Example | Intraday? | Daily? |
|---|---|---|---|
| Model Run-Rolling | KORD MR0-GFS | Yes (hourly) | Yes |
| Model Run-Specific | KORD MR190228_12z-GFS | Yes (hourly) | Yes |
| Model Run-Rolling run | KORD MR0_0z-GFS | Yes (hourly) | Yes |
| Horizon Day-Rolling | KORD FH13-GFS | Yes (4 model run) | Yes |
| Horizon Hour-Rolling | KORD FHH1-GFS | Yes (4 model run) | Yes |
| Horizon Day-Specific | KORD FH190228-GFS | Yes (4 model run) | Yes |
| Horizon Hour-Specific | KORD FH19022812-GFS | Yes (4 model run) | Yes |
| Horizon Day-Rolling run | KORD FH12_12z-GFS | Yes (1 point) | Yes |
| Horizon Hour-Rolling run | KORD FHH1_18z-GFS | Yes (1 point) | Yes |
| Valid Day-Rolling | KORD FD1-GFS | Yes (4 model run) | Yes |
| Valid Day-Rolling run | KORD FD1_12z-GFS | Yes (1 point) | Yes |

The model run and model run date retrieval method represents a 'vanilla' way of viewing the data. In this example, the time series may be comprised of the different model hours over that model date. The data may appear similar to a forward curve in the future. The model run and model run date retrieval may also include options such as synthetic rolling model run retrieval method and a synthetic rolling model run and model time retrieval method. The synthetic rolling model run method may programmatically include the most current model run (versus the previous or previous+1) models. The synthetic rolling model run and model time method may programmatically include the most current model run/by selected model time (versus the previous or previous+1) models.

The valid day/date-time retrieval method may allow the user to select a point in time (e.g., noon on Friday) and analyze how the forecast has changed on each model run. This retrieval method may be akin to viewing a future going towards expiry, with each model run being a session. In some examples, this retrieval method may be used for intraday (e.g., hourly) values.

The valid day or date retrieval method is similar to the date-time retrieval method, except that the dataset in the valid day/date retrieval method may include a daily aggregation and a greater number of symbols. The valid day/date retrieval method may also include an option such as a synthetic rolling valid day or date retrieval method, which may provide the ability to use indices to obtain rolling valid dates.

In some examples, the symbology may be constructed with the following elements:
 Location+Model Name (e.g., GFS)+Model Run
For forecast valid days, the symbology may include:
 Location+Model Name+Forecast Continuation <Roll number>
For forecast horizon days (also referred to as Target Date), the symbology may include:
 Location+Model name+Forecast Horizon/Target Date <date/time>

In some examples, the symbology may support one or more types of constructions. Table 8 provides an example list of symbol types for various constructions. In some examples, it may be desirable that, similar to the continuation symbols, all metadata reflect a prompt-most dataset in a series. In Table 8, the terms horizontal, diagonal and vertical/column refers to the viewing of the symbology elements with respect to the columns and rows of the spreadsheet shown in FIG. 8B. For example, horizontal refers viewing the symbology with respect to a row, vertical refers to viewing the symbology with respect to a column and diagonal refers to viewing the symbology with respect to a diagonal line (across a combination of rows and columns).

TABLE 8

Example List of Symbols for Various Constructions

| Symbol Type | Symbol | Notes |
|---|---|---|
| Model Run-Rolling | KORD MR0-GFS | Points to core (horizontal) |
| Model Run-Specific | KORD MR190228_12z-GFS | Core (horizontal) |
| Model Run-Rolling run | KORD MR0_0z-GFS | Points to core (horizontal) |
| Horizon Day-Rolling | KORD FH13-GFS | Diagonal |
| Horizon Hour-Rolling | KORD FHH1-GFS | Diagonal |
| Horizon Day-Specific | KORD FH190228-GFS | Diagonal |
| Horizon Hour-Specific | KORD FH19022812-GFS | Diagonal |
| Horizon Day-Rolling run | KORD FH12_12z-GFS | Diagonal |
| Horizon Hour-Rolling run | KORD FHH1_18z-GFS | Diagonal |
| Valid Day-Rolling | KORD FD1-GFS | Continuations of core (vertical/column) |
| Valid Day-Rolling run | KORD FD1_12z-GFS | Continuations of core (vertical/column) |

In some examples, the symbology may include additional condition codes, including one or more of a Daily % Complete code, an Interpolated code, and a Fast/Full code. For example, "fast" and "full" selections may be handled by one or more associated condition codes. In some examples, the symbology may include additional commodity codes for different % Complete values (e.g., ¼th, ⅛th, 1/24th, etc., depending on the model and forecast day). In some examples, the "% Complete" value may be provided at 50% or higher.

In some examples, the symbology may include different selection presentation behavior depending on which condition codes are selected. In some examples, a default behavior for presenting any charts may include presenting a highest percent complete available for any point. In some examples, if a "100% complete" code is selected, then no other % complete conditions may be shown. In some examples, a default behavior for a "Fast/Full" condition code may include presenting a "latest" (typically full) (e.g., unless the full information hasn't yet arrived). In some examples, if "Full" code is selected, the "Fast" value may not be shown. In some examples, if the "Interpolated" condition code is selected as the default behavior, interpolated data may be presented. % Complete, for example (e.g., ¼ths, ⅛ths, 1/24ths, depending on the model and forecast day).

In some examples, the symbology may include condition codes for the front end (e.g., an interactive GUI, a spreadsheet, etc.), such as condition codes in "Time and Sales", and may provide additional fields for a forecast valid hour/day. In some examples, the symbology may provide for updates to values in one or more charts. In some examples, the symbology may provide the ability to filter tick charts by "% complete" and/or interpolation by symbol. In some examples, a same symbol and different % completes may be provided in a same chart. In some examples, data may be pulled into a spreadsheet via time and/or sales information.

In some examples, the symbology may use metadata including, without being limited to, one or more of latitude ("Lat"), longitude ("Long"), altitude, elevation, a description, description information from ICAO/WMO/WBAN/USAF/CRN/SNOTEL (if available), station start, station end and time zone. In some examples, the symbology may use one or more of interval start information (e.g., start of a hour/day referenced), interval end information (e.g., end of an hour/day referenced) and received time information. In some examples, a default selection behavior may be provided, such as in a GUI, in flex metadata and the like. Table 9 provides examples of default interval type by symbol.

TABLE 9

Examples of Default interval type by symbol

| Symbol Type | Symbol | Start | End | Received |
| --- | --- | --- | --- | --- |
| Model Run-Rolling | KORD MR0-GFS | Yes | Yes | Yes |
| Model Run-Specific | KORD MR190228_12z-GFS | Yes | Yes | Yes |
| Model Run-Rolling run | KORD MR0_0z-GFS | Yes | Yes | Yes |
| Horizon Day-Rolling | KORD FH13-GFS | Yes | Yes | Yes |
| Horizon Hour-Rolling | KORD FHH1-GFS | Yes | Yes | Yes |
| Horizon Day-Specific | KORD FH190228-GFS | Yes | Yes | Yes |
| Horizon Hour-Specific | KORD FH19022812-GFS | Yes | Yes | Yes |
| Horizon Day-Rolling run | KORD FH12_12z-GFS | Yes | Yes | Yes |
| Horizon Hour-Rolling run | KORD FHH1_18z-GFS | Yes | Yes | Yes |
| Valid Day-Rolling | KORD FD1-GFS | Yes | Yes | Yes |
| Valid Day-Rolling run | KORD FD1_12z-GFS | Yes | Yes | Yes |

In some examples, system 102 may provide an example display frequency of at least about 10,000 points a minute (e.g., at irregular intervals), and may include an example latency of less than about 1 second response to desktop and/or client applications (e.g., client application(s)/service(s) 126). In some examples, weather integration server 116 may provide an example non-historical forecast decay, where, after 48 hours from release, non-historical data may decay, and where all historical data may remain (including, in some examples, remaining indefinitely).

In some examples, weather integration server 116 may include history requirements such as no backfill for missing data and example corrections (including no corrections options) for data having any errors.

In some examples, weather integration server 116, in addition to providing fields for the presentation of integrated weather data, may provide ensemble fields (which may reflect the set of ensemble runs). Non-limiting examples of ensemble fields may include temperature, GWDDD and precipitation. In some examples, weather integration server 116 may also provide one or more ensemble field sets including, without being limited to, an average, a minimum, a maximum, a standard deviation, 10%, 25%, 50%, 75% and/or 90% variables.

In some examples, weather integration server 116 may provide user-selectable options for watchlist values. In some examples, values may be with respect to a "Latest" received. For example, a watchlist value for a model run may refer to a latest point in time, a watchlist value for a valid day may refer to a most recently received value, and a watchlist for a horizon day may refer to a most recently received value. In some examples, a same field may be configured to have different values for a same location, depending on the symbology term used. In some examples, interval start and interval end fields in the watchlist may update with a latest update. In some examples, the watchlist may provide a cleardown style behavior. In some examples, cleardown logic may not be applied, when a rolling contract points to a new model run dataset which doesn't yet have data (e.g., a blank value may be shown). For example KORD FVD18-GFS.GWDD may be presented as blank while the model run is now starting to be available, but the value for day 18 is not completed. The use of cleardown logic in suitable circumstances (and not using cleardown logic in some circumstances) may be useful for viewing the data in the watchlist.

In some examples, weather integration server 116 may provide various types of data usage (e.g., depending upon the type of client application/service 126). In some examples, data usage for a trading desktop may include presentation of about 1 to 20 charts (where each chart may include about 1 to about 25 time series points), about 1 to about 10 grids (where each grid may include at least thousands of individual requests) and may provide one or more spreadsheets (where users may maybe greater than about 5000 datapoint requests and may provide greater than about 100 time series refreshes at a time).

Examples of an Interactive GUI

Next, examples of an interactive GUI 900 for providing interactive tools for viewing and interacting with integrated weather and market data are described with respect to FIGS. 9A-9H. In some examples, interactive GUI 900 may represent an example of weather impact dashboard 122 (FIG. 1).

Figure 9A:
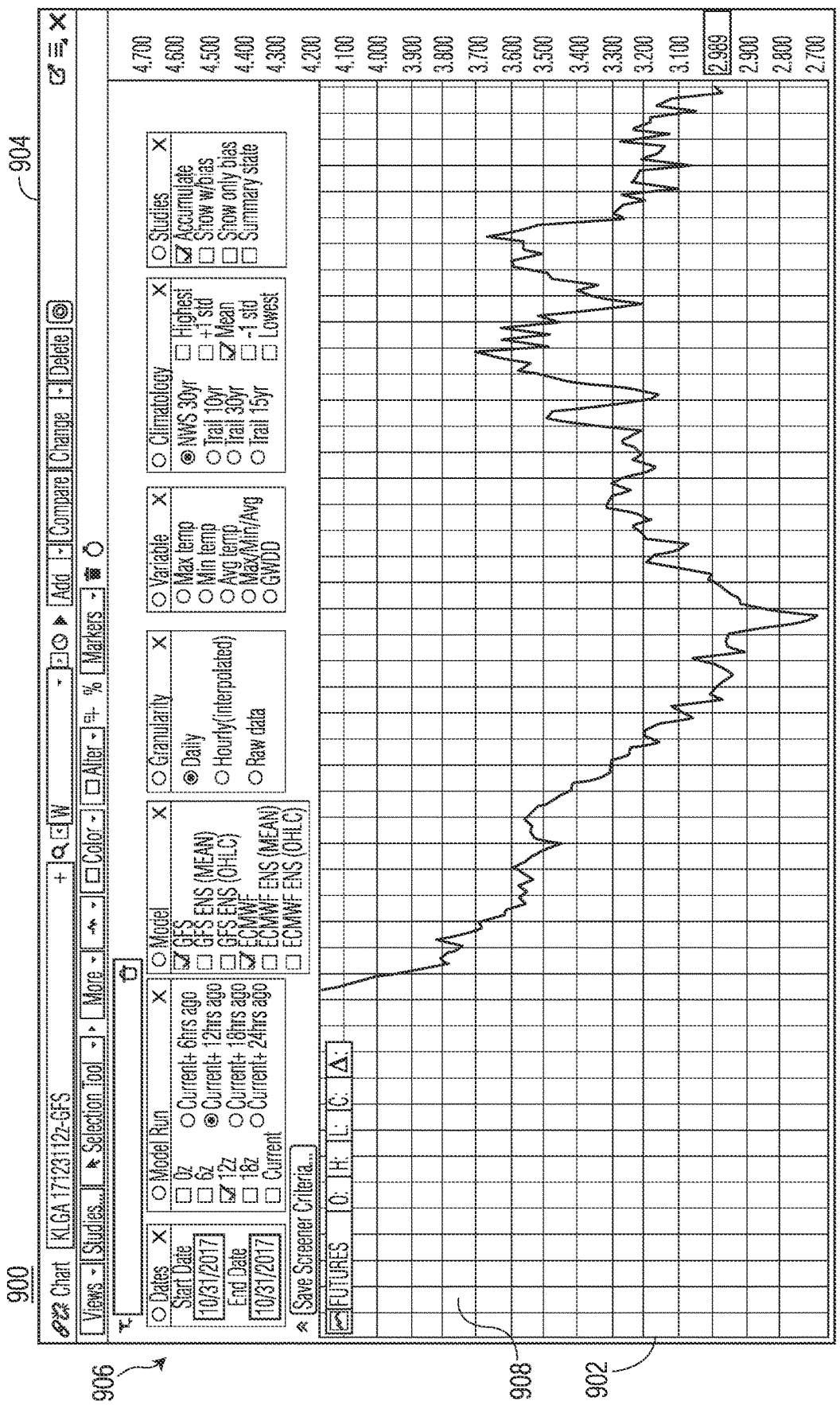
Figure 9B:
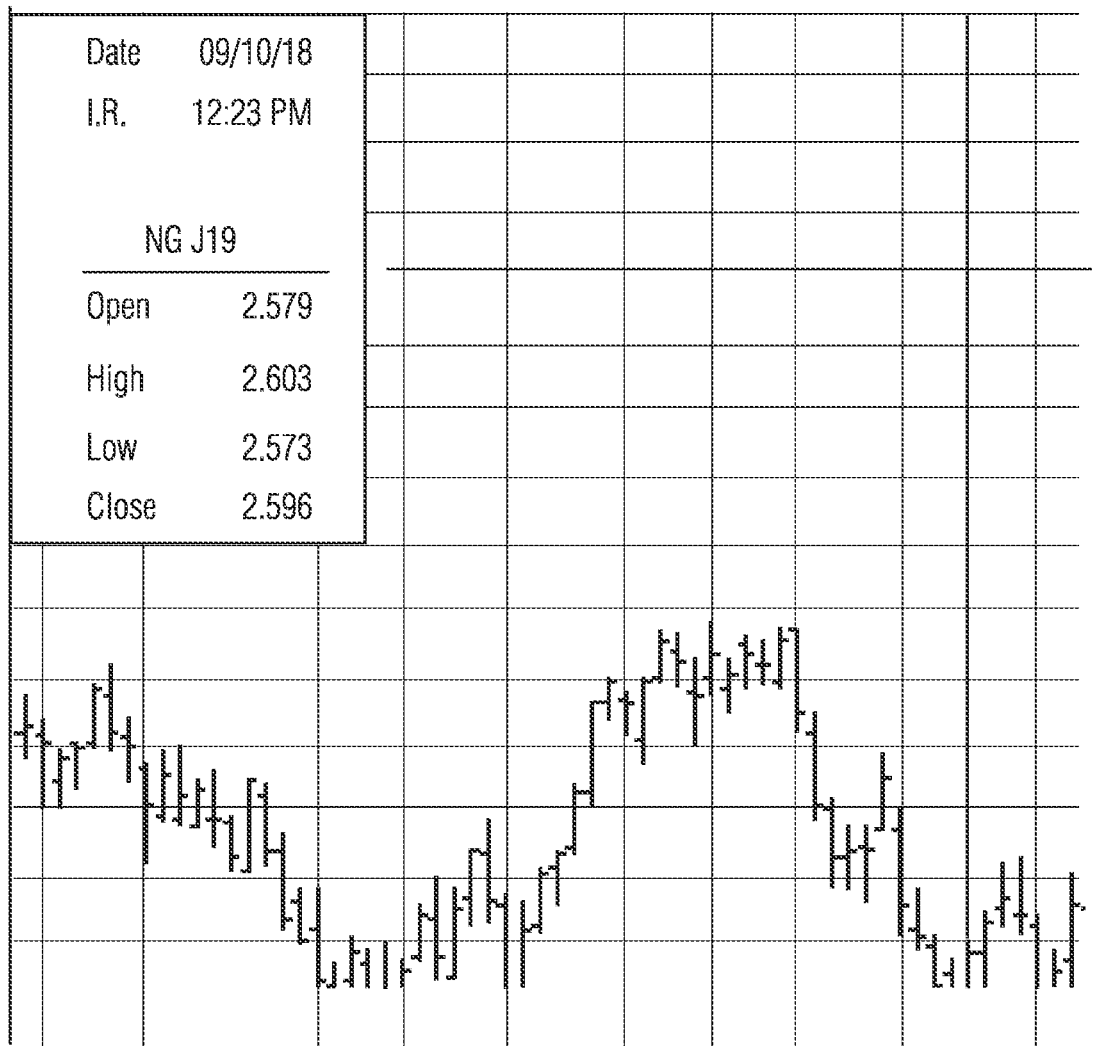
Figure 9C:
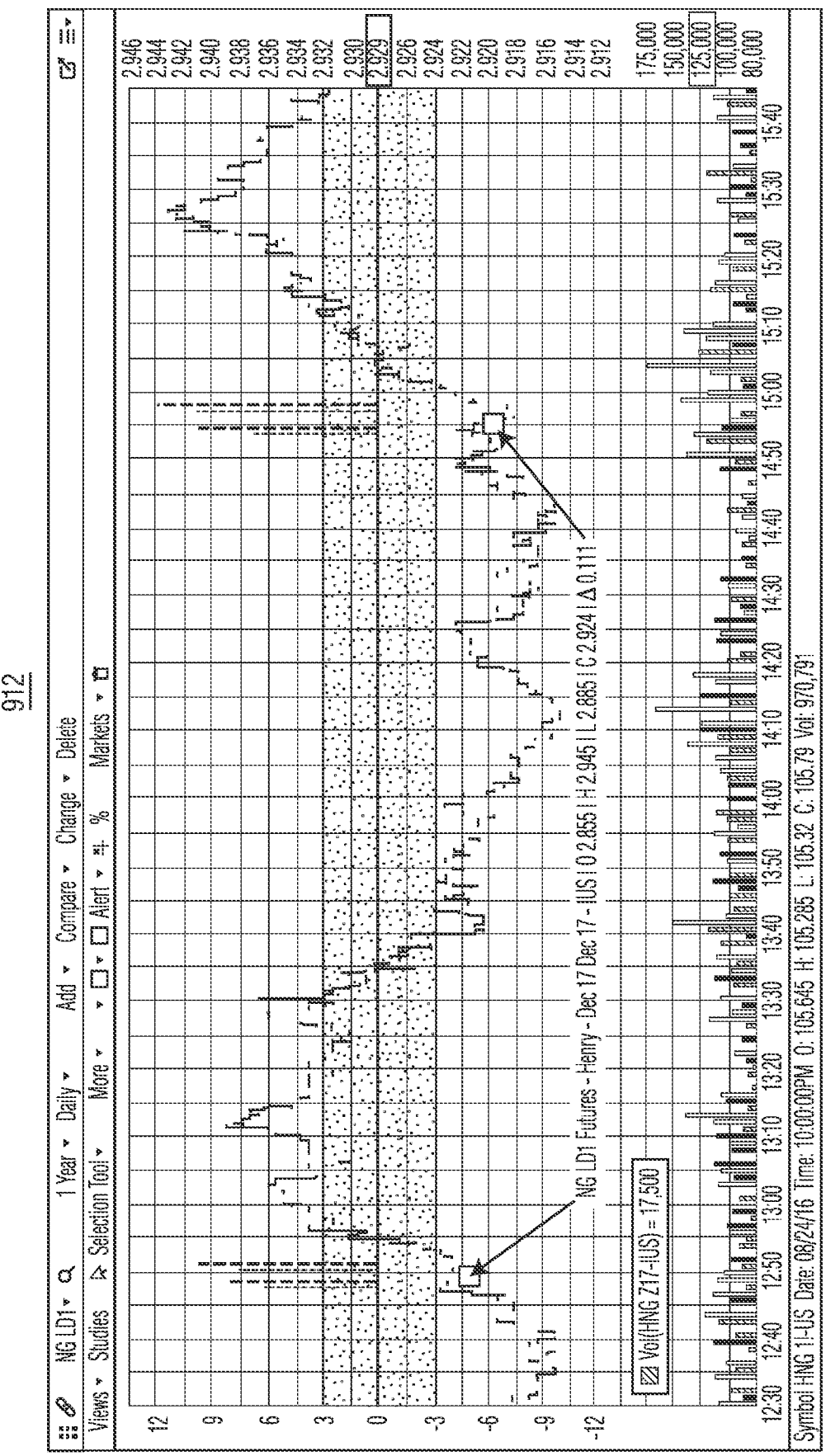
Figure 9D:
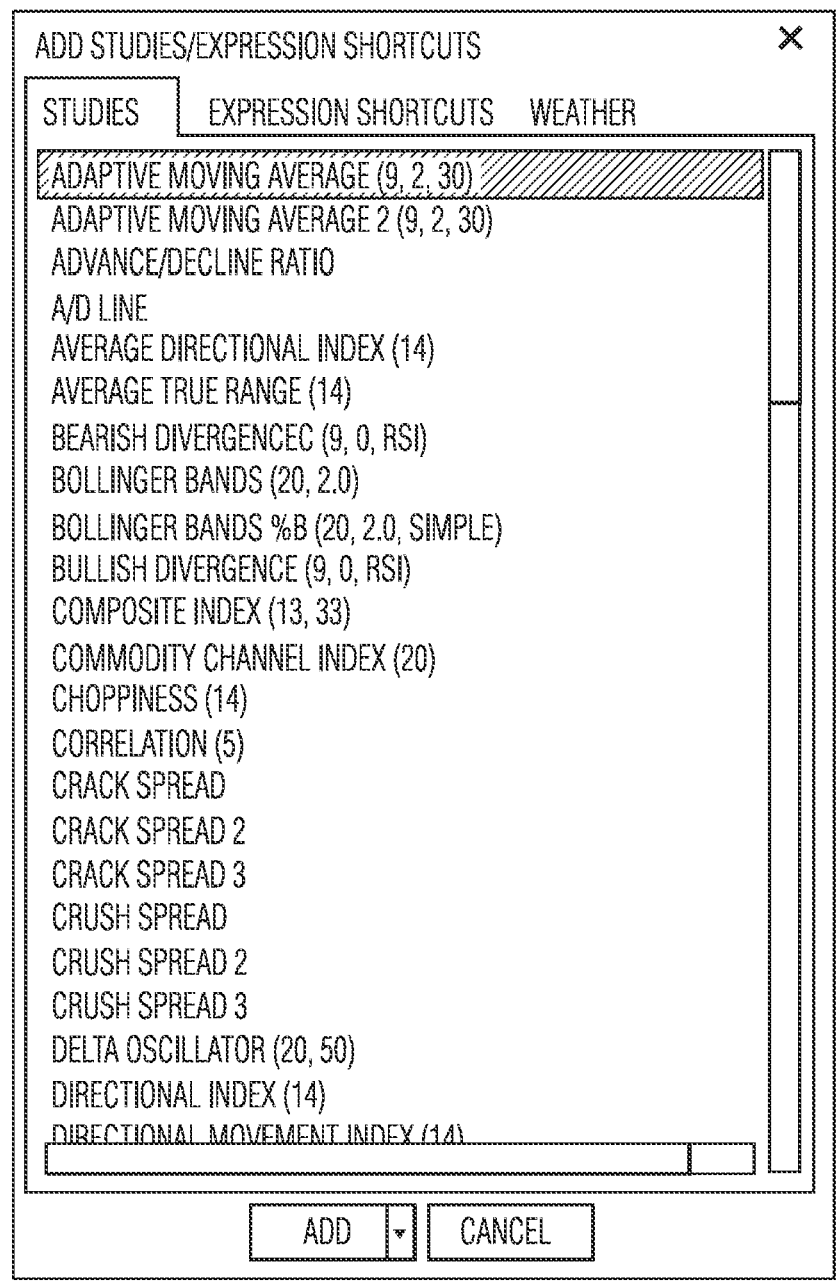
Figure 9G:
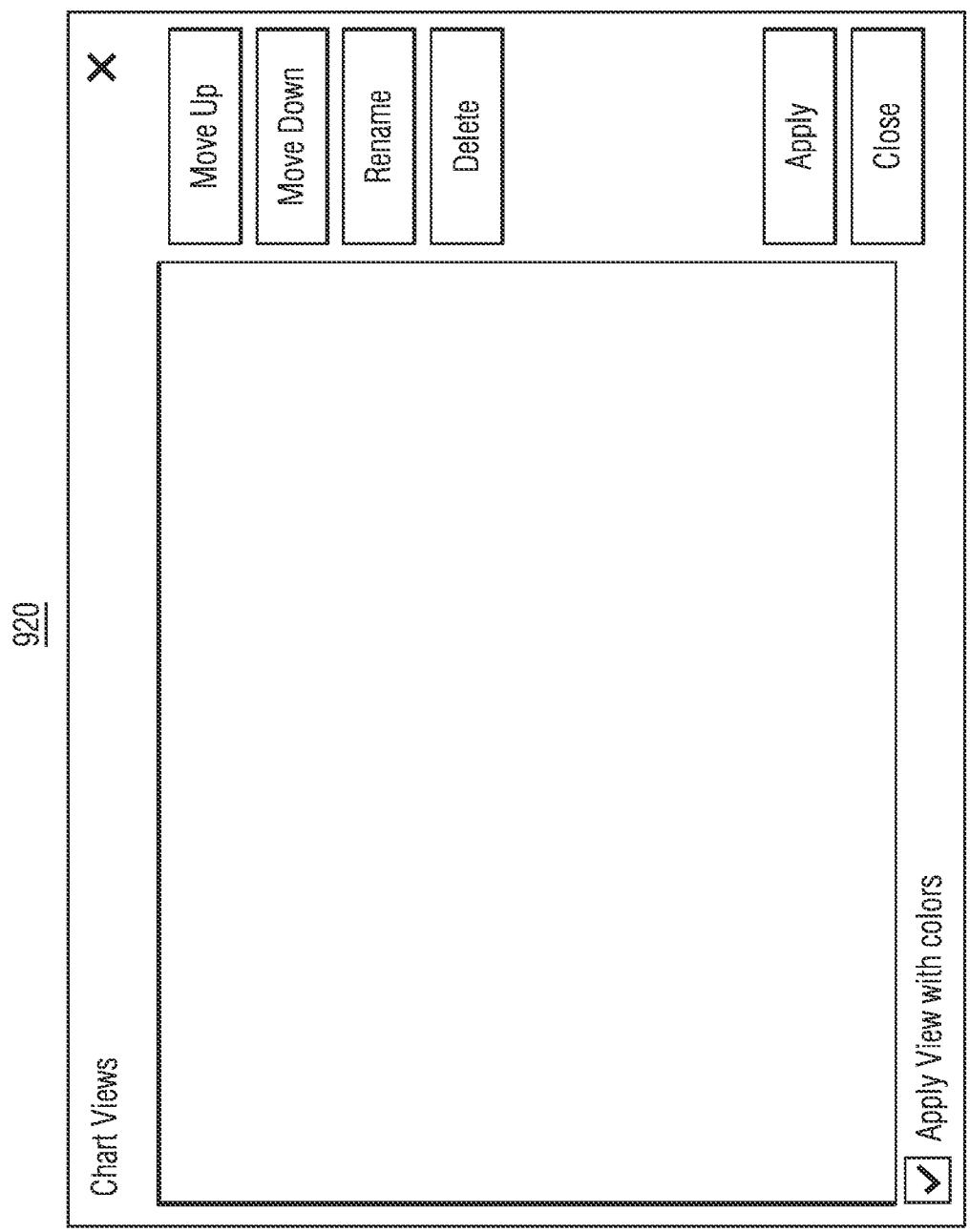

In some examples, interactive GUI 900 may include one or more windows, such as window 902 and window 904. In some examples, window 902 may include user input region 906 (e.g., for providing a weather data request that may correspond to a weather symbology instruction). In some examples, window 902 may further include display region 906 for displaying weather and/or market data. In some examples, display region 906 may include an interactive display. FIG. 9B shows a portion of display region 910 of interactive GUI 900 illustrating an example chart. FIG. 9C shows window 912 of interactive GUI 900 illustrating an example integrated weather and market data chart. FIG. 9D shows window 914 of interactive GUI 900, illustrating options for bias and bias adjusted overlays. FIG. 9E shows window portion 916 of interactive GUI 900, illustrating options for creating a customizable marker. FIG. 9F shows window 918 of interactive GUI 900, illustrating options for creating condition alerts. FIG. 9G shows window 920 of interactive GUI 900, illustrating options for managing custom markers. FIG. 9H shows a portion of window 922 of interactive GUI 900, illustrating an example grid display. It should be understood that FIGS. 9A-9H represents a non-limiting example user interface, and that a differing interface configured in accordance with this disclosure may be provided for providing presentation and interaction with integrated weather and market data.

In some examples, interactive GUI 900 may include global controls such as time zone support and at least one weather properties section for selecting weather properties (e.g., Celsius/Fahrenheit, Mm/in (precip), M/Feet (Waves), Hpa/inhg/mmhg (pressure) and Mph/kmh/mps (wind)). In some example, interactive GUI 900 may include user-selectable options for chart presentation (e.g., an ability to add interval start/end/received to any chart (interval start=Forecast Valid), an ability to add % complete, an ability to add various conditions codes (e.g., % complete, fast/full, interpolated, not interpolated), and an ability to add various interval time values (e.g., received, start, end)).

In some examples, interactive GUI 900 may include user-selectable options for weather objects. For example, users may be able to apply various criteria to their charts through the boxes shown in user input region 906 of window 902 (FIG. 9A). In some examples, criteria boxes can be hidden/displayed when clicking the screener button in the upper right corner (in window 902). In some examples, if the user has entitlements for weather, and a weather symbol is entered into the top left, in some example a button will appear.

In some examples, configurable objects in a weather window may include location region control (this is a type-ahead search only on weather symbols), model run (e.g., 0z, 6z, 12z, 18z, current model run, current +6 hrs ago, current +12 hrs ago, current +18 hrs ago, current +24 hrs ago), model (e.g., GFS, GEFS, etc.), symbol granularity (daily, synthetic hourly, raw data), climatology overlay (e.g., NWS 30 yr, Trail 30 yr, Trail 15 yr, Highest, 1+ std, Mean, −1 std, Lowest), and studies (e.g., accumulate, show with bias, show only bias, summary stats only).

In some examples, interactive GUI 900 may provide an ability to save a criteria and view modify existing weather window views. In some examples, interactive GUI 900 may be configured to provide a display of data based on criteria that can be filtered through user entry, selection, suggested values, other, to filter results based on users' needs. Example controls available may include checkboxes, radio buttons, ranges and/or manually entered alpha/numerical values. In some examples, users may be permitted to temporarily turn on/off criteria by clicking on, for example, a green light at upper left of criteria box for what if scenarios. In some examples, criteria boxes may be collapsed to offer more screen real estate for a data view. This operation may be performed, for example, by clicking a double arrow on the bottom left of toolbar. Criteria filtered entries may still visible in collapsed mode. In some examples, users may be permitted to still modify criteria filters in collapsed mode by clicking on highlighted text. In some examples, users may save criteria sets for easy recall of filtered sets.

In some examples, interactive GUI 900 may provide options for studying the impact of weather data on market data. For example, interactive GUI 900 may provide climatology overlays. In some examples, statistical ranges for the overlays may take a portion of or all weather series in a chart as input. Examples of the statistical ranges may include a highest high, an upper 1 sigma, a lower 1 sigma, a lowest low and a mean. In some examples, interactive GUI 900 may also provide options for bias and bias adjusted overlays (see, FIG. 9D).

In some examples, interactive GUI 900 may provide user-selectable options for markers enhancement. In some examples, the markers enhancement options may include the ability to create a new customizable marker (e.g., when a user clicks "Customize" from the Markers drop down, they may see a window similar to custom alerts). (See FIGS. 9E and 9F.) In some example, the markets enhancement options may include a way to toggle between all events where the expression is true, and when the first event occurs (cross over). For example, If KORD DIFF-GFS>4 AND KORD Change-GFS>4. In some examples, markers may use an interval start for cross reference. In some examples, markers may contain metadata on hover (e.g., value, expression, time received). In some examples, a window may be provided for managing custom markers (see FIG. 9G).

In some examples, interactive GUI 900 may be configured to provide a user with options to generate a watchlist. One example use case is using the FV day type symbols to pull in GWDD as the data arrives. In some examples, interactive GUI 900 may include additional weather colorization logic for the watchlists.

In some examples, interactive GUI 900 may be configured to generate one or more grids. In some examples, a grid may be the primary location for creating displays of this weather data. In some examples, the grid may include an ability to pull out history for any hourly point, daily point, and any historical field. In some examples, additional grid syntax may be provided to filter on new weather condition codes (e.g., interpolated, % complete, fast vs. full). In some examples, additional grid syntax may be provided to request data by different timeline indices (e.g., start, end, received). In some examples, additional grid coloration logic may be provided for weather (e.g., which may be user defined in weather global parameters). See FIG. 9H for an example of a grid.

Referring next to FIGS. 10A-10K, examples of an interactive GUI 1000 for providing interactive tools for viewing and interacting with integrated weather and market data are described, according to another aspect of the present disclosure. In some examples, interactive GUI 1000 may represent an example of weather impact dashboard 122 (FIG. 1). It should be understood that FIGS. 10A-10K represent a non-limiting example user interface, and that a differing interface configured in accordance with this disclosure may be provided for providing presentation and interaction with integrated weather and market data.

Figure 10A:
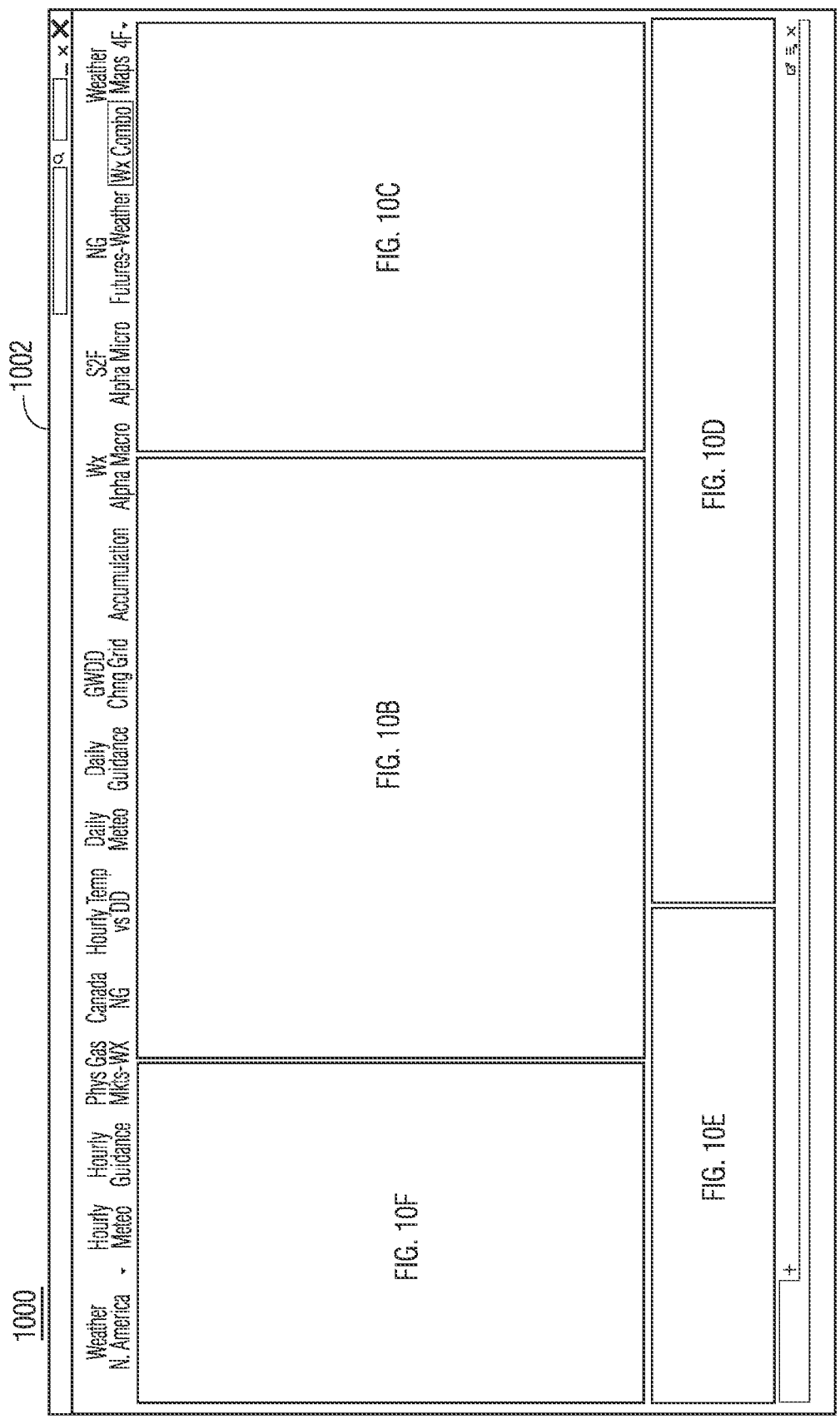

In some examples, interactive GUI 1000 may include weather landing page 1002, as shown in FIG. 10A. Weather landing page 1002 may include various regions 1004-1014 (shown in detail in respective FIGS. 10B-10F) for viewing and interacting with user-customizable weather and market data in real-time (including weather data integrated with market data), and for creating user-customizable watchlists and alerts. In some examples, weather landing page 1002 may include weather alpha region 1004 (shown in FIG. 10B), map region 1006 (shown in FIG. 10C), model status region 1008 (shown in FIG. 10D), watchlist region 1010

(shown in FIG. 10F), drill around region 1012 (shown in FIG. 10F) and alerts region 1014 (shown in FIG. 10E). Weather landing page 1002 may also include one or more additional selectable tabs (e.g., hourly meteorology, hourly guidance, etc.) as shown in FIG. 10A) which may open one or more additional windows, pop-up windows and/or regions in weather landing page 1002.

Figure 10B:
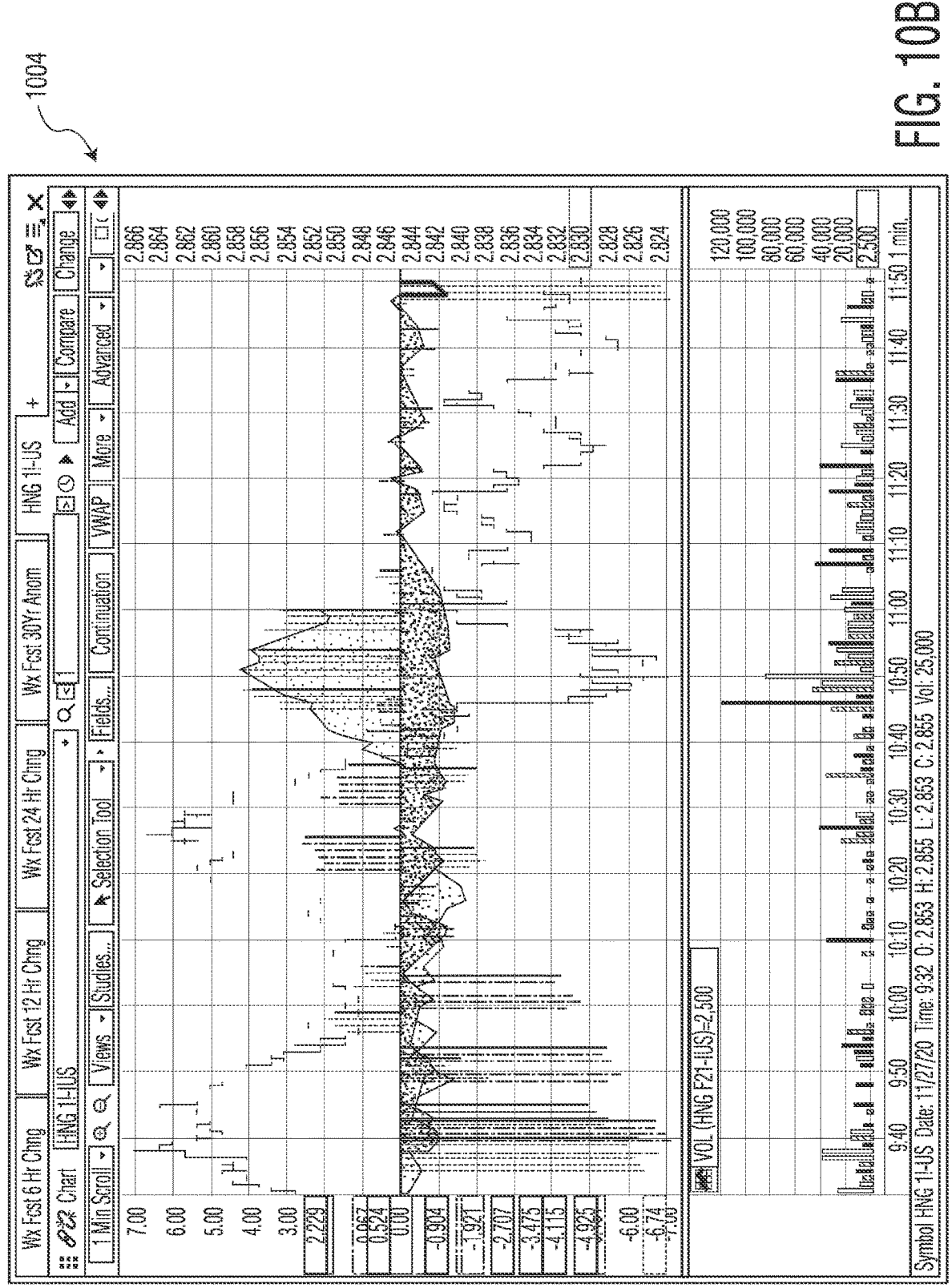

Referring to FIG. 10B, in some examples, weather alpha region 1004 may be configured to present live streaming weather-alpha data for display and user-interaction, including integrated live streaming weather data and live streaming market price data. Weather alpha region 1004 may also be configured be configured to receive user input (e.g., via one or more user buttons, drop down menus, text boxes and the like). In some examples, hovering over a location by a pointing device (e.g., a mouse) may cause weather alpha region 1004 to present additional information. In some examples, weather alpha region 1004 may be configured to present live streaming weather and price in accordance with a specific location (e.g., a specific trading location) in an graphical format. In some examples, the weather data may be expressed in one or more "trader" time periods (e.g., NG weeks, Calendar weeks, etc.) to better match any time periods for transacting in any desired financial instruments.

In general, weather alpha region 1004 may be configured to depict how weather forecasts (e.g., changing weather perceptions and/or anomalistic weather) may move commodity prices, in real-time. Weather alpha region 1004, may be used, together with the weather symbology of the present disclosure to create unique (and user-customizable) financial weather workflows and provide unique transformational integrated weather and price visualizations. Such unique and customizable integrated weather and price visualizations are exclusive to the present disclosure and do not exist in conventional systems. Although it is generally known that weather versus price relationships may exist, challenges exist in quantifying market efficiencies/inefficiencies of market price digesting this information, as well as any frequency of occurrences, a market breadth of weather impacts and a magnitude of the price changes related to changing weather perceptions. Interactive GUI 1000 (including weather alpha region 1004), through the unique integrated and customized presentation of live weather and market data, significantly improves this type of weather/price analysis and provides such data and information in an easily accessible manner for various types of users (e.g., in the financial community), and brings a once analog weather market into a streamlined digital workflow.

In some examples, weather alpha region 1004 may include options for providing weather alpha information according to an alpha micro presentation or an alpha macro presentation. For an alpha micro presentation, weather alpha region 1004 may provide the fastest and most detailed views of changing weather perspectives (e.g. from key government entity forecasts) overlaid with real-time market prices. In some examples, an alpha micro presentation may use preliminary daily values processed in real-time from hourly forecast data, to deliver an early view of forecasted daily temps & GWDD, minutes in advance of alternate weather providers. For an alpha macro presentation, weather alpha region 1004 may provide a comprehensive qualitative review over an entire trading day (or multiple trading days) showing how various weather forecast models (including various model runs) have influenced market prices (for any instrument). In some examples, the alpha macro presentation may provide a quick qualitative view of a directional relationship between weather and price data.

Figure 10C:
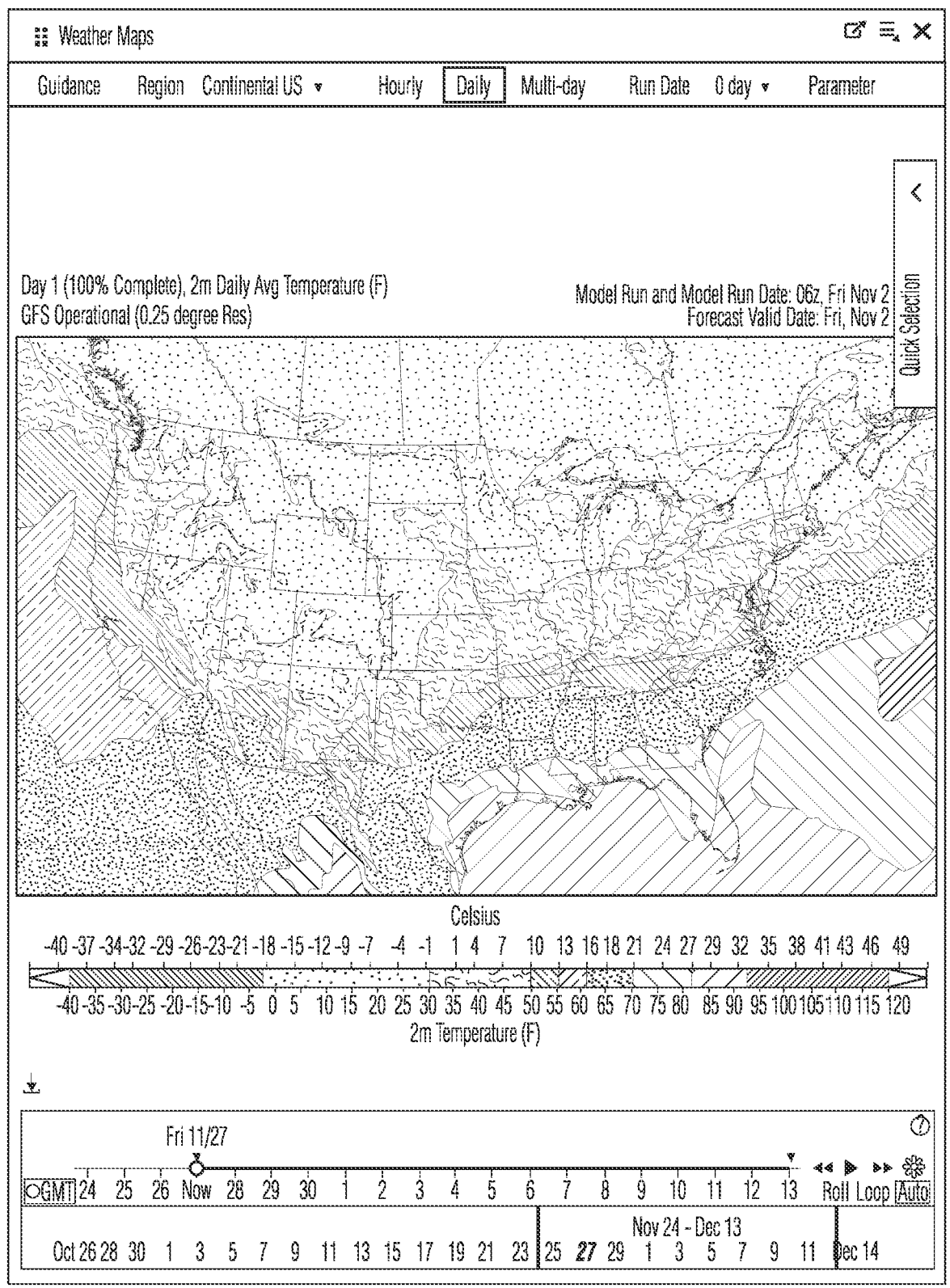

Referring to FIG. 10C, map region 1006 may be configured to present one or more weather maps, including live streaming weather maps. In some examples, the weather map(s) may be presented in a graphical format and may include various colorizations (e.g., to indicate weather information such as temperature gradations). In some examples, map region 1006 may provide user input options for selecting and customizing various types of weather maps. The presented weather maps in map region 1006, working in concert with the presented weather and price information in weather alpha region 1004, may allow the user to view big picture impacts of weather, for example, the impacts of weather about to enter into a region of interest of a weather map. In some examples, map region 1006 may deliver weather nap(s) within seconds after government entity weather forecasts are made available into the public domain. In some examples, the weather maps may include maps related to one or more of hourly weather data, daily weather data, multi-day weather data, seasonal/performance data, weather anomaly data and change of weather. The weather maps may include one or more comprehensive maps covering the Earth's sub-surface, surface, upper air, along with liquid/frozen precipitation, renewables, etc.

In some examples, weather map(s) presented in map region 1006 may depend on a particular weather workflow. In a guidance workflow, weather map(s) may be presented in such a manner to easily compare a number of weather forecasts for relative agreement/disagreement (e.g., a forecast risk). In a progression workflow, weather map(s) may be presented in such a manner to hold target data constant to view how all weather forecasts have changed over time for a specific target date. In a performance workflow, weather map(s) may be presented in a manner to help understand weather forecast accuracy (e.g., by exploring warmer/coder bias or mean absolute error).

In some examples, seasonal map(s) may be configured in a manner to easily compare and contrast longer range weather forecasts (e.g., covering a balance-of-the-month, a prompt month, a next two seasons, etc.). In some examples, map region 1006 may include user options for selecting various streaming weather maps (e.g., geographic region, time period (e.g., hourly, daily, multi-day), model run date, weather map type and/or popular maps). In some examples, options for a geographic region may include options for global, regional, tropics and GIS.

Referring to FIG. 10D, in some examples, model status region 1008 may provide real-time (e.g., up-to-date) status information of various weather model downloads. In some examples, model status region 1008 may include user-customizable options for presentation of model status information. In some examples, model hours may be organized into Forecast Valid Days (rows) based upon a selected time zone, and may display percentage (%) complete for the particular model. In general, the model status information presented in model status region 1008 may provide a snapshot of the weather models, to indicate when the weather forecast models have loaded and whether there are any delays and/or missing data. In some examples, the status information may be displayed in various colorizations. For example, for weather models/model runs, a green line may indicate the model is "currently running". A green status value may indicate that a specific model hour has arrived "on-time" as expected (e.g., based upon timestamps from the trailing fourteen days). A yellow status value may indicate that a specific model hour arrived slower than a trailing (for example) 14 day average (e.g., outside 1 standard deviation). A red status value may indicate that the specific model hour should have arrived (e.g. at least five minutes ago) and is still missing.

Referring to FIG. 10F, in some examples, watchlist region 1010 may provide one or more user-input options for creating a user-customizable watchlist of one or more selectable financial instruments that may be linked to a desired (e.g., optimal) weather location. In some examples, drill around region 1012 may include one or more drill-Around boxes associated with one or more financial instruments. The drill-around box(es) may provide one or more options related to one or more desired weather symbologies associated with the particular financial instrument(s).

Referring to FIG. 10E, in some examples, alerts region 1014 may include user-input options for creating customizable weather alerts, such as changing weather forecast(s) that may be considered by the particular user to be "significant." In some examples, alerts region 1014 may present active weather alerts, options to allow a user to add new weather alerts and/or options to view a history of one or more (including all) weather alerts which have been triggered. The information provided in alerts region 1014 may allow users to more confidently cover more weather influenced instruments with greater precision and confidence. In some examples, an alert may direct a user to specifically designed workbook when the alert is triggered.

Although exemplary regions are depicted in FIG. 10A, alternate configurations for the regions are envisioned. For example, a graphical user interface may contain more or fewer regions. Additionally, the regions may be reorganized in any manner and display other pertinent information.

FIG. 10G illustrates an example weather alert set up window 1016 (window 1016 herein) of interactive GUI 1000. Window 1016 represents a wizard for creating user-customizable weather alerts. In general, customizable weather alerts may allow a user to monitor streaming weather forecasts, and identify (user-specified) changes expected (by the user) to have a market impact. Window 1016 may include one or more user input regions for adding a new (user-customizable) weather alert (which may be presented in alerts region 1014 (FIG. 10E). In a non-limiting example, window 1016 may include location input region 1018, alert threshold input region 1020, weather model selection region 1022 and notification selection region 1024.

Location input region 1018 may provide a user input region for user input of one or more desired weather location. Alert threshold input region 1020 may include options for user input of one or more thresholds, to create one or more conditions for triggering an alert. In some examples, alert threshold input region 1020 may include options for scanning through historical data to select appropriate alert thresholds and/or a notes region for user input for indicating special notes (e.g., bullish/bearish) linked to an financial instrument. In some examples, weather model selection region 1022 may include user input options for selecting one or more models, one or more model runs, one or more forecast periods, forecast valid days to scan and at least one percentage complete value to utilize for the forecast. In some examples, notification selection region 1024 may include user input options for selecting one or more days a user desires the alert(s) to be active.

FIG. 10H illustrates an example weather perspective selection window 1026 of interactive GUI 1000 when workflow selector region 1028 is selected for a guidance workflow (also referred to herein as guidance window 1026). In general, weather perspective selection window 1026 represents a weather wizard for creating user-customizable charts for various weather perspectives (e.g., weather workflow(s), weather alpha(s)). The Guidance workflow may be configured to present weather data in a manner to help the user to understand forecast risk (e.g., relative agreement & disagreement among forecasts). The guidance workflow may provide another unique perspective to view same day weather forecasts, and how current weather forecasts relate to previous years.

Guidance window 1026 may include one or more user input regions for creating a user-customized guidance workflow. In a non-limiting example, guidance window 1026 may include location input region 1030 for selecting one or more weather locations, time interval input region 1032 for selecting hourly or daily time intervals, weather model selection region 1034 and observations selection region 1036. In some examples, weather model selection region 1034 may include user input for selecting one or more weather forecast models, one or more model runs, any ensemble statistics and one or more climatology options. Observations selection region 1036 may include user input options for observing the data, including real-time observations and historical weather forecasts.

In some examples, workflow selector region 1028 may include a weather workflow option for seasonal analysis (not shown). The seasonal analysis workflow may be configured to present data to easily compare years whose weather pattern(s) maybe similar to a current season, along with various climatologies. In some examples, the seasonal analysis workflow may be configured to overlay long range weather forecasts to gain a unique future perspective, which forecasts may be monitored in real-time as the forecast models are updated.

FIG. 10I illustrates an example weather perspective selection window 1038 of interactive GUI 1000 when workflow selector region 1028 is selected for an accumulation workflow (referred to herein as accumulation window 1038). In general, accumulation window 1038 may include user input regions similar to guidance window 1026, but with different options associated with creating an accumulation workflow. In general, the accumulation workflow may be configured to present data to provide a seasonal perspective to accumulated snow, precipitation, degree days, etc., to help analyze general market trends (e.g., seasons being above/below average).

FIG. 10J illustrates an example weather perspective selection window 1040 of interactive GUI 1000 when workflow selector region 1028 is selected for a progression workflow (referred to herein as progression window 1040). In general, progression window 1040 may include user input regions similar to guidance window 1026, but with different options associated with creating a progression workflow. In general, a progression workflow may be configured to present data to help users understand "convergence" of weather forecasts (e.g. when forecasts begin to agree with each other) as well as run-to-run volatility and mean reversion information.

FIG. 10K illustrates an example weather perspective selection window 1042 of interactive GUI 1000 when workflow selector region 1028 is selected for an alpha micro workflow (referred to herein as alpha micro window 1040). In general, alpha micro window 1042 may include user input regions similar to guidance window 1026, but with different options associated with creating an alpha micro workflow. In some examples, workflow selector region 1028 may also include an alpha macro window for creating a user-customized alpha macro workflow (not shown). In some examples, the alpha macro workflow may provide a quick qualitative view of the directional relationship between weather and price data over multiple model runs and/or multiple days. In general, a weather alpha workflow (e.g., alpha macro, alpha micro) may be configured to present forecasted GWDD from each weather forecast model, as it is released in the public domain vs price data. In some examples, the weather alpha workflow may be configured for such that a user may quickly scan across many different weather models and model runs and identify if the weather may be driving market price(s).

Computer Architecture

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

FIG. 11 illustrates a functional block diagram of a machine in the example form of computer system 1100 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components 112-128 of DID system 102, weather data source(s) 104, market data source(s) 106, user device(s) 108 and/or one or more components of system 1200 (FIG. 12) may be implemented by a specialized machine, particularly programmed to perform certain functions, such as the example machine shown in FIG. 11 (or a combination of two or more of such machines).

Example computer system 1100 may include processing device 1102, memory 1106, data storage device 1110 and communication interface 1112, which may communicate with each other via data and control bus 1118. In some examples, computer system 1100 may also include display device 1114 and/or user interface 1116.

Processing device 1102 may include, without being limited to, a microprocessor, a central processing unit, an application-specific integrated circuit (ASIC), a field programmable gate array (FPGA), a digital signal processor (DSP) and/or a network processor. Processing device 1102 may be configured to execute processing logic 1104 for performing the operations described herein. Processing device 1102 may include a special-purpose processing device specially programmed with processing logic 1104 to perform the operations described herein.

Memory 1106 may include, for example, without being limited to, at least one of a read-only memory (ROM), a random access memory (RAM), a flash memory, a dynamic RAM (DRAM) and a static RAM (SRAM), storing computer-readable instructions 1108 executable by processing device 1102. Memory 1106 may include a non-transitory computer readable storage medium storing computer-readable instructions 1108 executable by processing device 1102 for performing the operations described herein. For example, computer-readable instructions 1108 may include operations performed by components 112-128 of DID system 102, including operations shown in FIGS. 3A and 3B, and/or operations performed by components of system 1200, including operations shown in FIG. 13. Although one memory device 1106 is illustrated in FIG. 11, in some examples, computer system 1100 may include two or more memory devices (e.g., dynamic memory and static memory).

Computer system 1100 may include communication interface device 1112, for direct communication with other computers (including wired and/or wireless communication) and/or for communication with a network. In some examples, computer system 1100 may include display device 1114 (e.g., a liquid crystal display (LCD), a touch sensitive display, etc.). In some examples, computer system 1100 may include user interface 1116 (e.g., an alphanumeric input device, a cursor control device, etc.).

In some examples, computer system 1100 may include data storage device 1110 storing instructions (e.g., software) for performing any one or more of the functions described herein. Data storage device 1110 may include a non-transitory computer-readable storage medium, including, without being limited to, solid-state memories, optical media and magnetic media.

As discussed above DID system 102 may be configured to provide both weather and data streams (e.g. real-time data) in an integrated manner, and with various user-customizable perspectives for visualizing the impacts of weather data on market data (e.g., live changes in weather data, projected impacts of weather data on market data, etc.), thereby providing a user with actionable knowledge. DID system 102 may also be configured to provide various analytics (e.g., through the perspective workflows), as additional components, that may provide further means for evaluating an impact of weather data on market data. One such analytic may include an index that may be configured to convert weather data (including real-time weather data) to a weather index. The weather index may be configured to be instrument-specific, and may also be configured to be specific to a particular geographical location (e.g., a city, a region, a country, etc.). In some examples, a weather index generator component of the present disclosure may be configured to convert weather data (e.g., weather forecast model data, observations data for a geographical location) to a weather index specific to an underlying financial instrument that may offset a weather risk for the instrument. In some examples, the weather index generator may determine an instrument-specific (IS) weather index based on a degree day (DD) algorithm configured specifically for a particular index. In one non-limiting example, the DD algorithm may be configured for energy-related instruments such as natural gas, including to create a gas-weighted DD (GWDD) index. In general, an IS weather index may be created for any type of electronic financial instrument, including, without being limited to, energy (e.g., natural gas, electricity), agricultural (e.g., corn, soy), retail, fixed income, equity, etc. More generally, an IS weather index may be constructed for any electronically transacted instrument and/or any specifically designed basket of instruments whose value (or collective value) may be impacted (e.g., influenced) by weather.

Observed weather and perceived weather may directly influence the market price of many electronically traded instruments around the world, to varying degrees. While existing weather contracts use general weather, the onus rests upon the industry to match a general weather measurement to a very specific use case, resulting in varying levels of correlation risk. Aspects of the present disclosure relate to construction of a completely unique "weather-based index" (from which futures and options, for example, may be available). The weather-based index of the present disclosure may be a tradeable index specifically tailored to any existing underlying instrument (including in some examples an instrument currently traded), whose market price may be impacted by weather. In some examples, the weather-based index may be configured to remove weather risk embedded in specifically traded instruments, by using a spot-based tailored weather index from which futures and options may trade.

The novel application of weather to a weather index, as created by the present disclosure, may provide significantly greater efficacy for users currently engaged in electronic financial transactions of some existing underlying security, to remove an embedded weather risk from the particular instrument. In an age where climate is impacting so many aspects of modern-day business, the instrument-specific weather index of the present disclosure may be configured to isolate such weather risks, so that an entity can be measured against the elements which are under the entity's control and influence (e.g., elements other than weather events, that are particular to the entity), while also allowing others who wish to speculate on the weather trends to assume the opposing weather impact to the specific entity. Although the present disclosure describes examples relating to natural gas markets, it is understood that natural gas markets represent a non-limiting example, and that the concepts of the present disclosure can be applied to any specific traded instrument and/or any specifically designed baskets of underlying instruments, including but not limited to, natural gas, electricity, corn, soy, fixed income, equities, etc.

In some examples, systems and methods of the present disclosure may utilize global weather data, and may not only provide users the same weather capabilities found in the most reputable weather vendors but may also leverage market price data and trading desktop user interface functionality to provide a transformative weather workflow for global commodity transactions (and, in some examples, equity and fixed income transactions). The new weather capability of the present disclosure inside of the specialized user interface may be transformative. For example, the entire marketplace may be able to more quickly identify and better quantify embedded weather risk inside market prices, thereby essentially leveling the playing field for all weather information, for all market participants.

In some examples, systems of the present disclosure may provide a mix of foundational weather capabilities (sometime referred to as "me too" weather services) as well as unique and transformative weather capabilities inside a specialized trading desktop. In some examples, more specialized weather capabilities could also be provided as standalone services. In some examples, aspects of the present disclosure may also include the creation of an IS weather index. The unique weather data capability of the present disclosure may help to evolve the weather marketplace from a weather map centric workflow, to a more quantitative weather workflow, more easily exposing weather's influence upon price risk. This impact (with varying degrees) is quantifiably present in many electronically traded instruments. This evolution regarding the awareness of weather's influence on many traded instruments combined with a suitable mix of foundational weather data tools and services may create a growing demand for IS weather indices, designed to mitigate weather risk and which index may better (and more accurately) benefit various types of liquidity providers (e.g., hedgers, liquidity providers, etc.).

Figure 12:
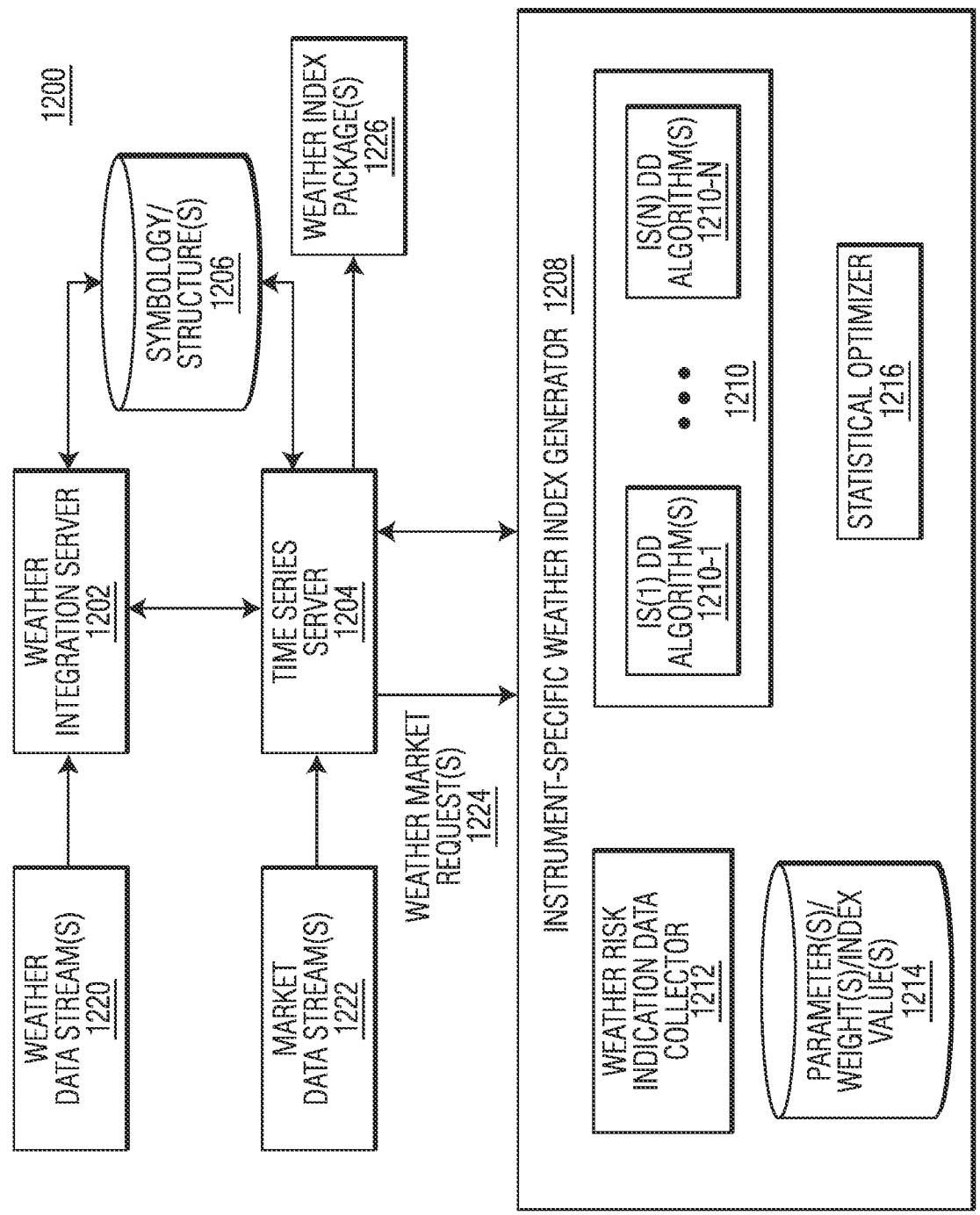
FIG. 12 is a functional block diagram of an example weather index system, according to an aspect of the present disclosure.

Referring now to FIG. 12, a functional block diagram of example weather index system 1200 (system 1200 herein) is shown. System 1200 may include weather integration server 1202, time series server 1204, one or more databases 1206 and instrument-specific (IS) weather index generator 1208 (generator 1208 herein). In some examples, system 1200 may be configured as part of DID system 102.

Weather integration server 1202 is similar to weather integration server 116 shown in FIG. 1, except that weather integration server 1202 is shown as receiving one or more weather data stream(s) 1220 (which may be received from data feed distributor 114). Although not shown, weather integration server 1202 may also be configured to obtain (e.g., in addition to real-time streaming data) one or more of static data (e.g., historical data, data and/or information that may not be updated, etc.), periodic data, and aperiodic data (e.g., via weather data source(s) 104 shown in FIG. 1).

Time series server 1204 is similar to time series server 118 shown in FIG. 1, except that time series server 1204 is shown as receiving one or more market data stream(s) 1222 (which may be received from data feed distributor 114). Although not shown, time series server 118 may also be configured to obtain (e.g., in addition to real-time streaming data), one or more of static data, periodic data and aperiodic data (e.g., via market data source(s) 106 shown in FIG. 1). In some examples, the market data may include any suitable fundamental data, alternative data sales revenue, earnings per share data and any other suitable market data information that may help to derive the weather's impact on specific instrument(s) and/or basket of instruments. In some examples, time series server 1204 may also receive any other information, such as news feeds, media information and the like that may provide insight on a possible impact of weather on specific instrument(s)/basket(s) of instruments. Time series server 1204 is also different from time series server 118 in that time series server 1204 may be in communication with IS weather index generator 120 and may provide one or more weather index requests 1224 to generator 1208. In some examples, weather index request(s) 1224 may be generated by time series server 1204 (e.g., in response to one or more predefined conditions, one or more predefined parameters, etc.). In some examples, weather index request(s) 1224 may be generated (by time series server 1204) in response to user input (e.g., received from user device(s) 108 such as via API(s), data feed(s), client application(s)/service(s) 126, etc.). Time series server 1204 is also different form time series server 118 (FIG. 1) in that time series server 1204 may receive IS weather index information from generator 1208 (e.g., responsive to weather index request(s) 1224. The weather index information may be received (by time series server 1204), for example, in response to changes in underlying weather data used to generate the IS weather index information, periodically, in response to a predefined event and/or condition, etc. Responsive to the weather index information, time series server 1204 may generate one or more weather index presentation package(s) 1226. In some examples, weather index presentation package(s) 1226 may be provided in addition to and/or as part of integrated presentation package 226 (FIG. 2) provided by DID system 102.

In some examples, time series server 1204 may include one or more payout algorithms (not shown) for applying one or more price elements to an IS weather index (e.g., for converting IS weather index value(s) (determined by instrument-specific degree day algorithm(s) 1210) to at least one currency value. For example, the payout algorithm(s) may determine at least one price element to apply to the IS weather index value depending on a final settlement value for the IS weather index with respect to at least one predetermined time period (e.g., a day, a week, a month, a season, a year, etc.). The final settlement value is described further below. As one example, each IS weather index value over and under the final settlement price may be assigned a respective predefined price element. As another example, IS weather index values may be assigned to one or more tiers with respect to the final settlement value (e.g., a range of values within a first tier may be assigned a first price element (e.g., X dollars), a range of values in a second tier may be assigned a second price element (e.g., Y dollars), and the like). In some examples, the price element(s) that may be assigned may include an increasing (or decreasing) currency value as the IS weather index value increases over or under the final settlement value. In some examples, the currency value may increase (or decrease) according to a linear relationship, a non-linear relationship and/or an exponential relationship. In general, the payout algorithm(s) may include any suitable price element(s) for converting IS weather index value(s) to currency value(s).

The IS weather index information received by time series server 1204 (from generator 1208) may include one or more sets of IS weather index values corresponding to one or more specific instruments. Each set of IS weather index values may be associated with one or more locations (e.g., a single specific instrument may be associated with one weather index value corresponding to one location, multiple weather index values corresponding to different locations). In some examples, the locations may include one or more cities, one or more regions (e.g., comprising a combination of one or more cities), one or more multi-regions (e.g., comprising a combination of one or more regions) and any combination thereof. In some examples, the IS weather index information may include weather forecast model data used to determine the set(s) of IS weather index value(s). In general, the IS weather index information provided by generator 1208 may include any suitable information that may be useful for understanding and/or offsetting a weather risk for a particular instrument corresponding to particular location(s)). In some examples, generator 1208 may update the IS weather index information provided to time series server 1204 concurrent with changes in associated weather data (e.g., including in real-time), periodically, based on one or more predetermined conditions and/or events and/or responsive to weather index request(s) 1224.

In some examples, weather index presentation package(s) 1226 generated by time series server 1204 may include set(s) of IS weather index value(s) for one or more particular instruments together with one or more corresponding IS weather index settlement values. In some examples the set(s) of IS weather index values(s) may be updated concurrent with changes in the weather data (including, in some examples, in real time). In some examples, the (actual) settlement values may be generated daily (e.g., at the end of a trading day) and may be publicly published (e.g., via interactive GUI 120 (FIG. 1), via API(s), data feed(s), client application(s)/service(s) 126, etc.). In some examples, weather index presentation package(s) 1226 may include estimated and actual settlement values. One or more estimated settlement value(s) may be generated over a trading day, for example, based on market data for a particular instrument (from among market data stream(s) 1222) and based on a particular set of IS weather index value(s) for the particular instrument up to a one or more predetermined points of time throughout a trading data (including, in some examples, in real-time). In some examples, the publicly published settlement value(s) may be used for performing transactions with the particular instrument(s). In some examples, the publicly published settlement value(s) may be used as part of a transaction settlement upon expiration of a futures and/or options contract. In general, weather index presentation package(s) 1226 may include any suitable weather information that may indicate a weather risk and/or a weather risk offset for a particular instrument associated with a particular location. Examples, of information that may be included in weather index presentation package(s) 1226 is described with respect to FIG. 15.

Database(s) 1206 are similar to weather symbology storage 214 and weather structure storage 216 shown in FIG. 2, except that database(s) 1206 are illustrated as including the combination of storages 214, 216, and as being separate from weather integration server 1202. Similar to storages 214, 216, database(s) 1206 are in communication with both weather integration server 1202 and time series server 1204. In general, database(s) 1206 may store a predefined weather symbology and one or more predefined weather workflow structures, as described above. In general, database(s) 1206 may be configured as a separate component, may be part of weather integration server 1202 and/or may be part of time series server 1204. In some examples, database(s) 1206 may also include at least one predefined market data symbology, for segmenting market data stream(s) 1222 into one or more segments (e.g., for presentation on interactive GUI 120, for transmitting to user device(s) 108 such as via API(s), data feed(s), client application(s)/service(s) 126, etc.). In some examples, database(s) 1206 may store an index symbology suitable for segmenting weather data stream(s) 1220 (e.g., via separating and/or indexing the data) into segments suitable for use by generator 1208. In some examples, database(s) 1206 may store at least one weather structure for generating weather index presentation package(s) 1226.

Generator 1208 may include one or more instrument-specific (IS) degree day (DD) algorithms 1210 (also referred to herein as algorithm(s) 1210), weather risk indication data collector 1212, one or more database(s) 1214 and statistical optimizer 1216. In some examples, one or more components 1210-1216 of generator 1208 may communicate with each other via a data and control bus (not shown). In general, generator 1208 may be configured to receive weather index request(s) 1224 via time series server 1204, and may generate IS weather index information for one or more specific instruments, that may be used by time series server 1204 to generate weather index presentation package(s) 1226.

Although not shown, generator 1208 may include a controller (e.g., at least one processor, a microcontroller and the like, such as processing device 1102 shown in FIG. 11) and non-transitory memory (e.g., memory 1106 shown in FIG. 11) storing one or more routines and or algorithms for performing the functions of generator 1208 described herein. An example implementation of one or more components of generator 1208 is shown by computer system 1100 (shown in FIG. 11).

Weather risk indication data collector 1212 (collector 1212 herein) may be configured to collect weather data for one or more location(s) (e.g., weather observations, weather forecast model data from among one or more weather forecast models, wind data (e.g., wind speed, wind direction, etc.), solar radiation flux data, cloud cover, precipitation, etc.) that may provide an indication of weather risk for a particular instrument associated with at least one particular location. In general, collector 1212 may collect any suitable weather risk indication data for one or more locations, in accordance with corresponding ones of algorithm(s) 1210, that may provide an indication of weather risk for a particular instrument (with respect to at least one location). Collector 1212 may collect the weather risk indication data from among weather data stream(s) 1220, as segmented by weather integration server 1202. In some examples, collector 1212 may be prompted by algorithm(s) 1210 to collect weather risk indication data for one more location(s). In general, collector 1212 may collect weather risk indication, for example, in real-time, periodically, in response to at least one pre-determined event and/or condition, concurrent with changes in the weather risk indication and the like.

Database(s) 1214 may be configured to store one or more predefined parameters and/or one or more predefined weights associated with algorithm(s) 1210. In some examples, database(s) 1214 may be configured to store one or more previously determined IS weather index values. Non-limiting examples of predefined parameter(s) and predefined weights for IS DD algorithm(s) 1210 are described further below. In some examples, the predefined parameter(s) and/or weight(s) may include multiple values associated with different ones of algorithm(s) 1210 (e.g., a first set of values for algorithm(s) 1210-1, . . . , an N set of values for algorithm 1210-N). In some examples, database(s) 1214 may store at least a portion of the weather risk indication data collected by collector 1212. In general, database(s) 1214 may include any data and/or information that may be used by one or more of components 1210-1216 of generator 1208. In some examples, one or more predefined parameter(s) and/or weight(s) may be updated periodically, such as by statistical optimizer 1216 (e.g., based on any changes in climatological baselines for a particular location).

Algorithm(s) 1210 may include one or more algorithms, tailored for one or more instruments, and may be configured to generate at least one set of IS weather index value(s) (e.g., for at least one particular instrument associated with one or more locations). For example, for an N number of different instruments, algorithm(s) 1210 may include IS(1) DD algorithm(s) 1210-1, . . . , IS(N) DD algorithm(s) 1210-N (where N is an integer greater than or equal to 1). In some examples, more than one algorithm 1210 may be associated with a particular instrument. For example, IS(1) DD algorithm(s) 1210-1 may include two or more different algorithms that may provide different sets of IS weather index value(s) (e.g., based on different and/or additional instrument-specific parameters, based on different amounts of measured weather data, etc.). In one non-limiting example described in detail further below, IS(1) DD algorithm 1210-1 may include two different algorithms for generating a natural gas-specific weather index, where the first algorithm is referred to herein as a gas weighted degree day (GWDD) algorithm and the second algorithm is referred to herein as a gas-weighted degree day pro (GWDDP) algorithm. Although examples related to natural gas are described below, it is understood that algorithm(s) 1210 is not limited to natural gas instruments, and that any algorithm(s) 1210 tailored to quantifying weather's impact to a market price of any underlying instrument is also encompassed by the present disclosure, for instruments in any number of industries including but not limited to energy, agriculture, fixed income, equities, etc.

In general, each of algorithm(s) 1210 (e.g., IS(1) DD algorithm(s) 1210-1) may be configured to determine a set of weather index value(s) according to a degree day-based algorithm that is configured to take into account one or more predefined weather risk indication parameters and one or more weights (e.g., city weight(s), solar weight(s), wind generation weight(s), etc.) that are specific to each particular instrument for one or more locations. In general, the parameter(s) (and, in some examples, weight(s)) for each algorithm(s) 1210 may be determined, for a particular instrument, via statistical optimizer 1216, using statistical optimization to identify and determine values for the identified parameter(s) (and also weight(s) in some examples) that maximize a correlation between the weather index value for any given location (e.g., region) and the instrument (e.g., natural gas) consumed in that location (e.g., region). In some examples, algorithm(s) 1210 may include a controller (not shown) to select an appropriate one of algorithm(s) 1210 for a particular instrument. In some examples, algorithm(s) 1210 may be configured to generate additional IS DD algorithms (e.g., via a controller) responsive to weather index request(s) 1224 that may include a new instrument not having a corresponding algorithm 1210. In some examples, algorithm(s) 1210 may be configured to generate a new algorithm 1210, for example, via operation with statistical optimizer 1216.

Each of algorithm(s) 1210 may also be configured to generate at least one final settlement value for an IS weather index with respect to at least one predetermined time period (e.g., a day, a week, a month, a quarter, a season, a year, multiple seasons, etc.). In general, an actual final settlement value may be determined based on actual weather observation data for the predetermined time period. An estimated final settlement value may be determined based on weather forecast data (and in some examples a combination of actual weather observation data and weather forecast data) for the predetermined time period. In general, algorithm(s) 1210 may determine sets of actual and/or future (estimated) IS weather index values, based on one or more of weather forecast information from one or more weather forecast models (e.g., collected by collector 1212), past (e.g., historical) set(s) of IS weather index value(s) based on past observations and/or blended values based on a combination of observations for hours already past, and forecasts for hours yet to come. In some examples, one or more predicted sets of IS weather index value(s) may be provided to time series server 1204 as part of the IS weather index information.

In a non-limiting example, a final settlement value may be derived for a GWDD-based instrument (e.g., a GW DD algorithm 1210 that is specific to a natural gas degree day) by using observed temperatures (e.g., from an independent trusted source such as NOAA) such as from a previous day (e.g., yesterday) to determine the final settlement level for yesterday. Such a final settlement process could also be performed at different time intervals, such as weekly, monthly, seasonal or even annually using "accumulated GWDD's" over a pre-defined time period of time. In some examples, time series server 1204 may apply payout algorithm(s) to IS weather index (such as a GWDD value defining a NG weather index) using the final settlement value. In some examples, each GWDD value (or points associated with the value) over or under the final settlement may be assigned a price element worth X amount of dollars. As another example, GWDD values (or points) may be worth more as they reach more extreme levels, and the price element(s) may not be fixed. In some example, GWDD values (or points) over a final settlement value may be assigned price elements that include varying number of dollar amounts depending upon predefined baskets or ranges of GWDD's and/or exponentially weighting GWDD values (or points), so that as GWDD values become more extreme, the dollar payout that may be assigned increases.

Statistical optimizer 1216 may be configured to identify one or more parameters and generate value(s) for the parameter(s) for specific instruments (for algorithm(s) 1210) based on one or more well-known statistical optimization algorithms. In some examples, statistical optimizer 1216 may also identify one or more weights and generate value(s) for the weights (for algorithm(s) 1210). In some examples, statistical optimizer 1216 may also update parameter(s) and/or weight(s) stored in database(s) 1214 (e.g., periodically, based on one or more predetermined conditions and/or events, etc.). In some examples, statistical optimizer 1216 may include one or more regression models to optimize parameter(s) and/or weight(s) for algorithm(s) 1210. In some examples, instead of using a discrete (fixed) value to define a degree day (for example, a65 degree day baseline value), statistical optimizer 1216 may be configured to apply an advanced statistical process to create a "statistical best fit line". The statistical best fit line may be used to better define a degree day, so that more extreme degree days, such as those being farther away from the inflection point (e.g., the point at which a location switches from heating to cooling demand) is worth more and IS DDs closer to the inflection point are worth less. In some example, the statical optimization may use a polynomial equation and/or an exponential weighting.

Components of weather index system 1200 of the present disclosure may be embodied on a single computing device. In other examples, components of weather index system 1200 may be embodied on two or more computing devices distributed over several physical locations, connected by one or more wired and/or wireless links. It should be understood that weather integration system 1200 of the present disclosure refers to a computing system having sufficient processing and memory capabilities to perform the specialized functions described herein.

Next, natural gas-specific degree day algorithms (i.e., GWDD/GWDDP) for generating natural gas-specific weather index values associated with one or more locations (i.e., non-limiting examples of algorithm(s) 1210) are described below.

As it relates to creating an "instrument specific weather index" for the US natural gas market, the present disclosure may leverage an existing Degree Day (DD) construct. The DD construct states if a temperature is 'over' 65 degrees (Fahrenheit), the energy market typically turns on cooling devices, which is known as a Cooling Degree Day (CDD). If the daily average temperature is 'under' 65 degrees (Fahrenheit), the market typically turns on a heating device, known as a Heating Degree Day (HDD).

The present disclosure has developed a novel and sophisticated weather-based index for natural gas (NG), based on the DD concept, referred to herein as the "NG Weather Index". In some examples, the NG Weather Index of the present disclosure may host a daily settlement value, at the end of at least one predefined time frame (for, example, daily, weekly, monthly, seasonal, annual, etc.), using observed temperatures which may be fed into at least one predefined NG weather index formulae to provide a final settlement value. The final settlement value may include a daily GWDD value or an accumulated GWDD value that is accumulated over at least one predefined period of time (e.g., daily, weekly, monthly, seasonally, annually, etc.). In some examples, tied to any GWDD final settlement value may be weekly, monthly or seasonal futures and options which can, for example, be settled to an NG Weather Index or to assist with the daily mark-to-market process. In some examples, the "NG Weather Index" may employ a Gas Weighted Degree Day (GWDD) algorithm specifically tailored for specific natural gas contracts which are either physically or financially settled. A GWDD may have substantially less "correlation risk" over existing conventional "weather contracts" which only employ a HDD or CDD methodology.

Differences between conventional HDD/CDD algorithms and GWDD algorithms of the present disclosure are significant, as the conventional HDD/CDD methodology provides a very general measurement for a very specific use-case. Users of conventional HDD/CDD weather contracts take on the 'correlation risk' in a weather hedge. The "NG Weather Index" of the present disclosure, based upon a 'tailored' GWDD algorithm per any specific traded NG contract, may result in a better instrument for the marketplace and may resolve existing problems linked to conventional DD instruments. For example, GWDD-based algorithms of the present disclosure cures the "geography mismatch" of using only listed city contracts (as used by conventional HDD/CDD techniques). In some examples, the GWDD may be a single contract which may have higher "correlation" to the underlying NG price, than any single city (or multiple combinations of) listed cities.

Another difference between conventional techniques and GWDD algorithms of the present disclosure is that the GWDD algorithms may also provide a secondary accuracy enhancement related to the "inflection point." The present disclosure quantifies the precise "inflection point" between heating and cooling demand for different cities and different parts of the county, as opposed to the very general (and often misleading) 65 degrees Fahrenheit used in conventional DD contracts.

Another difference between conventional techniques and GWDD algorithms of the present disclosure is that the GWDD algorithms may provide a further accuracy enhancement, referred to herein as a "straddle value". This concept works where temperatures reside on either side of the derived "inflection point" and have very little impact on natural gas demand. Outside of this range of "low gas demand" range, both on the warmer side and colder side, a more precise "best fit line" can be derived to better related weather and NG demand. This low gas demand range around the inflection point is called the "straddle value".

A yet further difference between conventional techniques and GWDD algorithms of the present disclosure is that the GWDD algorithms may also provide a yet further accuracy enhancement which may account for unrealistic gas demand inherent in DD instruments, which do not account for transportation constraints. For example, if the northeast US experienced very cold weather, where NG demand could be estimated at 7 billion cubic feet (bcf), but transportation into the area is only 2 bcf, then 2 bcf is all that can be consumed (not 7bcf).

Using these GWDD concepts expressed above, the present disclosure is configured to further tailor the "NG Weather Index" for specific traded natural gas instruments. For example, Henry Hub may have a GWDD algorithm with specific coefficients related to the concepts addressed above, while Dominion South (another natural gas contract in a different geographic location) may have yet another GWDD algorithm with different coefficients, in the "NG Weather Index" of the present disclosure.

Next an overview of weather indices is described.

Weather Index Overview

There is an extremely large population of globally traded commodities and a surprising number of equities (as well as bonds), whose price is directly influenced by weather events. These weather events are typically realized when the weather event actually occurs (called observations) and market prices tend to react either just prior, or at the time a large weather event being observed, by monitoring the most influential government entity weather forecasts and observations. In some examples, an observed or forecasted weather data feed may be used to track or estimate the price or future price an instrument (e.g., such as the total amount of observed sunshine, over a large solar panel array, which was bond financed could help investors understand the solar assets cash flows, by learning how many megawatts that solar array produced yesterday, today or tomorrow; when combined with the electricity prices for the market in which that solar array participates). Other example use cases may include more robust weather feeds containing a low-latency delivery of key government operated weather forecasts which can be used to more effectively trade commodities, like natural gas, whose future price is driven by future weather expectations (aka weather alpha). For example, if it is currently a winter season and a key weather forecast becomes much colder than previously anticipated, natural gas prices will likely move up, within seconds, upon this weather forecast news.

The following explains the next generation weather instrument of the present disclosure, which is different than anything that currently exists (and dramatically different from what is conventionally offered). Weather indices of the present disclosure may leverage improved algorithms as well as cater to the needs of various users (e.g. hedgers and liquidity providers). For example, the weather index may be directly correlated with the underlying price volatility, which is directly influenced by changing weather perspectives of these key government entity weather forecasts. For example, a weather index geared for natural gas, may be tailored to a 'specific' NG contract, like Henry Hub, Dominion South or Waha and may be directly correlated to that specific underlying instrument. Therefore if the changing weather perspectives are bullish, the underlying traded instrument may also be bullish. Unlike conventional weather contracts that are simply available for specific cities/locations, which are loosely tied to a general NG contract or possibly any other traded instruments these conventual weather contracts have a hard time picking up market liquidity and often remain thinly traded, because they are not tailored to any instrument. This situation causes yet another problem called liquidity, because if a user (e.g., a hedger) wanted to get out of the conventual weather instrument, used to perform the weather hedge, there may be few (if any) liquidity providers available to provide a reasonable price on that conventual weather instrument. In other words, while natural gas price volatility is highly correlated to these changing weather perspectives from key government entity weather models, the existing weather marketplace has no effective weather instrument to mitigate this weather risk in real-time since the solutions does not cater to liquidity providers or hedgers.

Over approximately the last 10 years, the NG industry has adopted a GWDD (Gas Weighted Degree Day) as a representative value, which determines how much 'NG demand' is related to weather. (GWDD is also a precursor and element to determining the Energy Information Administration (ETA) weekly storage number.) These conventional GWDD values are already widely accepted in the marketplace and widely used, providing forecasts out multiple weeks (months and season) into the future, to help gauge the NG storage level at the conclusions of both the NG withdrawal and injection seasons. It may be appreciated that the weather element is the greatest unknown in forecasting future market prices, as NG demand can greatly vary week to week, month to month. To trade NG, trading entities have very robust supply-side models to forecast future NG 'supply', as those items tend to evolve slower and have greater data transparency for modeling purposes. Nevertheless, since the weather (aka a primary driver of NG demand as well as some impact on NG supply as green energy grows) cannot be adequately modeled, conventional trading entities simply monitor changing weather/GWDD perspectives in real-time so the market doesn't slip into a different direction. This is how conventional entities mitigate weather risk. In summary, these changing GWDD perspectives essentially mirror NG's future price, in real-time, because (1) traders follow these changing (forward looking) GWDD perspectives in real-time from various sources and (2) significant NG supply changes tend to occur more slowly and less frequently, over time.

In other words, if 85% of the NG price volatility is driven by changing weather perspectives (aka GWDD), then end-users (e.g., hedgers), for the first time, can truly remove the embedded 'weather risk' with great accuracy in a GWDD-based natural gas contract. This new IS concept is opposed to the conventional approach which ties all NG price risk to a loose correlation driven by an individual city temperature along with cash-flow mis-matches and a host of other problems.

Conventional Degree Day ("DD") contracts have several problems, including problems with the performance of the Heating Degree Day (HDD) and Cooling Degree Day (CDD) instruments. One problem includes a math mismatch with respect to geography. Not any one listed city (or groups of cities listed) is highly correlated with the underlying price of natural gas, with a specific delivery location. Just in the United States alone there are close to 100 different geographic locations where NG has traded instruments. These listed city locations are loosely correlated at best. In other words the user "owns" (or is 'still exposed' to) that NG price risk associated with their selected weather city/cities of choice. For example a user may select Chicago to hedge a Chicago City Gate NG price from going up in price (buy weather/sell NG). However, Chicago's temperatures remained unseasonably warm, until an artic chill slipped into the Northeast due to a high pressure ridge over Chicago, which then pulls large amounts of NG from the Chicago area. This situation may cause the price of Chicago City Gate to increase (lose money) while simultaneously the warmer temperatures in Chicago would have resulted in the weather contract also losing money.

Another problem includes a math mismatch with respect to demand. Most of the industry still uses a 65 degree Fahrenheit level. The 65 degree point (a.k.a. inflection point) was intended to define specific temperature at which people turn on their heaters (below 65 degrees is HDD) or turn on their cooling devices (above 65 degrees is CDD) across the entire United States. This mathematical Degree Day (DD) model was developed by NOAA in 1955 and may have been more accurate, at that point in time. Over the years residential and commercial structures have been built in a more energy efficient manner. Moreover, people in different parts of the country have different energy consumption behaviors today, for the same temperature levels, creating different NG demand curves. In addition, NG and electricity demand is now resolved with more sophisticated equations which are applied to an increasing amount of raw data (becoming accessible from more sensors/sources) which can provide more accurate energy demand forecasts, at a more granular level.

Another problem includes a time mismatch with respect to cash flows. The financial settlement of an energy contract, say July Natural Gas for example compared to and a July weather contract, have mismatched cash flows. If today is June 1$^{st}$ and currently trading the prompt month, which is the July NG contract, and a user wishes to hedge that July NG position, with a July weather contract, the July NG contract will financially settle on the last few days of June. Then the user must wait for all 31 days in July, until the all the daily observed temperatures have been recorded (for a specific location), then sometime in early August, July's weather data will be cleansed by NOAA then officially converted into a total accumulated Degree Day for the weather contract's financial settlement, which is roughly 40 days after the July NG financial settlement occurred. This may still be a preliminary settlement value, which may be 'trued up' in an additional 90 days when NOAA provides a more detailed analysis of the Observed weather (and any financial difference from the initial settlement may still need to be trued up at that point). In a related but separate workflow, assume a trader was long the price of July natural gas in June (being bullish on hot weather not yet recognized into the July NG price) but the price of his July NG contract sank, so he lost money during the month of June when the NG contract was financially settled. Then hoping the short weather position would kick in to cover a financial loss on the July NG contract (since the hot weather never seemed to materialize). Then carrying the weather position through the month of July (intended to be a financial hedge for the July NG contract) the observed weather did in fact turn hot, as the trader had expected, so come August when the weather instrument is financially settled, losses may occur on both legs of the hedge.

Another problem includes liquidity issues. A balanced blend of liquidity providers (e.g., hedgers and liquidity providers (sometimes called speculators) may be desired for a traded instrument. Due to the cash flow mismatch described above, the conventional weather contract may be intended for liquidity providers who operate in the physical world; either consuming natural gas, or producing natural gas. The existing weather contracts are not geared for liquidity providers who can easily trade in and out of such a weather instrument, or alternatively hedge a weather exposure with some highly correlated and liquid underlying instrument or basket of instruments. Attracting a relatively small group of liquidity providers there is little to no liquidity in the existing DD contract. So if a user is in a location specific HDD/CDD type of DD position, there is no liquidity to get out at a reasonable price, essentially marrying the user to this position through settle. So nevertheless a limited population of users and meteorologists typically operated in this space and most held their weather contracts to settlement.

Another problem includes a changing environment giving the larger trading entities with more resources an unfair weather advantage. In the late 1990's and early 2000's there were a number of very well developed meteorological teams who sat on various energy trading floors who all helped grow this initial weather derivative space. While they provided some liquidity to these conventional DD instruments, these very knowledgeable meteorologists played this market more like a chess game (leveraging their advanced weather data infrastructure & meteorological knowledge over the average utility hedger), as opposed to true liquidity providers. This also further reduced the liquidity in the DD space as the bid/offers were very wide and the meteorologists possessed a superior weather data advantage. Since then, many of these meteorologists went into the weather insurance business to model weather risk while some stayed on the trading floor to service the evolving needs of power and gas traders (which these trading floor meteorologists contribution changed over the years, initially focusing upon their ability to produce (and trade around) a more accurate personal forecast, to (now) helping the entire trading floor better understand the market moving government weather forecast more quickly. So very few are active in the existing DD contracts.

Today, large well-funded participants in the energy trading space typically subscribe to one or more of the same three tier-one weather vendors, so the industry tends to either 'win' as a whole, or 'lose' as a whole. These three tier-one weather vendors provide streaming weather services from key government entity weather models and tend to have very similar proprietary weather forecasts. Meaning their proprietary weather forecasts also tend to stay in a pack and not dramatically deviate from each other.

In addition to these tier-one weather vendor subscriptions, the well-funded energy participants also tend to possess on staff meteorologists and/or weather savvy traders. The energy trading industry has found considerable value for an in-house meteorologist to monitor the streaming government weather forecasts (in real-time) then quickly determine if, or when, the incoming weather forecast 'perspective' is likely to experience a 'significant market price shift', knowing the third party weather vendors proprietary weather forecasts will likely follow that new 'weather perspective' of the government models, which in turn will drive energy market prices. This single function alone is a tremendous benefit, with little risk and high reward as opposed to betting on a single propriety weather forecast, which may be right or wrong and possibly contrary to the herd of energy participants who are following the weather vendor consensus. There is very little risk the in-house meteorologist is going to get a speedy interpretation in an incoming weather forecast wrong, since he is seeing the same government weather forecasts as everyone else, and allows ample time to begin communicating and formulating a trading position with a team, while the weather vendors begin to generate, then deliver their own proprietary forecasts to the market place. In other words, tier-one trading entities (with meteorologists) have a weather information advantage over the tier-two trading entities, who do not have meteorologists and only subscribe to these three primary weather vendors then must wait for the release of their proprietary forecasts before making a trade. However, those tier-two trading entities have an advantage over tier-three trading entities (like regulated utilities/corporate hedgers/retail traders/etc.) who have little (or no) weather budget and use only free or low cost retail weather services. Nevertheless, millions of dollars will be made (or lost) during these significant shifts in the 'perceived weather'. For example during the winter months, it is typical to see a significant weather impact on natural gas prices approximately 2× per week. On risk reward basis, having this in-house meteorologist-based weather capability is justified and makes good financial sense. However, as a whole, the industry still wins or loses together and the leaders only have a slight time advantage. The IS weather index of the present disclosure may help to level the playing field, for all market participants, who desire to simply mitigate the weather risk embedded in any traded underlying instrument without investing considerable financial resources into a propriety weather infrastructure.

Weather data and weather map capabilities of the present disclosure may level this playing field between all tiers. In some examples, the present disclosure may possess the fast delivery of weather forecast data (from key government models) combined with the workflow native to a trading desktop functionality, and may level this playing field for all those subscribers of the trading desktop and/or data feeds.

In addition to constantly changing weather perspectives, there is also a need to distill these weather perspectives into something more meaningful to specific traded instruments. The energy and agriculture marketplace is in need of an accurate and standardized degree day algorithm which uses more granular calculations and a broader range of data sources tailored to specific traded commodities. Such an algorithm would represent the weather impact to that commodities price. For example, this algorithm can be easily applied to electricity, natural gas, propane, corn, wheat, etc. In the case of a Gas Weighted Degree Day (GWDD), it employs weather from many locations, which have been identified as the optimal locations to precisely determine how much natural gas will be consumed, due to changing weather perspectives. There is currently a need for an accurate and standardized 'state-of-the-art' GWDD algorithm. All the weather vendors in the energy space today convert city weather forecasts into a GWDD, but the sophistication of conventional GWDD algorithms differ dramatically. Some vendors use a simple 65 degrees as the inflection point, between heating and cooling, which can produce directionally wrong results at times (same problem similar to a conventional weather contract). Other weather vendors have deployed a more sophisticated conventional GWDD algorithm but operate it as a black box (also having issues with traders who cannot view specific city weightings to understand where the growing or weakening gas demand is taking pace). Every day of the week and multiple times per day, traders monitor GWDD values from different vendors in near real-time; for example the same temperature forecast for tomorrow of 42 degrees may yield a result from vendor A @23 GWDD, vendor B @18 GWDD, vendor C @32 GWDD, users do not know whose GWDD is more accurate or understand if the weather forecast is more bullish/bearish. So the relative 'GWDD change' from one vendor's update to the next (for each weather vendor) is a more important measurement than the absolute GWDD level. However, if the industry had an improved 'state-of-the-art' GWDD algorithm, in which the algorithm itself was transparent and allowed all the weather vendors to use and discuss this GWDD algorithm, the marketplace could more properly view various weather perceptions on an equal footing. This adoption process will also help further promote a standardized GWDD weather index value (for which users can more easily compare their own 'in-house' GWDD value (using various weather inputs) to a standardized market-based GWDD algorithm from which all government weather models and third party weather vendor's proprietary forecasts can be incorporated).

The NG Weather Index (using the novel GWDD algorithm of the present disclosure may allow users to remove the embedded price volatility reflected in the current price of natural gas, related to weather. This relationship of GWDD vs NG market price, is largely visible today and easily quantified (often referred to as 'weather alpha'). The NG Weather Index of the present disclosure may resolve existing problems linked to the conventional DD instruments.

For example, the GWDD-based algorithms of the present disclosure cures the 'geography mismatch' of using only listed cities. The advanced GWDD of the present disclosure will have higher correlation to NG price then any single city (or multiple listed cities). In addition, the advanced GWDD algorithms of the present disclosure may also provide an accuracy enhancement related to the "inflection point". The present disclosure quantifies a precise 'inflection point' between heating and cooling demand for different cities and different parts of the county, as opposed to the very general (and often misleading) 65 degrees used in conventional contracts.

In addition, the GWDD algorithms of the present disclosure provides another accuracy enhancement which referred to herein as a "straddle value" in which temperatures on either side of the derived inflection point have very little impact on natural gas demand. Outside of this range, both on the warmer and colder side a more precise 'best fit line' can be derived to related weather and NG demand. This range around the inflection point is called the "straddle value". The GWDD algorithms of the present disclosure provides yet another accuracy enhancement which accounts for unrealistic gas demand, providing a more accurate measure to future NG consumption and ultimately NG storage. For example, if the northeast experienced very cold weather where NG demand could be estimated at 7bcf but transportation into the area is only 2 bcf, then 2 bcf is all that can be consumed (not 7bcf).

The GWDD algorithms of the present disclosure may also resolve problems with cash flow matching. Matching the financial settlement of a weather index instrument, with a corresponding NG underlying instrument may resolve the cash flow mismatch, as both instruments are linked to the 'perception' of the weather at any specific moment in time. In addition, when correlating historical natural gas prices with historical weather forecasts, the changing perceptions from key weather forecasts may drive market price volatility of NG and the NG Wx Index of the present disclosure may be designed around this relationship. Yet further, the GWDD algorithms of the present disclosure may provide a better implementation of existing workflows. Conventional GWDD values are already a market accepted concept and the market would benefit from the 'single' transparent GWDD algorithm of the present disclosure and a supporting weather index of the present disclosure to assist in the GWDD market transparency.

With the enhancements described above applied to a new financial weather instrument, linked directly to Natural Gas it would be likely to promote trading activity from a wide array of market participants.

The IS weather index (including IS DD algorithms such as GWDD algorithms) of the present invention may be useful for a wide variety of end users, including, for example, weather traders, gas analysts/gas traders, liquidity providers, high frequency traders (HFTs), basis market users, related markets, equity market users, and energy-based exchange traded funds (ETFs) users.

One end-user of IS weather indices of the present disclosure may include weather traders. Assume a weather savvy NG trader or meteorologist wants to place a pure weather, or weather related NG demand trade. A GWDD contract of the present disclosure may be an improved option as it does not assume outside NG supply or NG transmission risks related to an underlying NG contract. Even though these outside supply and transmission risks occur less frequently, they may influence price.

Another end-user of IS weather indices of the present disclosure may include gas analysts/gas traders. The mirror image to the concept above, if a NG trader is speculating on some supply side change which is currently mispriced, or expected to become more widely known (e.g., international or regional imports/exports, 'gas-wellhead' level supply changes, NG processing plant outages, etc.), the frequent and powerful "weather wild card" is now removed from the equation. The weather index of the present disclosure may allow the highly sophisticated fundamental-based energy trading entities to more precisely and efficiently leverage their supply side analytics (as well as NG vendor analytics most prevalent in the marketplace). Buying NG then selling GWDD may allow those natural gas analysts the ability to compete in the supply and transmission space they understand with greater certainty. Unlike conventional HDD/CDD instruments, the weather index of the present disclosure may be tailored for specific underlying NG instruments (including all basis markets). As another example, a weather index basis of the present disclosure may trade alongside these NG basis markets which can open up new opportunities for hedging and/or arbitrage.

Another end-user of IS weather indices of the present disclosure may include long-term hedgers. For simplicity, a hedger may be defined as a user with a longer holding time than a liquidity provider as well as having the intent to lay off price risk related to that longer-term position. The concept is similar to a liquidity provider role who mitigates weather risk while pursuing market making activities as an example, where the hedger does not want to be on the wrong side of a trade when the market price of the underlying instrument gaps up, upon the release of some weather news. A focus of the hedger tends to be centered around more strategic and portfolio risk management options to a trading entity. The user may have the ability to remove unknown weather related (demand) risk embedded in a commodity like NG and/or power. This type of risk management would "safely" and "cost effectively" separate the user from other users, as compared to the previously described scenario where the industry either 'wins' as a whole or 'loses' as a whole and a result of the lesser known 'demand side' fundamentals. As previously described, this pack or herd direction is essentially being led by those trade entities who have the capital to create a proprietary weather infrastructure to respond quickly to these changing weather perspectives as they stream throughout the day. The entities who tend to profit the most from this moving herd have large weather budgets and employ meteorologists. Their earnings are typically made in minutes by reacting to the weather event faster than the rest of the participants in the industry. With the IS weather index of the present disclosure (and trading desktop of the present disclosure), entities without meteorologists may be provided with a more cost effective manner to be generally immune to such market price volatility by using an IS financial weather instrument to remove this weather risk, and more effectively compete on supply side analytics, not having to worry about forecasting the future weather (aka future gas demand) correctly—or being faster to the forecast than other trading entities (and all the cost savings associated with it).

Another end-user of IS weather indices of the present disclosure may include HFTs. This group of users thrive when markets are stable and less volatile. When the volatility of commodity prices increases causing markets to gap (e.g., up and down), it becomes too risky for HFT entities, unless there is an adequate hedge to mitigate the driving force behind that gap in market prices. In the case of power and gas instruments, weather is the primary driver of extreme (and frequent) price volatility, this group of HFT traders may find value having a weather index hedge in the event the NG market gaps up or down based upon these frequent changes in future weather news.

Another end-user of IS weather indices of the present disclosure may include basis market users. In energy, the weather differential between two geographic (basis) markets has a normal (or expected) weather spread. If the demand side differential gets too extreme or inverts there is often a blow-out in basis price. These GWDD weather differentials are desirably highly correlated with basis price.

Another end-user of IS weather indices of the present disclosure may include users of related markets (e.g., hedgers, liquidity providers). Weather tends to either drive demand (e.g. NG), or supply (e.g. Ag) or both (e.g. electricity supply is driven by wind, solar, hydroelectric and weather also drives electricity demand). Today the primary driver of price volatility in these instruments is due to gaining a better understanding of the weather, since other fundamental datasets are much better understood and properly modeled.

Another end-user of IS weather indices of the present disclosure may include equity market users and/or users of energy-based ETFs. The IS weather index of the present disclosure may operate in a similar manner with users (e.g., retail traders such as retirees, dentists, lawyers, etc.) who may desire to hedge the NG price risk and/or may be involved in one or more NG based ETFs (for example). In some examples, a 'supply side only' NG ETF may be configured, according to the present disclosure, which may remove the weather demand risk so that users can go long or short the changing demand for natural gas, and not be worried about the seasonal weather element (e.g., possibly increased NG usage for transportation fuel like compressed NG (CNG), increased number of NG power plants, exports to other counties, etc.). In some examples, an NG ETF may be used to speculate whether long-term NG demand will continue to grow (e.g., CNG-based transportation) and speculate on the US's growing use of natural gas demand, not only the short-term weather driven demand. In some examples, NG equities of the present disclosure may be configured, so that a user may trade a 'basket of NG equities' whose price moves along with the price of natural gas and hedge these equity positions with the weather index of the present disclosure (e.g., making an equity trade as to how efficient that company is at locating, extracting and transporting NG).

A weather (Wx) instrument of the present disclosure to be launched may be tailored to a 'specific' underlying instrument. The actual underlying instrument (which the Wx Index may target) may be listed on an electronic exchange or may be provided off-exchange. For example, an exchange may list the most liquid agriculture instruments, like corn, wheat, soy. Those liquid agriculture based instruments may be example instrument candidates for the Wx index, allowing users (e.g., hedgers) to remove the weather risk of that specific commodity. The corresponding weather instrument may be traded on an electronic exchange.

With respect to the Natural Gas market, there are advantages of converting weather into a higher-value analytic, which is geared to natural gas demand, which is driven almost exclusively by weather. For each forward looking day of the weather forecast, a corresponding GWDD of the present disclosure may be calculated for that day. The natural gas market is typically divided into two seasons, a withdrawal season and injection season. A GWDD Index value of the present disclosure may start with "0" at the beginning of each NG season. At the end of each day the index may take the "observed temperatures" and run those values through the GWDD algorithm of the present disclosure, to create and publish an "Observed GWDD index value" using official NOAA weather observations. In some examples, systems of the present disclosure may list weekly, monthly and seasonal futures and options written around the spot (also referred to as current or present) GWDD accumulated values (derived using weather observations). In some examples, the "Observed GWDD index value" may not reset at each NG season but rather may be represented as a departure from normal GWDD aka "GWDD Normal Departure Index". This 'departure methodology' may allow a GWDD index value to run continuously, season to season as well as better understand global warming/cooling over time. In some examples, updates to the GWDD algorithm of the present disclosure may be made at periodic intervals to adjust for gas demand growth and/or a climatological baseline.

In some examples, a price per tick of a GWDD Wx index instrument of the present disclosure may be determined so that it may best (e.g., optimally) match a price per tick on existing NG contracts such as Henry Hub or other physical and/or financial instruments which trade either on exchange, or off exchange (also known as over-the-counter (OTC) markets). In some examples, a futures contract of the present disclosure may have an asymmetrical payout (for example, because not every GWDD is equal to the same price impact on Natural Gas). For example, if this was the coldest winter on record, 1 GWDD will have a large impact on natural gas price as opposed to if the GWDD was an average or warmer than average winter. In some examples, some type of a bucketing approach may be sufficient or possibly an exponential weighting may be sufficient.

Weather's influence may impact a large number of transacted (traded) instruments across various exchanges on a global basis. In some examples, a 'weather index' of the present disclosure may be created provided that it is possible to fundamentally quantify weather's influence on that underlying instrument, then develop an IS value-add algorithm, which may produce a spot index based upon that weather's sensitivity to the underlying. For example, quantifying weather's influence related to corn production, NG consumption or retail clothing sales, etc.

Figure 13:
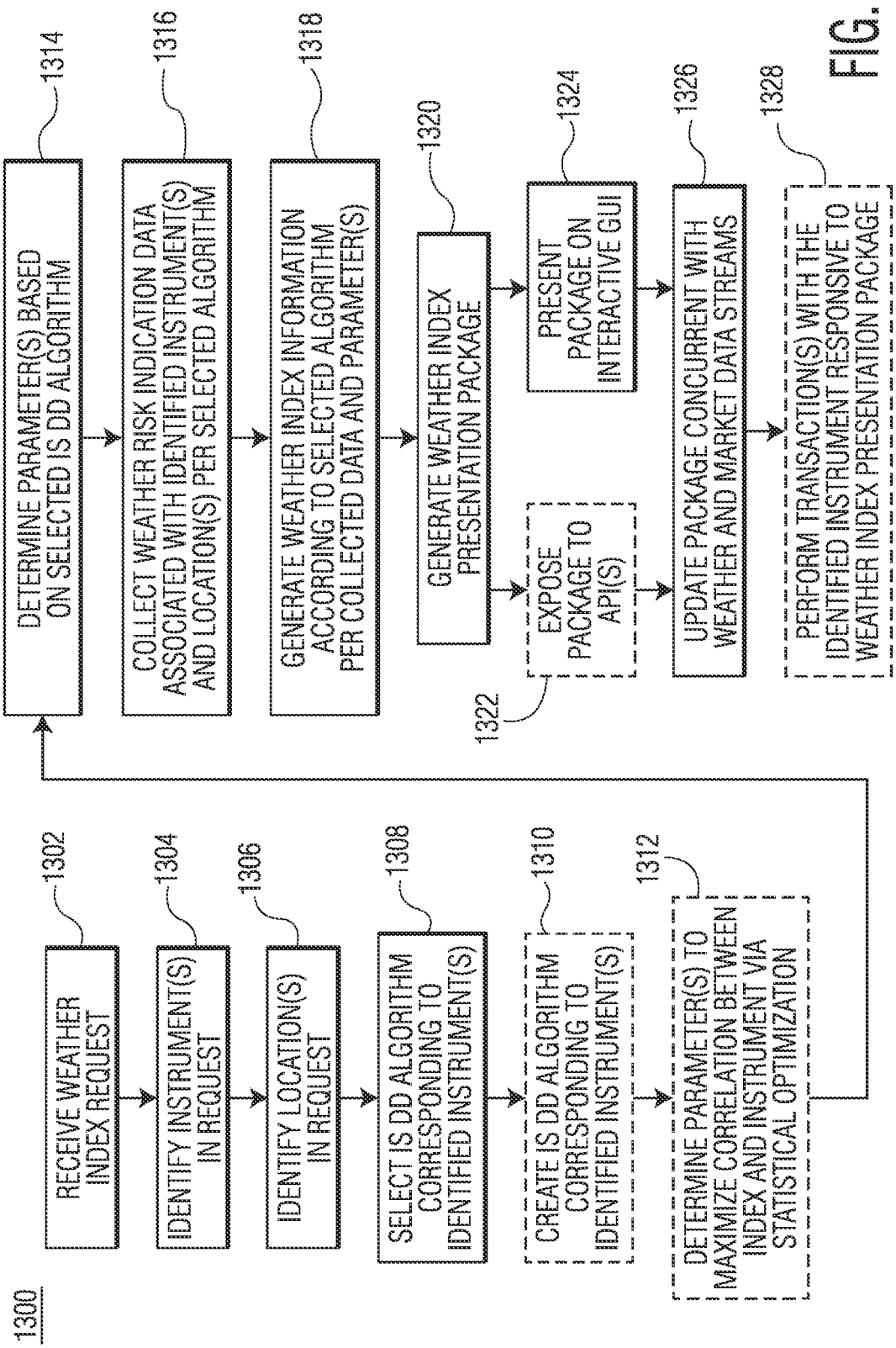
FIG. 13 is a flow chart diagram of an example method system for converting live weather data to at least one instrument-specific weather index for offsetting weather risk, according to an aspect of the present disclosure.

Those skilled in the art will appreciate that weather index system 1200 (of FIG. 12) may be configured with more or less components to conduct the methods described herein with reference to FIG. 13. The methods described herein (that may be conducted by weather index system 1200, including, in some examples, as part of DID system 102 of the present disclosure) may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components associated with components 1202-1208 of weather index system 1200 of FIG. 12. With respect to FIG. 13, although this flowchart may illustrate a specific order of method steps, it is understood that the illustrated method is exemplary, and that the order of these steps may differ. Also, in some examples, two or more steps may be performed concurrently or with partial concurrence.

FIG. 13 is a flow chart diagram of example method 1300 for converting live weather data to at least one instrument-specific weather index for offsetting weather risk, according to an aspect of the present disclosure. At step 1302, generator 1208 may receive at least one weather index request 1224 (e.g., directly from time series server 1204, from user device(s) 108 via time series server 1204, etc.). At step 1204, generator 1208 may identify one or more instruments indicated in the weather index request (step 1302). At step 1306, generator 1208 may identify one or more locations indicated in the weather index request (step 1302).

At step 1308, generator 1208 may select at least one IS DD algorithm (e.g., IS(1) DD algorithm(s) 1210-1) among algorithm(s) 1210, based on the identified instrument(s) in the weather index request (step 1304). In some examples, the weather index request may include an additional algorithm indication, which may indicate additional features to be considered by the algorithm and or a specific algorithm type (e.g., standard, advanced) requested. In some examples, the algorithm indication may be used to select from among multiple IS DD algorithms for a specific instrument that may exist (e.g., between a first algorithm for IS(1) and a second algorithm for IS(1)).

At optional step 1310, generator 1208 may determine that there are no algorithm(s) 1210 that correspond to the identified instrument(s), and generator 1208 may create a new IS DD algorithm corresponding to the identified instrument(s) (e.g., via interaction with statistical optimizer 1216). At optional step 1312, statistical optimizer 1216 may identify one or more parameters and/or determine one or more parameter values, for the selected IS DD algorithm (step 1308), to maximize a correlation between the IS weather index and the instrument via a statistical optimization. In some examples, optional step 1312 may be performed as part of selecting the IS DD algorithm (step 1308). In some examples, optional step 1312 may be performed periodically (e.g. independent of step 1308) and/or in response to a predetermined condition and/or event.

At step 1314, generator 1208 may determine one or more parameters (and in some examples additionally one or more weights) based on the selected IS DD algorithm, for example, via database(s) 1214. At step 1316, collector 1212 may collect weather risk indication data (e.g., via weather data stream(s) 1220 as segmented by weather integration server 1202) associated with the identified instrument(s) (step 1304) and identified location(s) (step 1306) based on the selected IS DD algorithm (step 1308). In some examples, the collected weather risk indication data may be stored in database(s) 1214. At step 1318, generator 1208 may generate weather index information (e.g., a set of weather index values, weather forecast model data, etc.) according to the selected IS DD algorithm based on the collected weather risk indication data (step 1316) and the parameter(s) (and additionally any weight(s) in some examples) (step 1314). The weather index information may be provided by generator 1208 to time series server 1204.

At step 1320, time series server 1204 may generate at least one weather index presentation package 1226 (e.g., estimated/actual index settlement value(s), real-time updated set(s) of IS weather index value(s), climatological value(s), bias correction tool(s), performance weighting tool(s), real-time location-specific weather forecast data, real-time weather forecast map(s), historical weather data, etc.) based on the weather index information and market data stream(s) 1222, including according to live weather risk indication data collected from among weather data stream(s) 1220. In some examples, the IS weather index may include an indication of a departure from a normal IS weather index (e.g., an indication of an anomaly, such as an IS Normal Departure Index (e.g., an GWDD normal departure index). In some examples, the IS normal departure index may be provided in addition to the IS weather index or rather than the IS weather index). In some examples, weather index presentation package 1226 may be combined with an integrated presentation package 226 (FIG. 2). At optional step 1322. DID system 102 may expose weather index presentation package 1226 to one or more APIs. At step 1324, the weather index presentation package may be presented on weather impact dashboard 122 of interactive GUI 120. In some examples, step 1324 may not be performed and step 1322 may be performed instead. In some examples, both steps 1322 and 1324 may be performed. In some examples, method 1300 may include providing (e.g., via DID system 102) one or more of algorithms 1210 to one or more external users (e.g., user device(s) 108 shown in FIG. 1) in addition to or instead of weather index presentation package 1226, so that the external user(s) may generate any suitable outputs via algorithm(s) 1210.

At step 1326, the weather index presentation package may be updated (e.g., via one or more APIs, on weather impact dashboard 122, etc.) concurrent with (changes to) the weather data stream(s) 1220, the market data stream(s) 1222 and/or user input (e.g., via user device(s) 108). At optional step 1328, one or more transactions may be performed with the identified instrument responsive to interaction with the weather index presentation package. It is understood that steps 1326 and 1328 may be repeated.

In some examples, weekly, monthly and/or seasonal futures and options may or may not be tied to a daily settled IS weather index, such as (without being limited to) an NG Weather Index. Examples of aspects of the present disclosure include may include a daily NG weather index. For example, at the end of each day a "NG Weather Index" settlement value may be printed and made publicly available from the exchange. This GWDD algorithm powering the final settlement value may use weather representing local time (e.g., 10 am-10 am) for each city location or use the standard weather day from midnight to midnight. The current weather observations may be swept into the transparent GWDD algorithm (e.g., GWDD and/or GWDDP algorithm versions) to determine a daily settle value. These daily GWDD values may grow (on an accumulation basis) over some period of time being a natural gas storage week, or the entire natural gas storage season, then revert to zero when the next week or season begins (shifting from injection season/summer to withdrawal season/winter). In another example, GWDD values may be summed above a 30 year climatological average (or some other climatological average such as trailing 10 years, 15 years, etc.), so if over the 30 year climatological average the amount over the climatology may be added, if a daily GWDD were under the 30 year climatological average that amount may be subtracted. If GWDD were constructed in this manner over many years the market may be able to recognize if there was a consistent warming or cooling trend at play. In some examples, users may be able to use this publicly published "NG Weather Index" value for the specific instruments in which they engage, for daily mark-to-markets and may also be used as the official financial settlement upon expiration of futures and/or options contracts.

In some examples, a futures contract itself may include an asymmetrical payout, since one GWDD is not always equal to a specific dollar amount. For example, if it is currently the coldest winter on record, one incremental GWDD can have a large impact on the price of natural gas versus a one GWDD increase in an average, or below average winter. In some examples, one or more seasonal GWDD ranges may be determined, which would act like buckets, with each bucket having a different 'price/value' per GWDD. In another example, national storage levels may be incorporated into the GWDD algorithm to aid in determining a bucket segment. This means that high GWDD's combined with low US storage levels may have a higher price scenario than high GWDD's with low US storage levels.

Next, current HDD and CDD usage are described.

Current HDD and CDD Usage

Weather data has been used to predict human energy usage for many decades. For example, the colder it gets in the winter the quicker a family can burn through a tank of heating oil. Fuel distribution companies made more profit when they didn't waste money sending out trucks to fill tanks (or coal bins) that were only half-empty or making customers angry by leaving them with empty tanks on cold nights. Companies that could more accurately predict when heating oil tanks needed to be re-filled were at a big advantage and best practices quickly spread.

By the 1940's, standard Heating Degree Day (HDD hereafter) usage became widespread enough that the United States Weather Bureau (NOAA since 1970) started to track and report on the metric. Below is a description and definition of CDD and HDD still used by the NOAA.

Degree day is a quantitative index demonstrated to reflect demand for energy to heat or cool houses and businesses. This index is derived from daily temperature observations at nearly 200 major weather stations in the contiguous United States. A mean daily temperature (average of the daily maximum and minimum temperatures) of 65° F. is the base for both heating and cooling degree day computations. Heating degree days are summations of negative differences between the mean daily temperature and the 65° F. base. Cooling degree days are summations of positive differences from the same base. For example, cooling degree days for a station with daily mean temperatures during a seven-day period of 67, 65, 70, 74, 78, 65 and 68, are 2, 0, 5, 9, 13, 0 and 3, for a total for the week of 32 cooling degree days.

Degree days are based on the assumption that when the outside temperature is 65° F., heating or cooling is not needed to be comfortable. Degree days are the difference between the daily temperature mean, (high temperature plus low temperature divided by two) and 65° F. If the temperature mean is above 65° F., 65 is subtracted from the mean and the result is Cooling Degree Days. If the temperature mean is below 65° F., the mean is subtracted from 65 and the result is Heating Degree Days.

Example 1: The high temperature for a particular day was 90° F. and the low temperature was 66° F. The temperature mean for that day was:

(90° F.+66° F.)/2=78° F.

Because the result is above 65° F.:

78° F.−65° F.=13 Cooling Degree Days.

Example 2: The high temperature for a particular day was 33° F. and the low temperature was 25° F. The temperature mean for that day was:

(33° F.+25° F.)/2=29° F.

Because the result is below 65° F.:

65° F.−29° F.=36 Heating Degree Days.

The calculations shown in the two examples above are performed for each day of the year and the daily degree days are accumulated so that months and seasons may be compared.

Problems exist with conventional HDD and CDD calculations. HDDs and CDDs are correlated with natural gas consumption in most of the US most times of the year. However, the correlation can be increased by making adjustments to the conventional formula. Different regions have different and shifting generation mixes (e.g., coal/nuclear/wind/hydroelectric/solar/natural gas), insulation standards, humidity averages, social norms etc. that can cause the conventional HDD and CDD parameters to be less than ideal.

GWDD Algorithm

The GWDD algorithm of the present disclosure (a non-limiting example of instrument-specific DD (e.g., GWDD) algorithm(s) 1210) may be created by taking the conventional HDD and CDD formulas, defining unstated parameters and using a statistical optimization program (e.g., statistical optimizer 1216) to find the parameters that maximize the correlation between the index for any given region and the amount of the underlying instrument (e.g., natural gas) consumed in that region (location(s)). Although the IS DD algorithm below is described with respect to natural gas (e.g., GWDD algorithm), it is understood that natural gas represents a non-limiting example, and that an instrument-specific DD algorithm may be similar created for any desired instrument according to the concept described in the present disclosure.

GWDD stands for "Gas Weighted Degree Days". It is a value used to closely estimate the demand for natural gas for heating/cooling purposes, based on estimates for population sizes using natural gas for heating and cooling, and the level of discomfort the population is expected to experience based on how far the forecasted temperature is from what most people consider to be comfortable, thus requiring no heating/cooling. The basic unit of GWDD is an estimate of gas consumption for a single local day for a single area. In some examples, the GWDD value may also represent a NG-specific weather index value. In some examples, when the GWDD algorithm uses official weather observations over a daily time period, the GWDD algorithm may produce daily final settlement values which may represent a daily NG weather Index final settlement value. The daily weather index final settlement value can also contribute to an accumulated weekly NG Weather Index value, contribute to an accumulated seasonal NG Weather Index value and the like. If streaming weather forecasts are used in conjunction with the GWDD algorithm, the GWDD algorithms may produce 'future estimates' as to what a daily, weekly or seasonal NG weather index value is estimated (predicted) to be prior to the final settlement date (e.g., thereby helping users understand what a future settlement value may be).

The GWDD of the present disclosure includes seven (7) parameters that may be optimized for natural gas consumption in at least one location (e.g., a city, a region, multi-regions, etc.). The seven parameters that may be optimized for each area include:

1. HDDCrit—or "Heating degree days critical value". The temperature under which people typically start using heating. (Conventionally only 65° F. is used.) For colder regions an optimal HDDcrit tends to be below 65° F.

2. HDDExp—or "Heating degree days exponent". An exponent used to scale the heating temperature difference. Conventional formulas do not include any exponential factors, meaning that every degree day (from 65 degrees Fahrenheit) per unit of temperature is the same. In contrast, the exponential factors (HDDExp and CDDExp) of the present disclosure may create a best-fit line, and indicate in days of extreme heat and/or extreme cold that the increasing degree days consumes more natural gas. In areas with pipeline constraints, it is determined that using a value below 1 represents an improvement. In humid area without gas pipeline constraints it is determined that values above 1 represent an improvement 3. CDDCrit—or "Cooling degree days critical value". The temperature above which people typically start using air conditioning for cooling. (Conventionally only 65° F. is used.) In all regions it is determined that higher CDD critical values may produce a higher correlation with Natural Gas demand. This is especially true in areas with heavy Coal or Hydroelectric dependencies in the generation mix.

4. CDDExp—or "Cooling degree days exponent", An exponent used to scale the cooling temperature difference. (As discussed above, conventional formulas do not include any exponential factors).

The first four additional parameters of the present disclosure may be incorporated within HDD and CDD-based formulas as follows:

If temperature is above $CDD$ Crit: (Temperature° F.$-CDD$Crit)$\hat{}CDD$Exp=$NG$ Cooling Degree Days (1)

If temperature is below $HDD$Crit: ($HDD$Crit−Temperature° F.)$\hat{}HDD$Exp=$NG$ Heating Degree Days. (2)

Preliminary GWDDs of the present disclosure may be created by optimizing the first four (4) parameters noted above (CDDCrit, CDDExp, HDDCrit, HDDExp), and then adding together the modified HDD and CDD data (in equations (1) and (2)). The sum may then be modified using the final three parameters.

People usually do not turn on the heat in the morning and then crank up the AC in the afternoon. If one understands this concept then one may understand the logic behind the final three parameters.

5-6. StraddleLow and StraddleHigh. A pair of temperatures used to define a cancellation factor for when the temperature is hot during the day and cold during the night. If the temperature in a single day ever exceeds both sides of these two temperatures, a cancellation factor may be multiplied by the Preliminary GWDD total. In other words, if there are CDD and HDDs on any given day then the total of the index may be reduced as small values for HDDs tend to cancel out small values of CDDs when they accrue on the same day.

7. Cancellation factor. Within the GWDD framework, there are two primary components of natural gas demand: heating demand (which may be represented by a variation of the HDD) and cooling demand (which may be represented by a variation of the CDD). In a simplified form, GWDD=HDD+CDD. In some examples, an exception to this relationship may exist. If the temperatures are sufficiently above and below 65 degrees (F.) during the same day, there may sometimes be a cooling and heating component for natural gas demand for a given location within 24 hours. There are many empirical tests that show the natural gas demand may not be 100% cumulative during these times. This type of behavior is more common in some regions than others. One or more cancellation factors may be determined for different regions for this types of condition.

In some examples, a "cancellation factor" or "straddle factor" may be applied to reduce the GWDD. In a non-limiting example, a cancellation factor of 70% may be applied. In other words:

$$GWDD = (\text{cancellation factor}) * (HDD + CDD) \quad (3)$$

where the cancellation factor may generally be <1.0 (e.g., 0.7 for a 70% cancellation factor).

An example GWDD algorithm for determining a Gas-specific weather index value for a region including six locations (e.g., cities) is described below with respect to Tables 10-12. In this example, predefined values for each of parameters 1-4 and 7 for the six locations are shown in Table 10. In this example, a single value for the parameters are shown in Table 10, indicating that each city as the same predefined parameter values. In some examples, one or more of the parameter values may differ, depending upon the specific location.

TABLE 10

Example predefined parameter values.

| Parameter | Value |
|---|---|
| CDD Critical Value (CDDCrit) | 75 |
| HDD Critical Value (HDDCrit) | 65 |
| CDD Exponent Factor (CDDExp) | 1.03 |
| HDD Exponent Factor (HDDExp) | 1.015 |
| HDD-CDD Cancellation Factor | 0.7 |

Tables 11 and 12 illustrate an example GWDD calculation for an example region of six cities according to the predefined parameters shown in Table 10. In this example, T represents temperature. In Table 11, minimum temperature (Min T) and maximum temperature (Max T) are determined from among a set of temperature estimates for the respective city (location). In this example, the temperature estimates are determined for four (4) time periods that are each 6 hours, for a total of 24 hours of temperatures. In Table 11, CDD Binary refers to Equation (1) and HDD Binary refers to Equation (2). In other words, for HDD Binary: if Min T<HDD Crit (65 degrees) then 1, else 0. For CDD Binary: if Max T>CDD Crit (75 degrees) then 1, else 0. In Table, 11, the column Straddle Value may be used to determine whether to apply the cancellation factor (from Table 10). In particular, if both HDD Binary and CDD Binary are 1, the HDD-CDD Cancellation Factor (0.7) may be applied. For all other combinations of HDD Binary and CDD Binary no cancellation factor (i.e., a value of 1) may be applied.

TABLE 11

Example GWDD calculation for an example region of six cities.

| City | City Weight | 6 Hour Temp Estimates | | | | Min T | Max T | HDD Binary | CDD Binary | Straddle Value |
|---|---|---|---|---|---|---|---|---|---|---|
| | | T1 | T2 | T3 | T4 | | | | | |
| Houston | 0.3 | 74 | 87 | 94 | 88 | 74 | 94 | 0 | 1 | 1 |
| NYC | 0.25 | 52 | 65 | 78 | 81 | 52 | 81 | 1 | 1 | 0.7 |

TABLE 11-continued

Example GWDD calculation for an example region of six cities.

| City | City Weight | 6 Hour Temp Estimates | | | | Min T | Max T | HDD Binary | CDD Binary | Straddle Value |
| --- | --- | --- | --- | --- | --- | --- | --- | --- | --- | --- |
| | | T1 | T2 | T3 | T4 | | | | | |
| Chicago | 0.25 | 45 | 48 | 70 | 64 | 45 | 70 | 1 | 0 | 1 |
| Denver | 0.05 | 32 | 41 | 76 | 64 | 32 | 76 | 1 | 1 | 0.7 |
| Portland | 0.05 | 65 | 65 | 65 | 67 | 65 | 67 | 0 | 0 | 1 |
| Atlanta | 0.1 | 59 | 63 | 78 | 82 | 59 | 82 | 1 | 1 | 0.7 |

TABLE 12

Example GWDD calculation for an example region of six cities (continued).

| City | Degree Day Subtotals | | | | City Daily Totals | GWDD with CF | Weighted GWDD |
| --- | --- | --- | --- | --- | --- | --- | --- |
| | DD T1 | DD T2 | DD T3 | DD T4 | | | |
| Houston | 0 | 12.929 | 20.755 | 14.040 | 11.931 | 11.931 | 3.579 |
| NYC | 13.510 | 0 | 3.101 | 6.331 | 5.735 | 4.015 | 1.004 |
| Chicago | 20.919 | 17.738 | 0 | 1 | 9.914 | 9.914 | 2.479 |
| Denver | 34.777 | 25.172 | 1 | 1 | 15.487 | 10.841 | 0.542 |
| Portland | 0 | 0 | 0 | 0 | 0 | 0 | 0 |
| Atlanta | 6.163 | 2.021 | 3.101 | 7.421 | 4.676 | 3.273 | 0.327 |

In Table 12, the degree day (DD) subtotals (DD T1, DD T2, DD T3, DD T4) for each 6 hour time period in Table 11, (i.e., for T1, T2, T3 and T4) may be determined from Equations (1) and (2) (based on the parameter values shown in Table 10). For example, DD T1 for Houston is 0 because: T1 is 74, which is greater than HDDCrit (65) and also less than CDDCrit (75), thereby failing to meet the conditions in both equations (1) and (2). As another example, DD T1 for New York City (NYC) is 13.510, because T1 is 52, which is less than HDDCrit (65) thereby meeting equation (2) (and not greater than CDDCrit (75) of equation (1)). Thus, for NYC, DD T1 meets equation (2) of (HDDCrit-T1)^HDDExp for NG heating degree days. In other words, $(65-52)^{1.015}$ equals 13.510 NG heating degree days (for NYC for DD T1). The remaining degree day subtotals for each of the six locations may be similarly determined.

The column City Daily totals represents the average of the degree day subtotals for each location. For example, the City Daily Totals for Houston is the average of DD T1 through DD T4 (i.e., 0, 12.929, 20.755, 14.040). The column GWDD with CF represents the city daily total for each location multiplied by the HDD-CDD Cancellation Factor (CF), as determined by the corresponding straddle value shown in Table 11, in accordance with the value of 0.7 (shown in Table 10). In other words GWDD with CF equals city daily total*straddle value (Table 11). Thus, GWDD with CF for Houston is determined by 11.931*1, whereas GWDD with CF for NYC is determined by 5.735*0.7.

The column Weighted GWDD is determined by multiplying GWDD with CF by the corresponding city weight (shown in Table 11). For example, the Weighted GWDD for Houston is determined by 11.931*0.3, whereas the Weighted GWDD for NYC is determined by 4.015*0.25. The regional GWDD for the total of the six locations is the sum of the weighted GWDDs for the six locations. In this example, the Regional GWDD is 7.931. In this example, the city level GWDD and regional GWDD represents a set of Gas weather index values.

In general, GWDD values may be aggregated into larger locations (e.g., areas, regions, states, an entire continuous country (e.g., the continental United States), etc.). GWDD values can also be aggregated over periods of time longer than a single day. Technically, the GWDD calculation for an area may be based on the temperature forecasts for a single station. However, it may be appreciated that this location may represent an entire area, typically a metro area of a city. Thus the terms "location", "city", and "area" may be used interchangeably.

Using the methodology described herein, it is possible to calculate future GWDD values, based on forecast information, past GWDD values based on observations, or blended GWDD values based on a combination of observations for hours already past, and forecasts for hours yet to come. In general, the source of forecast information can be any forecast model. In some examples, the source of observed weather (e.g., temperature observation data) may include raw weather readings from airports called METAR, cleaned weather readings such as the Integrated Surface Database (ISD) provided by NOAA, re-analysis models such as CFSR or ECMWF Re-Analysis (ERA, such as ERA-5) and/or climatological values.

GWDDP Algorithm

The GWDDP algorithm also referred to as the GWDD Pro algorithm is another non-limiting example of instrument-specific DD (e.g., GWDD) algorithm(s) 1210. The GWDD algorithm of the present disclosure became practical when data handling capabilities and automated statistical techniques made it practical and relatively quick to run thousands of regression models and optimize parameters. The GWDDP algorithm of the present disclosure is becoming more practical as other weather variables become readily available (e.g., wind/solar flux), in addition to temperature data.

In general, the GWDDP (GWDD Pro) algorithm represents another example methodology of the present disclosure where a GWDDP value may be calculated based on 24 hourly temperature forecasts, average wind and average radiation, rather than just a maximum and minimum daily value. In addition, a GWDD day may start and end at the local midnight, while a GWDDP day may start and end at 5 LOAM local time.

The GWDD Pro algorithm is becoming more important to use as the nation's electricity generation mix is shifting. Coal generation was about 50% of US generation in 2000. It has fallen below 29% in 2019. Over the same period, wind and solar have grown from less than 1% to almost 10% of US generation. In some regions, wind and solar already produce about 50% of electricity. Natural gas generation often serves as a buffer between these two components. Still further, in regions that have a heavy reliance on wind generation, conventional HDD and CDD calculations are becoming much less useful.

A weekly highlight of the natural gas market is the EIA storage report. Natural gas trading volumes are typically heaviest when the EIA releases the storage report at 10:30 am ET each Thursday. This report is supposed to reflect storage inventories as of 10 AM on Friday of each week. Therefore, gas fundamentals analyst are particularly interested in degree day accumulations for days leading up to 10 am each day.

In some examples, the GWDD Pro algorithm is similar to the GWDD algorithm of the present disclosure in that the GWDD Pro may also use the same number of locations (e.g., 100). In some examples, the locations nay correspond with cities that depend on natural gas for cooling/heating to some significant extent.

The GWDD Pro algorithm includes several differences from the GWDD algorithm of the present disclosure. One difference is that, in GWDD Pro, days may end at 10 am central time (e.g., 10 hours later than in the GWDD algorithm). Another difference is that the GWDD Pro algorithm may use twenty-four (24) hourly temperature measurements (e.g., an increase in the number of temperature measurements compared to the GWDD algorithm). In this manner, the GWDD Pro calculation is based on hourly temperature measurements, rather than daily maximums and minimums as in the GWDD algorithm, thus better capturing actual demand for cooling/heating compared to just using the daily maximum and minimum.

Another difference between the GWDD and GWDD Pro algorithms includes the determination of the weather index value. In the GWDD algorithm, the weather index value is a function of temperature (i.e., GWDD=f(temperature)). In the GWDD Pro algorithm, the weather index value is a function of a combination of temperature, wind and solar flux (i.e., GWDD Pro=f(temperature)+f(wind)+f(solar flux)). Wind and solar are approaching 15% of US generation in the next 2 years. The weather data correlated with wind and solar generation (10 m average wind speed and solar flux) are having a significant and growing impact on natural gas demand. The GWDD Pro algorithm may use the average wind speed in order to capture effects of wind generated electricity on natural gas demand, and also the cooling effects of wind on the demand for cooling in the summer, or heating in the winter. The GWDD Pro algorithm may also use solar radiation flux data to capture the effect of solar electricity on natural gas demand. The GWDD Pro algorithm may also use radiation flux to estimate the heating effect of solar radiation on buildings exposed to such radiation.

In contrast to the GWDD algorithm, the GWDD Pro algorithm determines the weather index value according to the sum of five (5) components. The five components relate to heating and cooling demand, natural gas displacement from wind generation, natural gas demand due to seasonal wind generation, natural gas displacement from solar generation and natural gas demand due to passive solar generation. The GWDD Pro algorithm also uses the parameters described above for the GWDD algorithm—CDDCrit, HDDCrit, CDDExp, HDDExp, Straddle Value and HDD-CDD Cancellation Factor. The GWDD Pro algorithm also includes additional parameters including wind speed and solar flux. In addition, the GWDD Pro algorithm applies a city weight (similar to the GWDD algorithm), but also applies additional weights including a wind weight and a solar weight.

An example GWDDP algorithm for determining a Gas-specific weather index value for a region including six locations (e.g., cities) is described below with respect to Tables 13-15. In this example, predefined parameter values and weights for the six locations are shown in Table 13. Table 13 also includes a wind sigmoid flatness (SF) value that may be used to determine Component 2 (gas displacement from wind generation), described further below. The values shown in Table 13 may be predefined for each location, and may be obtained, for example from database(s) 1214 (FIG. 12). In some examples, one or more values shown in Table 13 may be updated, for example, based on any changes in a climatological baseline.

TABLE 13

Example predefined parameter values and weights for six cities.

| City | City Weights | HDD Exp. Factor | HDD Crit. Value | CDD Crit. value | CDD Exp. Factor | Canc. Factor | Wind Weight | Wind SF | Solar Weight |
|---|---|---|---|---|---|---|---|---|---|
| Houston | 0.3134 | 1.07 | 68 | 75 | 1.13 | 0.7 | 0.0545 | 1 | 1 |
| New York | 0.1597 | 1.02 | 65 | 75 | 1.05 | 0.7 | 0.0201 | 1 | 1 |
| Chicago | 0.2637 | 1.02 | 58 | 78 | 1.15 | 0.7 | 0.0494 | 1 | 1 |
| Denver | 0.0918 | 1.02 | 65 | 78 | 1.05 | 0.7 | 0.0610 | 1 | 1 |
| Portland | 0.0486 | 1.02 | 65 | 75 | 1 | 0.7 | 0.0498 | 1 | 1 |
| Atlanta | 0.1218 | 1.03 | 68 | 71 | 1.03 | 0.7 | 0 | 1 | 1 |

Tables 14 and 15 illustrate an example GWDDP calculation for an example region of six cities according to the predefined values shown in Table 13. In Table 14, minimum temperature (Min T) and maximum temperature (Max T) are determined from among a set of temperature estimates for the respective city (location). In this example, the temperature estimates are determined from twenty-four (24) averaged hourly temperatures, for a total of 24 hours of temperatures. As in Table 11, in Table 14, CDD Binary refers to Equation (1) and HDD Binary refers to Equation (2). The determination of HDD Binary, CDD Binary and the Straddle Factor are similar to those described above with respect to Table 11. The values for HDD and CDD represent the HDD and CDD values for the entire degree day (e.g., based on determining degree day subtotals for each of 24 average hourly temperatures (not shown), according to Equations (1) and (2) (similar to the degree day totals shown in Table 12 but for a set of 24 temperatures) and determining an average HDD and CDD (i.e., summing the 24 HDD (and similarly CDD) subtotals and dividing by 24). It is also noted that set of 24 temperatures represent a 24 hour period starting at 10:00 am central time (e.g., Thursday) until 9:59 am central time (e.g., Friday).

gas demand. Component 2 may have either negative or zero effect on natural gas demand. In some examples, the wind weights may be based on predetermined wind turbine power capacity for various locations.

Component (Comp.) 3 represents a natural gas demand due to seasonal wind generation. In the winter, wind negatively affects the ability of structures to keep heat from escaping. This can actually increase natural gas demand more than the increased wind generation reduces natural gas demand in some regions. At the same time, wind in the summer can reduce the need for air conditioning marginally. Component 3 may generate a zero value when the wind speed is less than a predetermined speed (e.g., 5 m/s). For example, wind may not impact demand when it is less than a predetermined speed. Component 3 may generate a zero

TABLE 14

Example GWDDP calculation for an example region of six cities.

| City | Min T | Max T | Wind Spd. | Solar Flux | HDD Binary | CDD Binary | Straddle Factor | Comp. 1 | HDD | CDD |
|---|---|---|---|---|---|---|---|---|---|---|
| Houston | 68 | 89.506 | 7 | 6.81 | 0 | 1 | 1 | 4.0106 | 0 | 12.7598 |
| New York | 47.6278 | 69.7561 | 3 | 4.15 | 1 | 0 | 1 | 0.1560 | 0 | 0.9766 |
| Chicago | 25.0551 | 53.2578 | 11 | 2.23 | 1 | 0 | 1 | 0 | 0 | 0 |
| Denver | 29.1362 | 59.5084 | 4 | 2.67 | 1 | 0 | 1 | 0 | 0 | 0 |
| Portland | 46.4058 | 57.253 | 6 | 1.23 | 1 | 0 | 1 | 0 | 0 | 0 |
| Atlanta | 56.8928 | 80.7566 | 1 | 5.19 | 1 | 1 | 1.03 | 0.5535 | 0 | 4.4141 |

TABLE 15

Example GWDDP calculation for an example region of six cities (continued).

| City | Comp. 2 | Wind Chill Fact. | Comp. 3 | Comp. 4 | Comp. 5 | GWDDP |
|---|---|---|---|---|---|---|
| Houston | −0.6967 | 0.1592 | −0.1592 | −6.81 | 0 | 3.1548 |
| New York | −0.6548 | 0.0041 | 0 | −4.15 | 0 | −0.4988 |
| Chicago | −0.6997 | 0 | 0 | −2.23 | 0 | −0.6997 |
| Denver | −0.6018 | 0 | 0 | −2.67 | 0 | −0.6018 |
| Portland | −0.6888 | 0 | 0 | −1.23 | 0 | −0.6888 |
| Atlanta | −0.7 | 0.0081 | 0 | −5.19 | 0 | −0.1465 |

Components 1-5 in Tables 14 and 15 are described below.

Component (Comp.) 1 represents a heating and cooling demand for a location. The heating and cooling demand may be a function of temperatures that averages together the HDD and CDD (for the 24 hour period, as discussed above). The average of HDD and CDD (for a particular location) are then multiplied by the product of the straddle factor and city weight. In other words, Component 1 is determined by (CDD+HDD)*(Straddle Factor*City Weight).

Figure 14:
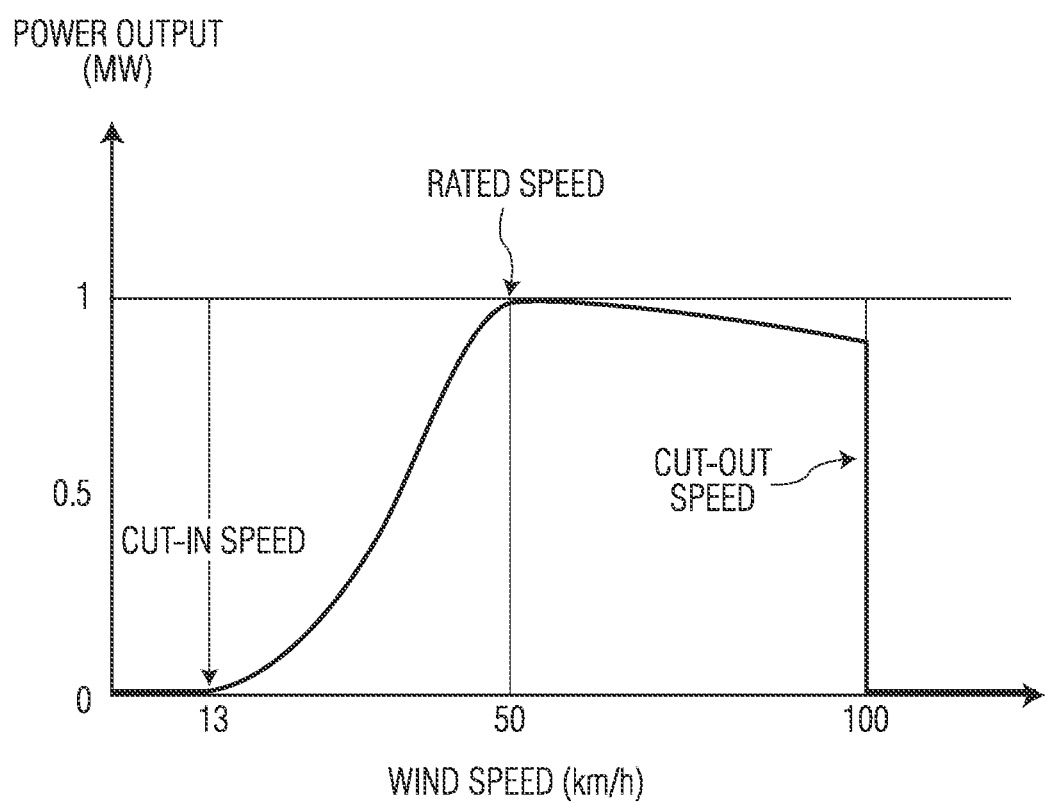
FIG. 14 is an example graph of wind power as a function of wind speed, according to an aspect of the present disclosure.

Component (Comp.) 2 represents a natural gas displacement from wind generation. Component 2 is a function of wind speed that may utilize a sigmoid curve, together with predefined wind weight and wind sigmoid flatness for each location (shown in Table 13). FIG. 14 is an example graph of wind power as a function of wind speed, according to an aspect of the present disclosure. In general, power generation from windmills grows in the shape of an S curve as wind speed grows from 0 to about 12 m/s. The wind weight may be derived from wind generation capacity in different regions and scaled to represent the amount of natural gas generation that can be displaced by wind in different regions. In general, an increase in wind generation may correspond to a decrease in natural gas demand. Similarly, a decrease in wind generation may correspond to an increase in natural value when both HDD binary and CDD binary are 1 (e.g., hot during the day and cool at night, thereby providing offsetting effects). Component 3 may also generate a zero value when both HDD binary and CDD binary are 0 (e.g., mild throughout the day and night, thus there may be no increase in energy demand due to wind).

Component (Comp.) 4 represents natural gas displacement from Solar Generation. Currently, solar generation represents less than 2% of US generation although it is closer to 14% of California generation. Thus, in this example, the weights for solar displacement are much lower than the other weights. Component 4 may be determined, for each location, as Solar Weight*Solar Flux*−1.

Component (Comp.) 5 represents a natural gas demand due to passive solar generation. Passive solar generation can negatively or positively affect natural gas demand depending on the season. In the winter, more sunlight can reduce natural demand significantly. In the summer, sunlight can increase cooling loads more than CDD values alone would indicate. A big part of the cooling effect of rainy days in the summer is the lack of solar energy buildings receive passively. Component 5 may be determined as (Solar flux/Coefficient 1)*(CDD Binary−HDD Binary)*City Weight*Coefficient 2.

The GWDDP value for each location is the sum of Components 1 through Component 5 (i.e., Component 1+Component 2+Component 3+Component 4+Component 5). The regional GWDDP value for the total of the six locations is the sum of the GWDDP values for the six locations. In this example, the Regional GWDDP is 0.5192. In this example, the city level GWDDP and regional GWDDP represents a set of Natural Gas-specific weather index values. In some examples, the GWDDP may further be related to a consumption of natural gas in a region. In general, a negative GWDDPP may indicate a reduction in natural gas consumption and a positive GWDDP may indicate an increase in natural gas consumption.

Because the GWDDP algorithm may use knowledge obtained from hourly variable values, which may be only fully known after the data source system produces interpolated values, in some examples, GWDDP information may be released on a separate message. This is because when the final forecast file containing information relevant to a GWDDP calculation for some day is processed, a missing forecast hours may not yet be interpolated, and thus all of the desired information may not be available.

Example of City Level Calculation Parameters

In some examples, GWDDP calculations may be based on calculating a GWDDP value for each of 100 (for example) GWDDP cities. The GWDDP algorithm of the present disclosure may include as input a set of parameters that are determined per city participating in GWDDP. These parameters may be stored in a database table (e.g., database(s) 1214 (FIG. 12), and may be updated periodically. As discussed above, the parameters may include: HDDCrit (or "Heating degree days critical value") representing the temperature under which people typically start using heating. HDDExp (or "Heating degree days exponent factor") representing an exponent used to scale the heating temperature difference. CDDCrit (or "Cooling degree days critical value") representing the temperature above which people typically start using air conditioning for cooling. CDDExp (or "Cooling degree days exponent factor") representing an exponent used to scale the cooling temperature difference. HDD-CDD cancelation factor (CF) representing a natural reduction in energy consumption when days are hot but nights are cold. StraddleLow and StraddleHigh representing a pair of temperatures used to define a cancellation factor for when the temperature is hot during the day and cold during the night. WIndWght (or wind weight) representing a factor used in quantifying the effect of wind generated electricity on NG demand. WindSigmoidFlatness (or wind sigmoid flatness) representing a factor representing the characteristics of the shape of the function tying wind speed with the amount of energy generated as a function of that speed. SolarWght (or solar weight) encapsulating the reduction in NG demand due to solar energy generation.

Example of City Level Calculation Inputs

In addition to the above parameters which are relatively stable, the following information may be used to calculate a daily GWDDP value for a single location. Hourly values of the 2 m temperature for all hours in the 24 hour period starting at LOAM local time and ending at 9 AM local time (inclusive). The average wind speed size (and, in some examples, not average vector) for these same hours, that is, the sum of wind speed size over these 24 hours, divided by 24. The average solar flux over these hours, that is the sum of 24 solar flux values divided by 24.

Example Region Level GWDDP

Systems of the present disclosure may support multiple aggregations of GWDDP areas into regions, as follows:
1. State level—the system may calculate a state level GWDDP number taking into account all GWDDP areas within each state.
2. CONUS—the system may calculate a GWDDP number taking into account all GWDDP areas within the continuous US (lower 48 states).
3. Census divisions—the system may calculate a GWDDP number per census division. The census division column is called "Region" in Appendix C in the station list, Parameters table, and state to region mapping.
4. NERC regions—the system may calculate GWDDP numbers per the eight "Electric Reliability Councils" of the "North American Electric Reliability Corporation" (NERC).
5. EIA regions—the system may calculate GWDDP numbers per the 5 natural gas storage regions used as of 2015.
6. EIA_Sub regions—A finer division of EIA regions into sub regions.

The region level GWDDP may include a sum of all GWDDP values for the cities within the region.

In some examples, GWDDP regions may cover more than a single time zone. The GWDDP value for a region may be determined once all cities within the region have reached 100% complete. Thus regional GWDD values may be released once the natural gas day has ended for the cities at the most western time zone within the region.

In some examples, GWDD and/or GWDDP numbers may be aggregated to provide information over longer periods of time, such as gas weeks months, seasons or years. These values can blend forecast with observation based GWDD and/or GWDDP for weeks that have partially already passed. GWDDP (and/or GWDD) as an indication of natural gas consumption, may be summed to provide a value over a longer period of time.

IS Weather Index Interactive GUI

Weather is said to impact 33% of the $17 Trillion US economy, which is approximately $5 Trillion of commercial impact to the United States. For example, statistics show that a weather forecast of 1 degree greater forecast accuracy when temperatures are below 0 degrees or above 80 degrees is worth about $1 million per degree. However, this statistic does not include the number of times 'perceived' weather (from the changing weather forecasts) has influenced that price of traded electricity or natural gas instruments before it is delivered in the physical market. For example, it is estimated that a financial contract changes hands 10×-15× prior to the delivery of the underlying in the physical marketplace. In other words, a weather forecast 30 days out may have one perspective and future price of electricity or natural gas will trade on that information, then a few days later the same weather forecast model may change its perspective and electricity price will change again and so on. So if one looks at trading volume and the impact weather has on key instruments such as electricity and natural gas as well as other Energy and Agriculture instruments, it is possible the financial impact in the US could be measured "in multiples" of the estimated about $5 trillion dollars influenced by weather each year.

One of the key reasons the market has not evolved in this direction is due to the current void in real-time/streaming weather forecast 'DATA'. Most of the weather vendor world still uses weather maps and websites which do not promote the proper weather workflow to electronic trading entities, nor do they interact with electronic market prices. Aspects of the present disclosure include a new IS weather index capability and IS weather Index interactive GUI tools, including as part of a specialized trading desktop to help understand and analyze future price movements of an IS weather index.

Figure 15:
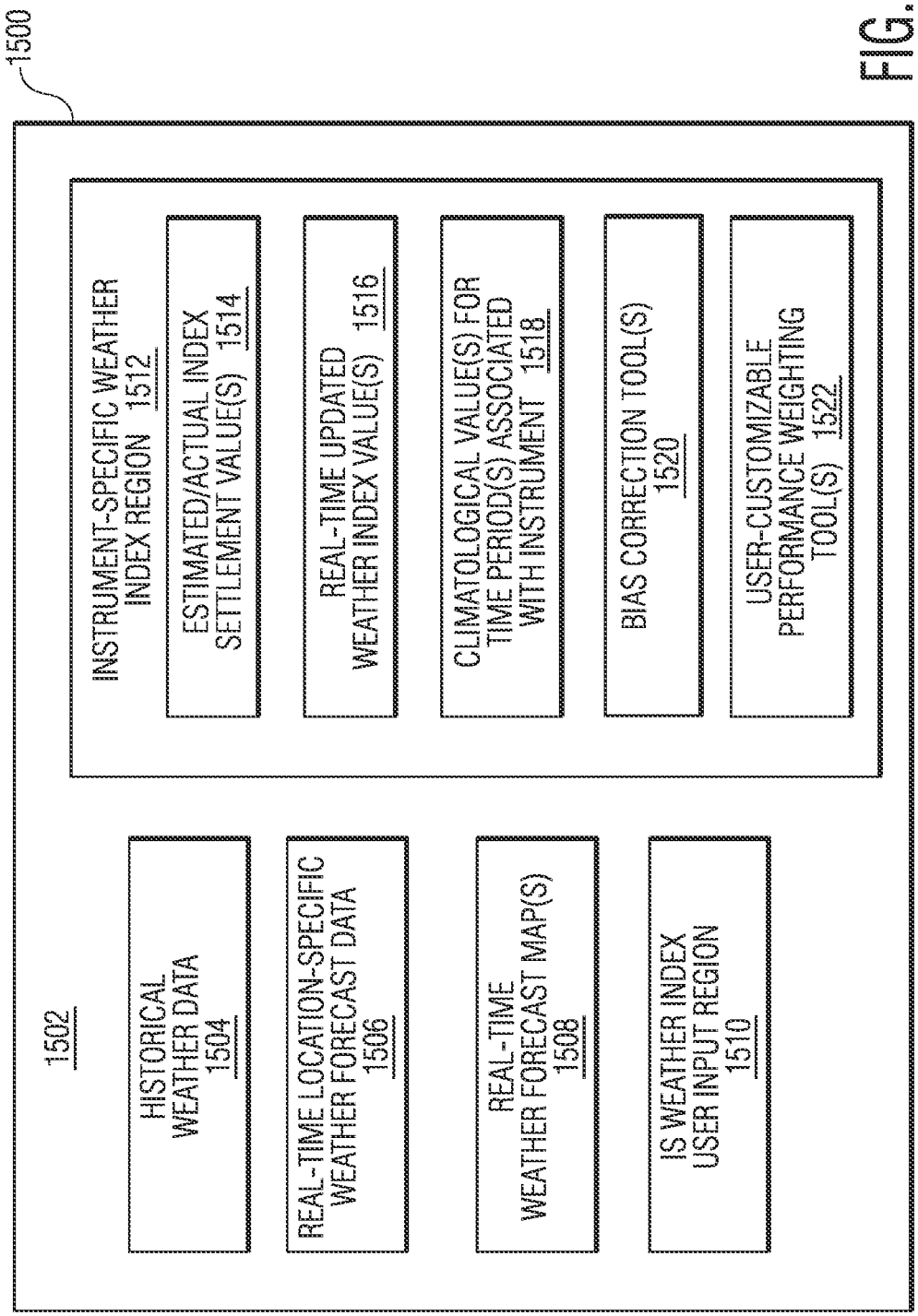
FIG. 15 is an illustration of an example interactive GUI for user-customized interaction with one or more instrument-specific weather indices, according to an aspect of the present disclosure.

FIG. 15 is an illustration of an example interactive GUI 1500 for user-customized interaction with one or more instrument-specific weather indices, according to an aspect of the present disclosure. GUI 1500 may include one or more webpages 1502 having various regions (e.g., regions 1504-1512) for interaction with IS weather index information. Although exemplary regions are depicted in FIG. 15, alternate configurations for the regions are envisioned. For example, a graphical user interface may contain more or fewer regions. Additionally, the regions may be reorganized in any manner and display other pertinent information. Moreover one or more of regions 1504-1512 may provide for presentation of and user interaction with data and information. In some examples, regions 1504-1512 may represent weather index package(s) 1226 (FIG. 12).

Region 1504 may (interactively) present historical weather data for one or more locations (e.g., observations(s) data such as temperature, wind speed, cloud cover, precipitation, or climatological averages of such items, etc.) over one or more historical time periods. In some examples, the location(s) may include locations associated with a desired IS weather index.

In some examples, region 1504 (or another region) may include historical market data for one or more locations (such as consumed natural gas in that region) or commodities (such as crop supply or crop damage) or assets like a stock (such as future sales impacts, cost impact, earnings per share, etc.) where these outside elements may be directly influenced by the corresponding observed weather and future weather.

Region 1506 may (interactively) present weather forecast data associated with one or more weather forecast models that may be location-specific and may be updated in real-time. In other words, region 1506 may provide real-time, key weather forecast data for one or more locations associated with a desired IS weather index. Region 1508 may (interactively) present one or more comprehensive weather forecast maps (or spatially represent one or more IS weather index values on a map) that may be updated in real-time.

Region 1510 may provide any suitable user input tools such as buttons, text boxes, radio dials, pop-up windows, drop down menus, selectors and the like for providing user input into interactive GUI 1502. In some examples, region 1510 may include user input options for performing one or more electronic transactions with a specific instrument responsive to information and data provided by any of regions 1504-1508 and 1512 of interactive GUI 1500. In some examples, region 1510 may be used to create a user-customizable IS weather index, including user input of a desired instrument and one or more desired locations. In some examples region 1510 may be used to select a pre-defined instrument and to select one or more locations for the selected instrument. In some examples, one or more of regions 1504-1508 and 1512 nay be updated in response to any user input in region 1510 (e.g., selection of an instrument (e.g., pre-defined and/or user-created) and selection of location(s)). Although region 1510 is illustrated as being separate from regions 1504-1508 and 1512, it is understood that region 1510 may be part of one or more of regions 1504-1508 and 1512.

Although not shown, in some examples, interactive GUI 1500 may include one or more regions for providing real-time market data for the specific instrument associated with the desired IS weather index.

Region 1512 may include one or more regions for providing instrument-specific weather index information (such as for a NG weather index). For example, region 1512 may include regions 1514-1522.

Region 1514 may (interactively) present one or more estimated index settlement values and/or one or more actual index settlement values. For example, region 1514 may present one or more preliminary (e.g., early) estimates of a daily (e.g., end of day) settlement value for a desired IS weather index (e.g., estimated GWDD settlement value(s)), using real-time weather observations (e.g., METAR data) as the day progresses. Region 1514 may present actual index settlement value(s) associated with the IS weather index for one or more locations that may be periodically determined (e.g., daily, weekly, monthly, seasonal, etc.).

Region 1516 may (interactively) present one or more IS weather index values (e.g., GWDD, GWDDP) for one or more locations that may be updated in real-time. For example, region 1516 may provide instant (i.e., real-time) conversion of government weather forecast models into IS weather index values (e.g., GWDD, GWDDP values). Each IS weather index value may match the traded time periods for the specific instrument (e.g., of corresponding time periods of the underlying futures contracts from which weather futures contract(s) may relate).

Region 1518 may (interactively) present one or more climatological values related to one or more time periods associated with the specific instrument (e.g., for which a natural gas weather futures contract may exist).

Region 1520 may (interactively) provide one or more bias (e.g., forecast accuracy) correction tools. The bias tool(s) may be configured to help users understand which weather forecast models may be most accurate as a settlement approaches (e.g., which model(s) may represent a most accurate indication of a future settlement value).

Region 1522 may (interactively) provide one or more user-customizable performance weighting (PW) tools. The PW tool(s) may be configured for creating a user-specific performance weighting of different bias adjusted weather forecasts, to create user-specific future estimate(s) of the IS weather index value (e.g., future estimate(s) of a GWDD value, such as a GWDD settlement value).

In some examples, interactive GUI 1500 may represent an example of or a portion of weather impact dashboard 122 (FIG. 1). It should be understood that FIG. 15 represents a non-limiting example user interface, and that a differing interface configured in accordance with this disclosure may be provided for providing presentation and interaction with integrated weather and market data, including one or more IS weather indices.

Aspects of the present disclosure also include archiving weather forecast data, including with a time stamp (e.g., receipt time) when the forecast model hour was initially made available in the public domain. Conventional systems do not include archiving of weather forecast data, let alone archiving weather forecast data with a time stamp (as described herein), including in an integrated (e.g., single) system containing market data with the same time series (receipt time) data structure" to derive "alpha based" relationships (including changing weather perspectives indicating an influence on changing market prices). Conventional systems further do not include the analytics, as described by the systems of the present disclosure, including specific analytics that can be derived to create an IS weather index (such as a GWDD and/or GWDDP) to mitigate the weather risk specifically related to any electronically-transacted instrument, either on any existing electronic exchange system or off an electronic exchange system.

General weather may have some alpha related to a specific traded instrument. General weather may also have a much greater alpha when weather data is combined with other market data. Aspects of the present disclosure include the creation of very specific weather index algorithm(s) which better exposes the specific relationship(s) of weather with a specific underlying instrument, thereby creating a much larger alpha (e.g., a statical relationship, such as GWDD with respect to natural gas). Accordingly, IS weather indices of the present disclosure (which may be created for any existing electronic exchange-related and/or off-exchange related instrument) may provide an enhanced weather alpha. In some examples, the IS weather index may be configured to capture this market alpha, but from a precise mathematical (sometimes called fundamental) perspective. In other words, market prices (such as NG) may move upon changing weather forecast perspectives in today's marketplace. As changing a weather forecast perspective becomes significantly colder in the winter months, the NG price will move up on this weather news and eventually flatten out around a price level the market seems fair as it relates to that colder weather news. This relationship of price movement per changing weather perspective, is referred to as alpha. Trading entities with the most sophisticated weather resources and fundamental modeling techniques may help determine the magnitude of this market price movement. The IS weather index may provide the entire marketplace an opportunity to either remove this weather related alpha in NG (or any weather impacted underlying instrument) or alternatively trade the weather alpha element behind natural gas (or any weather impacted underlying instrument).

In some examples IS weather index algorithm(s) (e.g., (IS DD algorithm(s)) may reside in an electronic trading desktop, and the trading desktop may be configured to generate expected future values, while also streaming many weather forecasts through the algorithm(s). These types of integrated weather and market tools may help users (e.g., traders, market users) better understand how an individual may financially settle on the IS weather index (which is tied to a specific transacted instrument). In some examples, the IS weather index of the present disclosure may use a same IS DD algorithm (e.g. daily), but each day may stream observed weather through the algorithm to determine a daily settlement price. The settlement price may allow users (e.g., market participants) to offset and/or hedge the embedded weather risk contained in the market price of the specific underlying instrument. In some examples, IS weather indices of the present disclosure may be directly tied to a financial impact of a specific underlying instrument, or a basket of instruments, whose exchanged traded or off exchange traded price may be directly and/or indirectly influenced by changing weather and may have other time period than daily (such as weekly, monthly, seasonal, etc. The changing weather may include observed weather and/or changing forecasted weather perspectives.

The IS weather index of the present disclosure includes a novel one-to-one nature. For example, the IS DD algorithm(s) of the present disclosure are able to identify weather risk on a per instrument basis. Other novel aspects of the present disclosure include the ability to remove geographic location risk, the ability to remove timing of cash flow issues, and the ability to lay off weather related risk on an instrument on a daily basis even for underlying instruments who have weekly, monthly or seasonal terms (e.g., a term of the contract). Another novel feature of the IS weather index of the present disclosure includes the combination of time series data and market data to derive such a unique IS weather index (such as a GWDD weather index for natural gas prices). Importantly IS weather indices of the present disclosure also include the ability to generate specific location(s)-based index outputs that may be specifically designed, for example, for specific 'regional' instrument (e.g., natural gas) prices. In this manner, the IS DD algorithm(s) of the present disclosure may be configured to generate different IS weather indices for different regional instrument contracts (such as natural gas contracts).

The one-to-one concept of the present disclosure is encompassing and may relate to any transacted instrument, such as, without being limited to commodities, fixed income, equities, baskets of instruments, etc. Although conventional weather exchange traded instruments may exist, the financial payout of these conventional instruments are tied to observed weather such as accumulated Degree Days or accumulated precipitation over some predefined time frame (like a week, month or season). Conventional algorithms for weather instruments are typically very general and non-instrument specific. For example a conventional Heating Degree Day (HDD) calculation may use the day's average temperature (say 40 degrees) subtracted from 65, So the conventional value or that day would be 25 HDDs. If the conventional HDDs are then summed up over all 30 days in the month, those accumulated HDD values for the month can loosely be correlated to various crops, energy, winter coat sales, etc.; almost anything may have some positive or negative financial influence. The buyer or seller of such a conventional HDD traded instrument will serve as a loose correlation to some other exchange traded, off-exchange traded instrument or any business cash flows which are being impacted by weather, to serve as a financial offset/hedge. Many times, however, these loose relationships can blow up. For example, negative payouts on both the underlying and the weather instrument can occur because the weather occurred at a slightly different location. In addition, a financial payout may occur almost 1-2 months after the financial loss in the underlying has occurred. This mistiming of cash flows may occur when a futures contract expires for the next month (financial losses may occur on that day for the underlying future instrument) and it may take about a full month to identify weather a weather hedge worked (or not). The conventional style of exchange traded weather contracts currently use observed weather data and financially settle at the end of the contract. IS weather indices of the present disclosure are different it that they may include a rolling index which employs a "value-added" algorithm converting weather information and market data into an index value which may be tied specifically to an instrument (e.g., an electronic exchange traded instrument and/or an off-exchange instrument). Users of underlying instruments of the IS weather indices may be able to offset and/or hedge their weather risk exposure as it relates specifically to that specific underlying instrument.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A method, the method comprising:
providing a data distribution system in communication with one or more weather data source systems via at least one network, the one or more weather data source systems configured to generate one or more weather data streams;
receiving, by the data distribution system, via at least one user device, a weather index request comprising at least one instrument and a specific geographic location;
selecting, by the data distribution system, a predetermined algorithm among a set of predetermined algorithms corresponding to the at least one instrument in the weather index request, the selected predetermined algorithm comprising a degree day (DD) methodology specific to the at least one instrument;

extracting, by the data distribution system, weather risk indication data among the one or more weather data streams associated with the specific geographic location based on the selected predetermined algorithm corresponding to the at least one instrument;

converting, by the data distribution system, the extracted weather risk indication data into a set of weather index values corresponding to the specific geographic location, based on the selected predetermined algorithm corresponding to the at least one instrument, the selected predetermined algorithm configured to maximize a correlation between the set of weather index values and a consumption value represented by the at least one instrument;

generating, by the data distribution system, a weather index presentation package comprising the set of weather index values for distribution to the at least one user device; and updating, by the data distribution system, the weather index presentation package concurrent with changes to the weather risk indication data.

2. The method of claim 1, wherein the one or more weather data streams include weather forecast model data and weather observations data.

3. The method of claim 1, wherein the weather risk indication data includes temperature observation estimates associated with the specific geographic location for a predetermined number of sub-periods within a predetermined time period.

4. The method of claim 3, wherein the weather risk indication data further includes wind data and radiation data associated with the specific geographic location.

5. The method of claim 1, wherein the selected predetermined algorithm comprising the DD methodology is configured to estimate a weather-based demand for the at least one instrument with respect to the specific geographic location.

6. The method of claim 1, wherein the predetermined algorithm includes one or more weights associated with one or more of the specific geographic location, wind data and solar data.

7. The method of claim 1, wherein the DD methodology comprises a heating degree day (HDD) methodology associated with a heating demand and a cooling degree day (CDD) methodology associated with a cooling demand.

8. The method of claim 7, wherein the selected predetermined algorithm includes one or more predefined parameters associated with the at least one instrument.

9. The method of claim 8, wherein the one or more predefined parameters include a CDD critical value, a HDD critical value, a CDD exponent factor, a HDD exponent factor, at least one straddle factor and a cancellation factor.

10. The method of claim 7, wherein the selected predetermined algorithm determines the heating demand and the cooling demand for the specific geographic location, an instrument displacement from wind generation, an instrument demand due to seasonal wind generation, an instrument displacement from solar generation and an instrument demand due to passive solar generation.

11. The method of claim 1, wherein the at least one instrument is associated with energy instruments including natural gas.

12. The method of claim 1, wherein the set of weather index values is configured to offset a weather risk of the at least one instrument.

13. The method of claim 1, wherein the at least one instrument is associated with one or more of energy, agriculture, retail, fixed income, and equity markets.

14. The method of claim 1, the method further comprising:

determining one or more of at least one estimated settlement value and at least one actual settlement value of the set of weather index values.

15. The method of claim 1, the method further comprising:

generating an interactive graphical user interface (GUI) for interactively presenting the weather index presentation package to the at least one user device; and presenting, in one or more windows of the interactive GUI, one or more of a historical weather data region, a weather forecast region specific to the specific geographic location, a weather forecast map region, a user input region and an index-specific weather index region.

16. The method of claim 15, wherein the index-specific weather index region further comprises one or more of an index settlement value region, a weather index value region, a climatological value region, one or more bias correction tools and one or more performance weighting tools.

17. The method of claim 1, wherein the set of weather index values includes at least one indication of a departure from a predetermined weather index value associated with the at least one instrument.

18. A non-transitory computer readable medium storing computer readable instructions that, when executed by one or more processing devices, cause the one or more processing devices to perform the functions comprising:

receiving, via at least one user device, a weather index request comprising at least one instrument and a specific geographic location;

selecting a predetermined algorithm among a set of predetermined algorithms corresponding to the at least one instrument in the weather index request, the selected predetermined algorithm comprising a degree day (DD) methodology specific to the at least one instrument;

extracting weather risk indication data among one or more weather data streams associated with the specific geographic location based on the selected predetermined algorithm corresponding to the at least one instrument, the one or more weather data streams generated by one or more weather data source systems;

converting the extracted weather risk indication data into a set of weather index values corresponding to the specific geographic location, based on the selected predetermined algorithm corresponding to the at least one instrument, the selected predetermined algorithm configured to maximize a correlation between the set of weather index values and a consumption value represented by the at least one instrument;

generating a weather index presentation package comprising the set of weather index values for distribution to the at least one user device; and updating the weather index presentation package concurrent with changes to the weather risk indication data.

19. The non-transitory computer readable medium of claim 18, wherein the one or more weather data streams include weather forecast model data and weather observations data.

20. The non-transitory computer readable medium of claim 18, wherein the weather risk indication data includes temperature observation estimates associated with the specific geographic location for a predetermined number of sub-periods within a predetermined time period.

21. The non-transitory computer readable medium of claim 20, wherein the weather risk indication data further includes wind data and radiation data associated with the specific geographic location.

22. The non-transitory computer readable medium of claim 18, wherein the selected predetermined algorithm comprising the DD methodology is configured to estimate a weather-based demand for the at least one instrument with respect to the specific geographic location.

23. The non-transitory computer readable medium of claim 18, wherein the predetermined algorithm includes one or more weights associated with one or more of the specific geographic location, wind data and solar data.

24. The non-transitory computer readable medium of claim 18, wherein the DD methodology comprises a heating degree day (HDD) methodology associated with a heating demand and a cooling degree day (CDD) methodology associated with a cooling demand.

25. The non-transitory computer readable medium of claim 24, wherein the selected predetermined algorithm includes one or more predefined parameters associated with the at least one instrument, the one or more predefined parameters including a CDD critical value, a HDD critical value, a CDD exponent factor, a HDD exponent factor, at least one straddle factor and a cancellation factor.

26. The non-transitory computer readable medium of claim 24, wherein the selected predetermined algorithm determines the heating demand and the cooling demand for the specific geographic location, an instrument displacement from wind generation, an instrument demand due to seasonal wind generation, an instrument displacement from solar generation and an instrument demand due to passive solar generation.

27. The non-transitory computer readable medium of claim 18, wherein the at least one instrument is associated with one or more of energy, agriculture, retail, fixed income, and equity markets.

28. The non-transitory computer readable medium of claim 18, wherein the functions further comprise:
    determining one or more of at least one estimated settlement value and at least one actual settlement value of the set of weather index values.

29. The non-transitory computer readable medium of claim 18, wherein the functions further comprise:
    generating an interactive graphical user interface (GUI) for interactively presenting the weather index presentation package to the at least one user device; and
    presenting, in one or more windows of the interactive GUI, one or more of a historical weather data region, a weather forecast region specific to the specific geographic location, a weather forecast map region, a user input region and an index-specific weather index region,
    wherein the index-specific weather index region further comprises one or more of an index settlement value region, a weather index value region, a climatological value region, one or more bias correction tools and one or more performance weighting tools.

30. The non-transitory computer readable medium of claim 18, wherein the set of weather index values includes at least one indication of a departure from a predetermined weather index value associated with the at least one instrument.

* * * * *